(12) United States Patent
Furusato

(10) Patent No.: US 9,134,462 B2
(45) Date of Patent: Sep. 15, 2015

(54) OPTICAL COMPONENT HAVING A LOW-DENSITY SILICON OXIDE LAYER AS THE OUTERMOST LAYER OF AN INORGANIC THIN-FILM, METHOD OF MANUFACTURING OPTICAL COMPONENT AND ELECTRONIC APPARATUS

(75) Inventor: Daiki Furusato, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 900 days.

(21) Appl. No.: 12/900,174

(22) Filed: Oct. 7, 2010

(65) Prior Publication Data

US 2011/0085233 A1 Apr. 14, 2011

(30) Foreign Application Priority Data

Oct. 9, 2009 (JP) ................. 2009-234903
Oct. 9, 2009 (JP) ................. 2009-234904
Oct. 9, 2009 (JP) ................. 2009-234905
Sep. 22, 2010 (JP) ................. 2010-211690

(51) Int. Cl.
*F21V 9/04* (2006.01)
*F21V 9/06* (2006.01)
*G02B 5/08* (2006.01)
*G02B 5/20* (2006.01)
*G02B 1/115* (2015.01)
*G02B 1/116* (2015.01)

(52) U.S. Cl.
CPC ............. *G02B 1/115* (2013.01); *G02B 1/116* (2013.01)

(58) Field of Classification Search
USPC ......... 359/228, 245, 253, 290–296, 665, 350, 359/359–361, 577, 580–582, 585–586, 359/588–590, 601, 614; 345/32, 41, 48, 345/107; 216/24

See application file for complete search history.

(56) References Cited

U.S. PATENT DOCUMENTS

| | | | |
|---|---|---|---|
| 4,313,648 A * | 2/1982 | Yano et al. .................... | 359/587 |
| 6,385,154 B1 * | 5/2002 | Kokubo et al. ............... | 720/733 |
| 6,567,210 B2 * | 5/2003 | Costa et al. ................... | 359/350 |
| 6,797,366 B2 * | 9/2004 | Hanson et al. ................ | 428/201 |
| 6,838,183 B2 * | 1/2005 | Yializis ......................... | 428/457 |
| 7,465,681 B2 * | 12/2008 | Hart et al. ..................... | 438/788 |
| 7,672,046 B2 | 3/2010 | Shibuya | |
| 7,990,616 B2 * | 8/2011 | Shibuya ........................ | 359/582 |
| 2007/0229945 A1 | 10/2007 | Shibuya | |

(Continued)

FOREIGN PATENT DOCUMENTS

| | | |
|---|---|---|
| CN | 1950540 A | 4/2007 |
| JP | A-2001-074931 | 3/2001 |

(Continued)

*Primary Examiner* — Scott J Sugarman
*Assistant Examiner* — Tamara Y Washington
(74) *Attorney, Agent, or Firm* — Oliff PLC

(57) ABSTRACT

An optical component includes: a multilayer inorganic thin-film on a substrate, wherein the inorganic thin-film is formed by laminating a plurality of layers made of silicon oxide and a plurality of layers made of metal oxide, the metal oxide is metal oxide containing any one of zirconium, tantalum, and titanium, the layers made of silicon oxide include a low-density silicon oxide layer and a high-density silicon oxide layer having a density higher than the low-density silicon oxide layer, the outermost layer of the inorganic thin-film is the low-density silicon oxide layer, and the surface roughness of the outermost layer of the inorganic thin-film is equal to or greater than 0.55 nm and equal to or smaller than 0.7 nm.

21 Claims, 11 Drawing Sheets

(56) References Cited

U.S. PATENT DOCUMENTS

| | | | |
|---|---|---|---|
| 2007/0291363 A1* | 12/2007 | Asakura et al. | 359/586 |
| 2009/0092034 A1* | 4/2009 | Tanabe et al. | 369/275.3 |
| 2009/0128936 A1* | 5/2009 | Shibuya | 359/885 |
| 2009/0226735 A1 | 9/2009 | Nadaud et al. | |

FOREIGN PATENT DOCUMENTS

| | | |
|---|---|---|
| JP | A-2003-227938 | 8/2003 |
| JP | A-2005-276306 | 10/2005 |
| JP | A-2006-065038 | 3/2006 |
| JP | A-2007-043063 | 2/2007 |
| JP | A-2007-093804 | 4/2007 |
| JP | A-2007-264388 | 10/2007 |
| JP | A-2007-298951 | 11/2007 |
| JP | B2-4207083 | 1/2009 |
| JP | A-2009-093067 | 4/2009 |
| JP | A-2009-139925 | 6/2009 |

* cited by examiner

OPTICAL COMPONENT HAVING A LOW-DENSITY SILICON OXIDE LAYER AS THE OUTERMOST LAYER OF AN INORGANIC THIN-FILM, METHOD OF MANUFACTURING OPTICAL COMPONENT AND ELECTRONIC APPARATUS

BACKGROUND

1. Technical Field

The present invention relates to an optical component, such as an optical multilayer filter, a method of manufacturing an optical component, and an electronic apparatus including the optical component.

2. Related Art

In an electronic apparatus, for example, an imaging apparatus, such as a digital camera, a reproducing apparatus, such as a pickup, or a video apparatus, such as a projector, in general, dust-proof glass formed with an anti-reflection film, or an optical multilayer filter, such as an IR-UV cut filter, an IR cut filter, or a low-pass filter, is used. An optical component, such as dust-proof glass or an optical multilayer filter, has a structure in which a low-refractive-index inorganic thin-film made of silicon oxide or the like and a high-refractive-index inorganic thin-film made of titanium oxide or the like are alternately laminated on a substrate made of glass or quartz through deposition or the like.

In the related art, a multilayer filter is known which can obtain an antistatic effect without causing deterioration of the optical properties. This multilayer filter is structured such that a thin film made of silicon oxide and a thin film made of titanium oxide are alternately laminated to form an inorganic thin-film, the outermost silicon oxide layer of the inorganic thin-film has a low density of 1.09 to 2.04 g/cm$^3$, and the silicon oxide other than the outermost layer has a density equal to or greater than 2.21 g/cm$^3$ which is greater than the density of the outermost layer (Japanese Patent No. 4207063).

According to the related art described in Japanese Patent No. 4207083, in order to form the inorganic thin-film, film formation other than the outermost layer is performed through ion-assisted electron beam deposition with an acceleration current of 1000 mV and an acceleration voltage of 1200 mA, and film formation of silicon oxide of the outermost layer is performed through electron beam deposition without ion assist.

According to the related art described in Japanese Patent No. 4207083, with reduction in the surface resistance of the outermost layer, an antistatic effect can be obtained, increasing dust-proof performance.

However, with an increase in the number of pixels of the imaging apparatus or the video apparatus, small foreign particles or grit may adhere and may adversely affect the products. For this reason, there is demand for high dust-proof performance.

SUMMARY

An advantage of some aspects of the invention is that it provides an optical component having high dust-proof performance, a method of manufacturing an optical component, and an electronic apparatus.

The invention can be implemented by the following forms and application examples.

APPLICATION EXAMPLE 1

This application example of the invention provides an optical component having a multilayer inorganic thin-film on a substrate. The inorganic thin-film is formed by laminating a plurality of layers made of silicon oxide and a plurality of layers made of metal oxide. The metal oxide is metal oxide containing any one of zirconium, tantalum, and titanium. The layers made of silicon oxide include a low-density silicon oxide layer and a high-density silicon oxide layer having a density higher than the low-density silicon oxide layer. The outermost layer of the inorganic thin-film is the low-density silicon oxide layer. The surface roughness of the outermost layer of the inorganic thin-film is equal to or greater than 0.55 nm and equal to or smaller than 0.7 nm.

With this configuration, since the layer forming the outermost layer of the inorganic thin-film is the low-density silicon oxide layer, the insulation property of the thin film of silicon oxide which intrinsically exhibits high insulation performance is reduced, and conductivity increases.

The thin film of silicon oxide of the outermost layer has a surface roughness equal to or greater than 0.55 nm and equal to or smaller than 0.7 nm which is a great improvement on the surface roughness (0.8 nm to 0.95 nm) of the outermost layer in Japanese Patent No. 4207083, improving dust-proof performance. That is, according to the related art described in Japanese Patent No. 4207083, since film formation is performed through electron beam deposition without ion assist, it may be supposed that the surface roughness of the thin film of silicon oxide of the outermost layer is deteriorated. In contrast, according to this application example, the surface roughness of the layer of silicon oxide of the outermost layer is improved and the layer is smoothened. Thus, grit or dust is less likely to adhere to the surface, and dust-proof performance increases. The surface-roughness described in the detailed statement of this invention is arithmetic mean rough Ra.

APPLICATION EXAMPLE 2

In the optical component according to the above application example of the invention, the layer of metal oxide near the outermost layer may include a layer of zirconium oxide, and the surface roughness of the outermost layer of the inorganic thin-film may be equal to or greater than 0.6 nm and equal to or smaller than 0.7 nm.

With this configuration, the surface roughness of the outermost silicon oxide layer is a great improvement on the surface roughness of the outermost layer in Japanese Patent No. 4207083, further improving dust-proof performance.

The zirconium oxide (also referred to as zirconia) forming one layer in this example has reduced surface detachment energy because Zr has electronegativity smaller than Ti of the titanium oxide forming one thin film in the related art. As a result, in this example, dust-proof performance increases compared to the related art. The outermost layer means a layer which is the furthest away from the substrate from among the layers forming the inorganic thin-film. The outermost layer may or may not form the surface of the optical component.

APPLICATION EXAMPLE 3

In the optical component according to the above application example of the invention, the layers of zirconium oxide may include a low-density zirconium oxide layer and a high-density zirconium oxide layer having a density higher than the low-density zirconium oxide layer, and at least a layer adjacent to the outermost layer of the inorganic thin-film may be the low-density zirconium oxide layer.

With this configuration, since the outermost silicon oxide layer and the underlying zirconium oxide layer are both low-density layers, the insulation property can be further reduced, improving conductivity.

APPLICATION EXAMPLE 4

In the optical component according to the above application example of the invention, the low-density silicon oxide layer may have a density equal to or higher than 2.00 g/cm$^3$ and equal to or lower than 2.20 g/cm$^3$, and the low-density zirconium oxide layer may have a density equal to or higher than 4.8 g/cm$^3$ and equal to or lower than 5.4 g/cm$^3$.

With this configuration, the reasonable density ranges of the low-density silicon oxide layer and the low-density zirconium oxide layer are set, reliably improving conductivity. That is, if the density of the low-density silicon oxide layer exceeds 2.20 g/cm$^3$, there is no effect of reduction in the density of the layer. If the density of the low-density silicon oxide layer is lower than 2.00 g/cm$^3$, film formation is difficult. Similarly, if the density of the low-density zirconium oxide layer exceeds 5.4 g/cm$^3$, there is no effect of reduction in the density of the layer. If the density of the low-density zirconium oxide layer is lower than 4.8 g/cm$^3$, adhesiveness is degraded, and there are problems, such as film separation, making it difficult to perform film formation.

APPLICATION EXAMPLE 5

In the optical component according to the above application example of the invention, the layer of metal oxide near the outermost layer may include a layer of tantalum oxide, and the surface roughness of the outermost layer of the inorganic thin-film may be equal to or greater than 0.55 nm and equal to or smaller than 0.65 nm.

With this configuration, the surface roughness of the outermost silicon oxide layer is a significantly greater improvement on the surface roughness of the outermost layer in Japanese Patent No. 4207083, further improving dust-proof performance.

The tantalum oxide forming one layer in this example has reduced surface detachment energy because Ta has electronegativity smaller than Ti of the titanium oxide forming one thin film in the related art. As a result, in this example, dust-proof performance increases compared to the related art. The outermost layer means a layer which is the furthest away from the substrate from among the layers forming the inorganic thin-film. The outermost layer may or may not form the surface of the optical component.

APPLICATION EXAMPLE 6

In the optical component according to the above application example of the invention, the layers of tantalum oxide may include a low-density tantalum oxide layer and a high-density tantalum oxide layer having a density higher than the low-density tantalum oxide layer, and at least a layer adjacent to the outermost layer of the inorganic thin-film may be the low-density tantalum oxide layer.

With this configuration, since the outermost silicon oxide layer and the underlying tantalum oxide layer are both low-density layers, the insulation property can be further reduced, improving conductivity.

APPLICATION EXAMPLE 7

In the optical component according to the above application example of the invention, the low-density silicon oxide layer may have a density equal to or higher than 2.00 g/cm$^3$ and equal to or lower than 2.15 g/cm$^3$, and the low-density tantalum oxide layer may have a density equal to or higher than 7.7 g/cm$^3$ and equal to or lower than 8.0 g/cm$^3$.

With this configuration, the reasonable density ranges of the low-density silicon oxide layer and the low-density tantalum oxide layer are set, reliably improving conductivity. That is, if the density of the low-density silicon oxide layer exceeds 2.15 g/cm$^3$, there is no effect of reduction in the density of the layer. If the density of the low-density silicon oxide layer is lower than 2.00 g/cm$^3$, film formation is difficult. Similarly, if the density of the low-density tantalum oxide layer exceeds 8.00 g/cm$^3$, there is no effect of reduction in the density of the layer. If the density of the low-density tantalum oxide layer is lower than 7.70 g/cm$^3$, transparency is lost, making it impossible to use the resultant thin-film as an optical thin-film which should have high transparency.

APPLICATION EXAMPLE 8

In the optical component according to the above application example of the invention, the layer of metal oxide near the outermost layer may include a layer of titanium oxide, and the surface roughness of the outermost layer of the inorganic thin-film may be equal to or greater than 0.6 nm and equal to or smaller than 0.7 nm.

With this configuration, the surface roughness of the outermost silicon oxide layer is a significantly greater improvement on the surface roughness of the outermost layer in Japanese Patent No. 4207083, further improving dust-proof performance.

APPLICATION EXAMPLE 9

In the optical component according to the above application example of the invention, the layers of titanium oxide may include a low-density titanium oxide layer and a high-density titanium oxide layer having a density higher than the low-density titanium oxide layer, and at least a layer adjacent to the outermost layer of the inorganic thin-film may be the low-density titanium oxide layer.

With this configuration, since the outermost silicon oxide layer and the underlying titanium oxide layer are both low-density layers, the insulation property can be further reduced, improving conductivity.

APPLICATION EXAMPLE 10

In the optical component according to the above application example of the invention, the low-density silicon oxide layer may have a density equal to or higher than 2.00 g/cm$^3$ and equal to or lower than 2.15 g/cm$^3$, and the low-density titanium oxide layer may have a density equal to or higher than 4.50 g/cm$^3$ and equal to or lower than 4.75 g/cm$^3$.

With this configuration, the reasonable density ranges of the low-density silicon oxide layer and the low-density titanium oxide layer are set, reliably improving conductivity. That is, if the density of the low-density silicon oxide layer exceeds 2.15 g/cm$^3$, there is no effect of reduction in the density of the layer. If the density of the low-density silicon oxide layer is lower than 2.00 g/cm$^3$, film formation is difficult. Similarly, if the density of the low-density titanium oxide layer exceeds 4.75 g/cm$^3$, there is no effect of reduction in the density of the layer. If the density of the low-density titanium oxide layer is lower than 4.50 g/cm$^3$, film formation is difficult.

APPLICATION EXAMPLE 11

In the optical component according to the above application example of the invention, the total thickness of the low-density silicon oxide layer and the low-density metal oxide layer may be equal to or smaller than 500 nm.

With this configuration, the total thickness of the low-density silicon oxide layer and the low-density metal oxide layer is equal to or smaller than 500 nm, and preferably, is equal to or smaller than 400 nm. Thus, the surface resistance of the outermost layer can be maintained without increasing the thickness more than necessary. That is, although it is preferable to increase the total thickness of a plurality of layers so as to reduce the surface resistance of the outermost layer, even when the total thickness exceeds 500 nm, the surface resistance does not substantially change, and there is no effect of maintaining the low surface resistance of the outermost layer.

APPLICATION EXAMPLE 12

In the optical component according to the above application example of the invention, a fluorine-containing organic silicon compound film may be formed on the surface of the outermost layer of the inorganic thin-film.

With this configuration, the fluorine-containing organic silicon compound film is formed on the surface of the thin film of silicon oxide as the outermost layer, reducing surface energy and suppressing adhesion of grit.

APPLICATION EXAMPLE 13

In the optical component according to the above application example of the invention, the surface resistance of the inorganic thin-film may be equal to or smaller than $3.1\times10^{10}\Omega/\square$ and equal to or greater than $9.1\times10^{9}\Omega/\square$.

With this configuration, since the surface resistance is sufficiently reduced, the dust-proof effect can be reliably obtained.

APPLICATION EXAMPLE 14

In the optical component according to the above application example of the invention, the surface resistance of the inorganic thin-film may be equal to or smaller than $1.4\times10^{11}\Omega/\square$ and equal to or greater than $7.7\times10^{9}\Omega/\square$.

With this configuration, since the surface resistance is sufficiently reduced, the dust-proof effect can be reliably obtained.

APPLICATION EXAMPLE 15

In the optical component according to the above application example of the invention, the surface resistance of the inorganic thin-film may be equal to or smaller than $1.4\times10^{11}\Omega/\square$ and equal to or greater than $5.7\times10^{10}\Omega/\square$.

With this configuration, since the surface resistance is sufficiently reduced, the dust-proof effect can be reliably obtained.

APPLICATION EXAMPLE 16

This application example of the invention provides a method of manufacturing an optical component having the above-described configuration in which at least the outermost layer of the inorganic thin-film is formed through ion-assisted electron beam deposition with assist power having an acceleration voltage equal to or greater than 300 V and equal to or smaller than 450 V.

With this configuration, at least the outermost layer is formed through electron beam deposition (IAD) under the low ion assist condition that the acceleration voltage is equal to or greater than 300 V and equal to or smaller than 450 V. Thus, the surface roughness of the thin film of silicon oxide of the outermost layer can be improved to be equal to or greater than 0.65 nm and smaller than 0.80 nm compared to the related art. For this reason, it is possible to prevent grit or dust from adhering to the surface of the outermost layer, increasing dust-proof performance.

APPLICATION EXAMPLE 17

In the method of manufacturing an optical component according to the above application example of the invention, the plurality of layers may be five or more layers, and at least four adjacent layers including the outermost layer from among the layers may be formed through the ion-assisted electron beam deposition with assist power.

With this configuration, the number of films which will be formed with low assist power is within an appropriate range, performing reasonable film formation. Four or more layers are subjected to the electron beam deposition with low assist power because, if three or less layers are subjected to the electron beam deposition, the surface resistance is not sufficiently reduced and the dust-proof effect is not sufficiently obtained. If four or more layers are subjected to the electron beam deposition, since the surface resistance is sufficiently reduced, the dust-proof effect can be reliably obtained. When five or more layers are subjected to the electron beam deposition, since the surface resistance is not changed so much and there is little difference in the dust-proof effect, it will suffice that at least four layers are subjected to the electron beam deposition.

APPLICATION EXAMPLE 18

This application example of the invention provides an electronic apparatus. The electronic apparatus includes the above-described optical component, and a case which accommodates the optical component. The optical component is an IR-UV cut filter, and an imaging element is arranged to be opposite the IR-UV cut filter.

With this configuration, the IR-UV cut filter having high dust-proof performance is arranged to be opposite the imaging element, for example, a CCD. Thus, there is no case where grit or the like remains in an image captured by the CCD. Therefore, it is possible to provide a high-quality imaging apparatus.

APPLICATION EXAMPLE 19

This application example of the invention provides an electronic apparatus. The electronic apparatus includes the above-described optical component, and a case which accommodates the optical component. The optical component has an anti-reflection film and is arranged in an optical path between a laser light source and an objective lens opposite an optical disk.

With this configuration, anti-reflection an film-equipped optical component having high dust-proof performance, for example, a beam splitter is arranged between the laser light source and the objective lens. Thus, it is possible to suppress deterioration in the reproduction of information recorded on the optical disk or recording of information onto the optical disk by the laser light source or the objective lens due to adhesion of grit. Therefore, it is possible to provide an optical pickup apparatus having high accuracy.

APPLICATION EXAMPLE 20

This application example of the invention provides an electronic apparatus. The electronic apparatus includes the above-described optical component, and a case which accommodates the optical component. The optical component has an anti-reflection film and is arranged in an optical path between a light source and a dichroic prism.

With this configuration, an anti-reflection film-equipped optical component having high dust-proof performance, for example, dust-proof glass is arranged between the light source and the dichroic prism. Thus, it is possible to provide a projector which projects an image with high accuracy through the laser light source, the dichroic prism, and the like.

BRIEF DESCRIPTION OF THE DRAWINGS

The invention will be described with reference to the accompanying drawings, wherein like members reference like elements.

DESCRIPTION OF EXEMPLARY EMBODIMENTS

Figure 1:
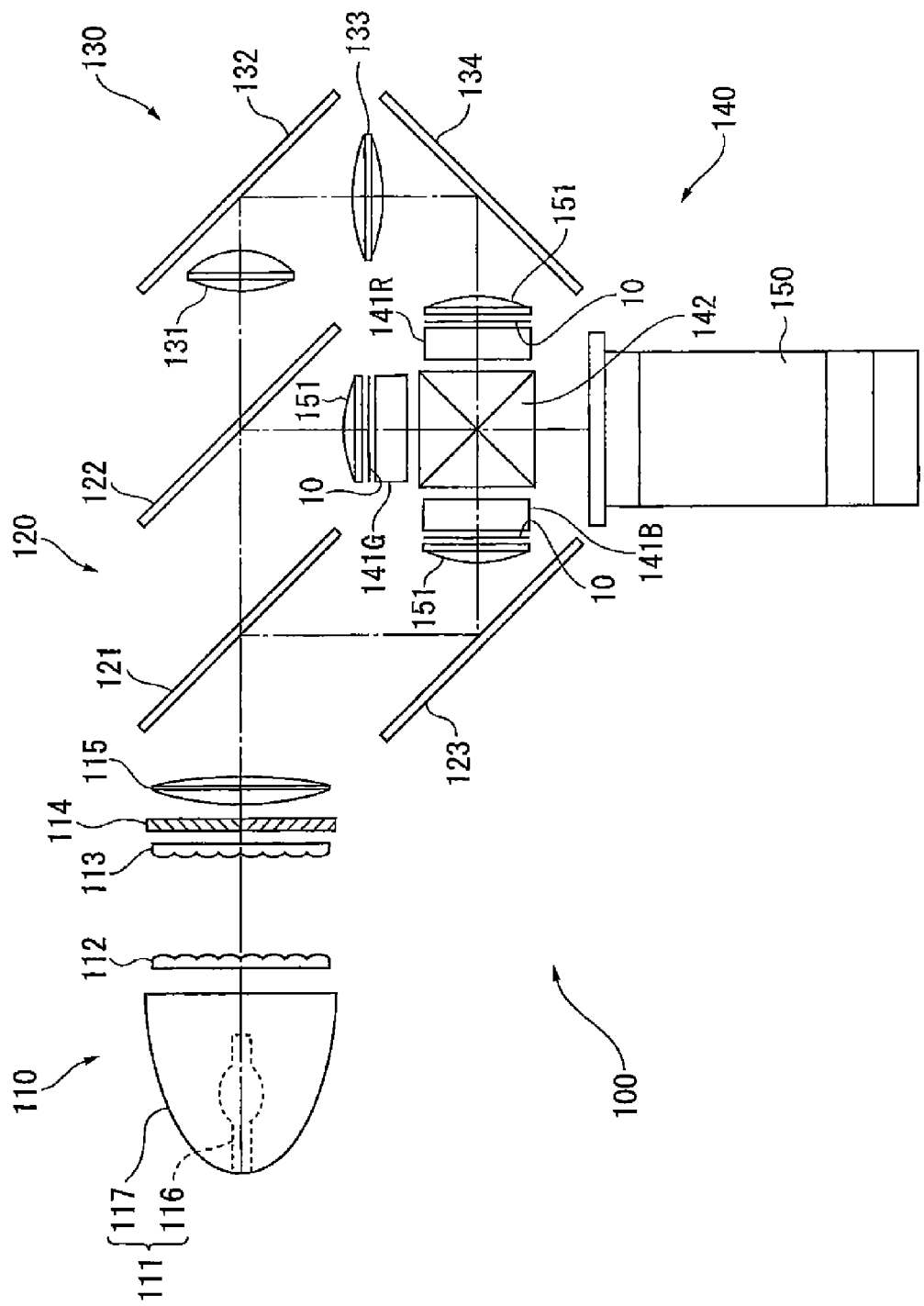
FIG. 1 is a schematic view showing an electronic apparatus according to a first embodiment of the invention.

Hereinafter, embodiments of the invention will be described with reference to the drawings. In the embodiments, the same constituent elements are represented by the same reference numerals, and description thereof will be omitted or simplified.

First Embodiment

First, a first embodiment will be described with reference to FIGS. 1 and 2.

In the first embodiment, an example will be described where an electronic apparatus is a projector, and an optical component which is incorporated into the projector is dust-proof glass.

FIG. 1 is a schematic configuration diagram of a projector.

In FIG. 1, a projector 100 includes an integrator illumination optical system 110, a color separation optical system 120, a relay optical system 130, an electro-optical device 140 which modulates a light flux emitted from a light source in accordance with image information, and a projection lens 150 which projects the light flux modulated by the electro-optical device 140 on a magnified scale.

The integrator illumination optical system 110 is an optical system which substantially uniformly illuminates the image forming regions of three transmissive liquid crystal panels 141 (liquid crystal panels 141R, 141G, and 141B for respective light components of red, green, and blue) constituting the electro-optical device 140. The integrator illumination optical system 110 includes a light source device 111, a first lens array 112, a second lens array 113, a polarization conversion element 114, and a superimposing lens 115.

The light source device 111 includes a light source lamp 116 and a reflector 117. A radiant light beam emitted from the light source lamp 116 is reflected by the reflector 117 and becomes a parallel light beam, and the parallel light beam is emitted to the outside.

The first lens array 112 has the configuration that small lenses which substantially have a rectangular contour when viewed from the optical axis direction are arranged in a matrix.

The second lens array 113 substantially has the same configuration as the first lens array 112, that is, has the configuration that small lenses are arranged in a matrix. The second lens array 113 has a function of forming an image of each small lens of the first lens array 112 on the corresponding transmissive liquid crystal panel 141 along with the superimposing lens 115.

The polarization conversion element 114 is arranged between the second lens array 113 and the superimposing lens 115 and also combined with the second lens array 113 as a single unit. The polarization conversion element 114 converts light from the second lens array 113 to one kind of polarized light. The color separation optical system 120 includes two dichroic mirrors 121 and 122 and a reflecting mirror 123. The color separation optical system 120 separates a plurality of partial light fluxes emitted from the integrator illumination optical system 110 into light components of three colors of red (R), green (G), and blue (B) by the dichroic mirrors 121 and 122.

The relay optical system 130 includes an incidence-side lens 131, a relay lens 133, and reflecting mirrors 132 and 134. The relay optical system 130 has a function of guiding the red light component as a color light component separated by the color separation optical system 120 to the transmissive liquid crystal panel 141R.

Out of the red light component and the green light component having transmitted the dichroic mirror 121, the green light component is reflected by the dichroic mirror 122, passes through a field lens 151, and reaches the transmissive liquid crystal panel 141G for green. The red light component transmits the dichroic mirror 122, passes through the relay optical system 130 and the field lens 151, and reaches the transmissive liquid crystal panel 141R for red.

The electro-optical device 140 modulates incident light fluxes in accordance with image information to form a color image. The electro-optical device 140 includes the transmissive liquid crystal panels 141R, 141G, and 141B serving as a light modulation device, dust-proof glasses 10 provided on the light incidence surfaces of the respective transmissive liquid crystal panels 141R, 141G, and 141B, and a cross dichroic prism 142.

The cross dichroic prism 142 combines the optical images modulated for the respective color light components to form a color image. A dielectric multilayer film which reflects the red light component and a dielectric multilayer film which reflects the blue light component are substantially provided in an X shape along the interface of four right angle prisms, and the three color light components are combined by the dielectric multilayer films.

Figure 2:
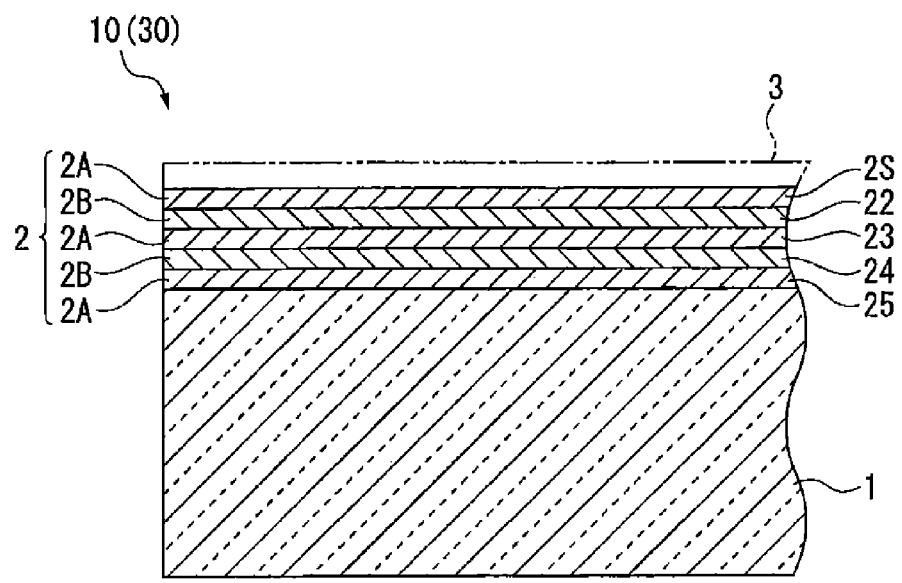
FIG. 2 is a sectional view of an optical component of the first embodiment.

FIG. 2 shows the schematic configuration of the dust-proof glass 10.

In FIG. 2, the dust-proof glass 10 is structured such that an anti-reflection film 2 is provided on the light incidence surface of a substrate 1, and a fluorine-containing organic silicon compound film 3 is provided on the surface of the anti-reflection film 2 as necessary. That is, the fluorine-containing organic silicon compound film 3 may or may not be provided on the surface of the anti-reflection film 2. For the substrate 1, for example, quartz, crystal, inorganic alkali glass, or the like may be used.

The anti-reflection film 2 has the five-layer structure that a low-refractive-index silicon oxide ($SiO_2$) layer 2A and a high-refractive-index metal oxide layer 2B are alternately laminated.

A first layer which is the furthest away from the substrate 1 is an outermost layer 2S, and the outermost layer 2S is the silicon oxide layer 2A. A second layer 22 near the outermost layer 2S is the metal oxide layer 2B. A third layer 23 near the second layer 22 is the silicon oxide layer 2A, and a fourth layer 24 near the third layer 23 is the metal oxide layer 2B. A fifth layer 25 near the fourth layer 24 is in contact with the substrate 1, and the fifth layer 25 is the silicon oxide layer 2A.

The metal oxide constituting the metal oxide layer 2B is a metal oxide containing any one of zirconium, tantalum, or titanium.

The silicon oxide layer 2A is constituted by any one of a low-density layer and a high-density layer having a density higher than the low-density layer. The silicon oxide layer 2A as the outermost layer 2S is a low-density layer. The silicon oxide layer 2A constituting the third layer 23 may be a low-density layer or a high-density layer having a density higher than the low-density layer. The silicon oxide layer 2A constituting the first layer 21 is a high-density layer.

Since the fluorine-containing organic silicon compound film 3 has a small thickness and the underlying silicon oxide layer 2A of the outermost layer 2S is a low-density layer, the insulation property is low. For this reason, electric charges which are generated on the surface of the fluorine-containing organic silicon compound film 3 can escape to the outside through a ground wire (not shown).

The density of the silicon oxide layer 2A or the surface roughness of the outermost layer 2S differs depending on the material of the metal oxide layer 2B.

When the metal oxide is zirconium oxide ($ZrO_2$), the density of the low-density silicon oxide layer 2A is equal to or higher than 2.00 g/cm$^3$ and equal to or lower than 2.20 g/cm$^3$. It will suffice that the density of the high-density silicon oxide layer 2A exceeds 2.20 g/cm$^3$. The surface roughness of the outermost layer 2S is equal to or greater than 0.65 nm and equal to or smaller than 0.80 nm.

The metal oxide layer 2B constituting the second layer 22 may be a low-density layer or a high-density layer. Similarly to the second layer 22, the metal oxide layer 2B constituting the fourth layer 24 may be a low-density layer or a high-density layer.

The low-density layer constituting the metal oxide layer 2B made of zirconium oxide has a density equal to or higher than 4.8 g/cm$^3$ and equal to or lower than 5.4 g/cm$^3$. It will suffice that the density of the high-density layer constituting the metal oxide layer 2B made of zirconium oxide exceeds 5.4 g/cm$^3$.

Although the second layer 22 to the fifth layer 25 may be low-density layers or high-density layers, in this embodiment, it is necessary that at least one of the third layer 23 and the fifth layer 25 other than the outermost layer 2S is a high-density layer. For example, the fifth layer 25 may be a high-density layer and other layers may be low-density layers.

The total thickness of the anti-reflection film 2 including the first layer 21 to the fifth layer 25 is equal to or smaller than 500 nm, and preferably, equal to or smaller than 400 nm.

When the metal oxide is tantalum oxide ($Ta_2O_5$), the density of the low-density silicon oxide layer 2A is equal to or higher than 2.00 g/cm$^3$ and equal to or lower than 2.15 g/cm$^3$. It will suffice that the density of the high-density silicon oxide layer 2A exceeds 2.15 g/cm$^3$. The surface roughness of the outermost layer 2S is equal to or greater than 0.55 nm and equal to or smaller than 0.65 nm.

The metal oxide layer 2B constituting the second layer 22 may be a low-density layer or a high-density layer. Similarly to the second layer 22, the metal oxide layer 2B constituting the fourth layer 24 may be a low-density layer or a high-density layer.

The low-density layer constituting the metal oxide layer 2B made of tantalum oxide has a density equal to or higher than 7.7 g/cm$^3$ and equal to or lower than 8.00 g/cm$^3$. It will suffice that the density of the high-density layer constituting the metal oxide layer 2B made of tantalum oxide exceeds 8.00 g/cm$^3$.

Although the second layer 22 to the fifth layer 25 may be low-density layers or high-density layers, in this embodiment, it is necessary that at least one of the third layer 23 and the fifth layer 25 other than the outermost layer 2S is a high-density layer. For example, the fifth layer 25 may be a high-density layer and other layers may below-density layers.

The total thickness of the anti-reflection film 2 including the first layer 21 to the fifth layer 25 is equal to or smaller than 500 nm, and preferably, equal to or smaller than 400 nm.

When the metal oxide is titanium oxide ($TiO_2$), the density of the low-density silicon oxide layer 2A is equal to or higher than 2.00 g/cm$^3$ and equal to or lower than 2.15 g/cm$^3$. It will suffice that the density of the high-density silicon oxide layer 2A exceeds 2.15 g/cm$^3$. The surface roughness of the outermost layer 2S is equal to or greater than 0.6 nm and equal to or smaller than 0.7 nm.

The metal oxide layer 2B constituting the second layer 22 may be a low-density layer or a high-density layer. Similarly to the second layer 22, the metal oxide layer 2B constituting the fourth layer 24 may be a low-density layer or a high-density layer.

The low-density layer constituting the metal oxide layer 2B made of titanium oxide has a density equal to or higher than 4.50 g/cm$^3$ and equal to or lower than 4.75 g/cm$^3$. It will suffice that the density of the high-density layer constituting the metal oxide layer 2B made of titanium oxide exceeds 4.75 g/cm³.

Although the second layer 22 to the fifth layer 25 may be low-density layers or high-density layers, in this embodiment, it is necessary that at least one of the third layer 23 and the fifth layer 25 other than the outermost layer 2S is a high-density layer. For example, the fifth layer 25 may be a high-density layer and other layers may be low-density layers.

The total thickness of the anti-reflection film 2 including the first layer 21 to the fifth layer 25 is equal to or smaller than 500 nm, and preferably, equal to or smaller than 400 nm.

Next, a method of manufacturing the dust-proof glass 10 will be described.

Figure 3:
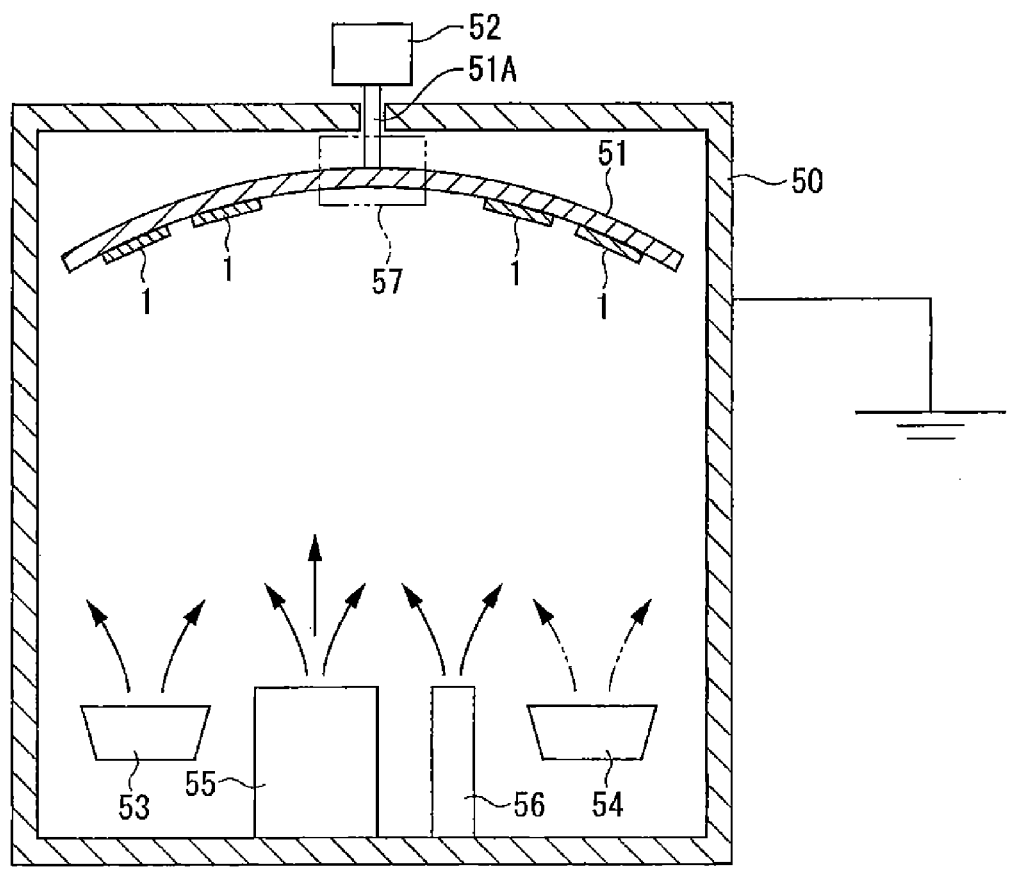
FIG. 3 is a schematic view of an apparatus for forming a film on a substrate.

FIG. 3 is a schematic view of an apparatus for forming a film on a substrate.

In FIG. 3, a film formation apparatus includes a grounded chamber 50, and a dome 51 which is rotatably supported at the ceiling of the chamber 50. The dome 51 is rotated by a motor 52 through a rotary shaft 51A provided at the central part thereof. A plurality of substrates 1 which are subjected to film formation are attached to the dome 51. A first deposition source 53 and a second deposition source 54 are provided at the lower part of the chamber 50 so as to be opposite the substrates 1. Silicon oxide is stored in the first deposition source 53, and metal oxide, such as zirconium oxide, tantalum oxide, or titanium oxide, is stored in the second deposition source 54.

An ion source 55 and an electron gun 56 are arranged between the first deposition source 53 and the second deposition source 54. Silicon oxide and zirconium oxide, tantalum oxide, or titanium oxide respectively stored in the first deposition source 53 and the second deposition source 54 are dissolved by irradiating electron beams.

The ion source 55 discharges ions for assistance. The electron gun 56 irradiates electron beams.

A monitoring device 57 is provided at the central part of the dome 51. The monitoring device 57 includes an optical monitor which manages the thickness of the film formed on the substrate 1, and a crystal monitor which performs rate management.

In forming the five-layer anti-reflection film 2 on the substrate 1 by using the film formation apparatus configured as above, the substrate 1 is set in the dome 51. Thereafter, the electron beams are irradiated from the electron gun 56 while rotating the dome 51 to deposit silicon oxide stored in the first deposition source 53 or zirconium oxide, tantalum oxide, or titanium oxide stored in the second deposition source 54. At this time, ionized oxygen is accelerated and irradiated from the ion source 55 to alternately form the silicon oxide layer 2A and the metal oxide layer 2B made of zirconium oxide, tantalum oxide, or titanium oxide on the substrate 1.

Assist power for forming the outermost layer 2S to the fourth layer 24 is low assist power with an acceleration voltage equal to or greater than 300 V and equal to or smaller than 450 V (acceleration current equal to or greater than 450 mA and equal to or smaller than 550 mA), regardless of the silicon oxide layer 2A and the metal oxide layer 2B. Assist power for forming the fifth layer 25 is high assist power with an acceleration voltage greater than 450 V, for example, 1000 V (acceleration current of 1200 my).

After the anti-reflection film 2 is formed on the substrate 1, the fluorine-containing organic silicon compound film 3 is formed on the anti-reflection film 2 as necessary.

In forming the fluorine-containing organic silicon compound film 3, the substrate 1 on which the anti-reflection film 2 is formed and the deposition sources are set inside a vacuum apparatus, and reduced-pressure evacuation is performed. Then, in a state where the temperature of the substrate 1 is maintained at 60° C., the deposition sources are heated to about 600° C., and a fluorine-containing organic silicon compound is evaporated and formed as a film on the anti-reflection film 2.

Second Embodiment

Next, a second embodiment will be described with reference to FIGS. 4 and 5.

In the second embodiment, an example will be described where an electronic apparatus is an imaging apparatus, such as a digital still camera, and an optical component which is incorporated into the imaging apparatus is an optical multi-layer filter.

Figure 4:
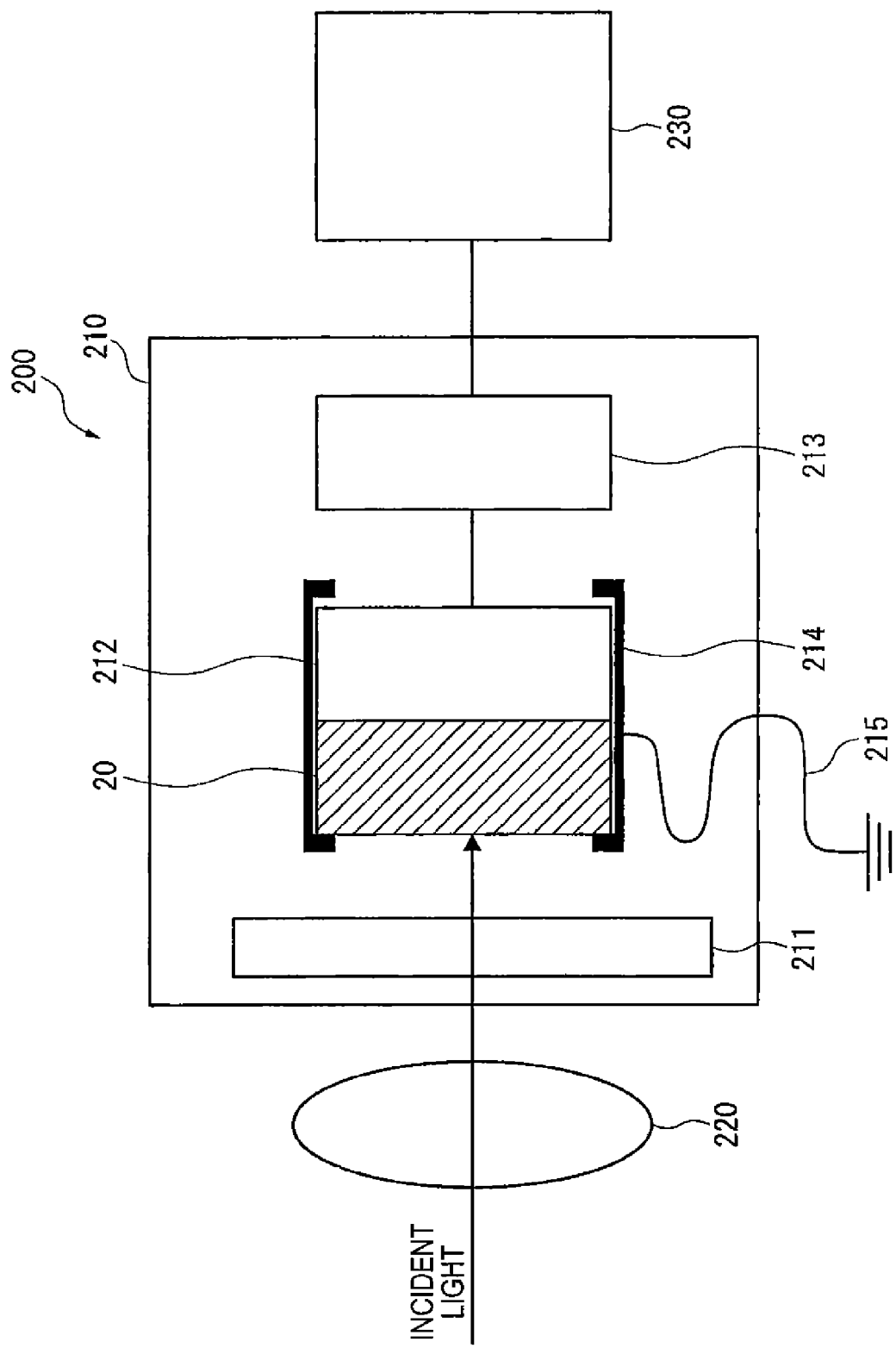
FIG. 4 is a schematic view showing an electronic apparatus according to a second embodiment of the invention.

FIG. 4 is a schematic configuration diagram of an imaging apparatus.

In FIG. 4, an imaging apparatus 200 includes an imaging module 210, a lens 220 which is arranged on the light incidence side, and a main body 230 which performs recording/reproduction of an imaging signal output from the imaging module 210. The main body 230 includes a signal processing section which performs correction or the like of the imaging signal, a recording section which records the imaging signal onto a recording medium, such as a magnetic tape, a reproducing section which reproduces the imaging signal, a display section which displays a video being reproduced, and the like.

The imaging module 210 includes an optical multilayer filter 20, an optical low-pass filter 211, a CCD (Charge Coupled Device) 212 serving as an imaging element which electrically converts an optical image, and a driving section 213 which drives the imaging element 212.

The optical multilayer filter 20 is combined with the CCD 212 as a single body at the front surface of the CCD 212 by a fixture 214. The optical multilayer filter 20 has a function of cutting IR and UV and a function as dust-proof glass for the CCD 212.

The fixture 214 is made of metal and electrically connected to the optical multilayer filter 20. The fixture 214 is grounded by a ground wire 215.

Figure 5:
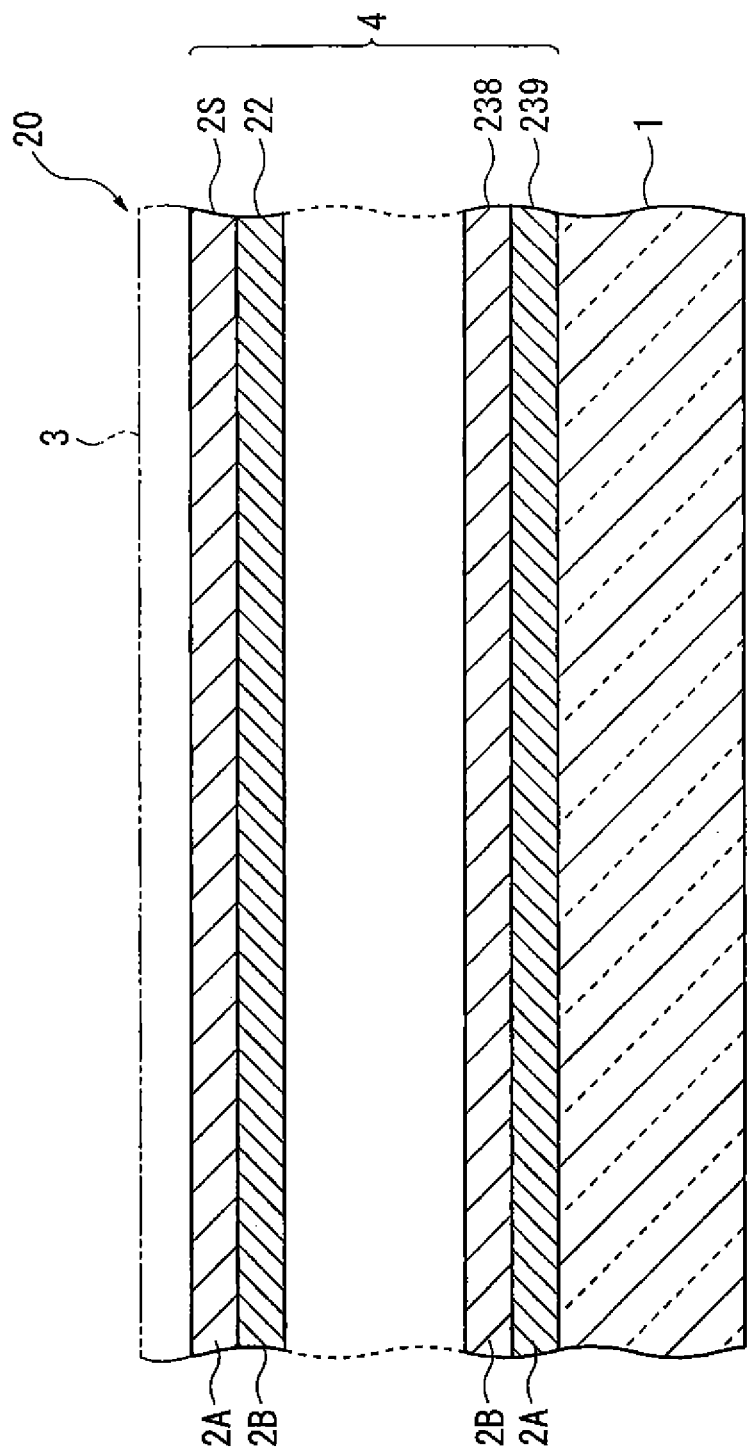
FIG. 5 is a schematic view of an optical component of the second embodiment.

FIG. 5 shows the schematic configuration of the optical multilayer filter 20.

In FIG. 5, the optical multilayer filter 20 is structured such that an IR-UV cut film 4 is provided on the light incidence surface of the substrate 1, and a fluorine-containing organic silicon compound film 3 is provided on the surface of the IR-UV cut film 4 as necessary. That is, the fluorine-containing organic silicon compound film 3 may or may not be provided on the surface of the IR-UV cut film 4.

The IR-UV cut film 4 has a 39-layer structure in which a low-refractive-index silicon oxide ($SiO_2$) layer 2A and a high-refractive-index metal oxide layer 2B are alternately laminated.

A first layer which is the furthest away from the substrate 1 is an outermost layer 2S, and the outermost layer 2S is constituted by the low-refractive-index silicon oxide layer 2A. The metal oxide layer 2B serving as a second layer 22 is provided to be in contact with the outermost layer 2S, and the silicon oxide layer serving as a third layer is provided near the second layer 22. A fourth layer constituted by the metal oxide layer is provided near the third layer. A fifth layer constituted by the silicon oxide layer is provided near the fourth layer. Finally, the metal oxide layer 2B constituting a 38th layer 238 is provided near the silicon oxide layer constituting a 37th layer. The silicon oxide layer 2A constituting a 39th layer 239 is provided near the 38th layer 238. The 39th layer 239 is in contact with the substrate 1.

The silicon oxide layer 2A is constituted by any one of a low-density layer and a high-density layer having a density higher than the low-density layer. At least the silicon oxide layer 2A of the outermost layer 2S is a low-density layer. The metal oxide layer 2B is constituted by any one of a low-density layer and a high-density layer having a density higher than the low-density layer.

Although in this embodiment, the sixth layer 26 to the 39th layer 239 may be low-density layers or high-density layers, it is necessary that at least one of the third layer 23 and the fifth layer 25 other than the outermost layer 2S is a low-density layer. For example, the fifth layer 25 may be a high-density layer and other layers may be low-density layers.

The total thickness of the IR-UV cut film 4 including the outermost layer 2S to the fifth layer is equal to or smaller than 500 nm, and preferably, equal to or smaller than 400 nm. In the second embodiment, an IR cut film, instead of the IR-UV cut film 4, may be provided on the substrate 1.

The density of the silicon oxide layer 2A and the surface roughness of the outermost layer 2S differ depending on the material of the metal oxide layer 2B.

When the metal oxide is zirconium oxide, the low-density silicon oxide layer 2A has a density equal to or higher than 2.00 g/cm$^3$ and equal to or lower than 2.20 g/cm$^3$. It will suffice that the density of the high-density silicon oxide layer 2A exceeds 2.20 g/cm$^3$.

In this embodiment, the outermost layer 2S is the low-density silicon oxide layer 2A, and the surface roughness thereof is equal to or greater than 0.65 nm and equal to or smaller than 0.80 nm.

The metal oxide layer 2B made of low-density zirconium oxide has a density equal to or higher than 4.80 g/cm$^3$ and equal to or lower than 5.4 g/cm$^3$. It will suffice that the density of the metal oxide layer 2B made of high-density titanium oxide exceeds 5.4 g/cm$^3$.

When the metal oxide is tantalum oxide, the low-density silicon oxide layer 2A has a density equal to or higher than 2.00 g/cm$^3$ and equal to or lower than 2.15 g/cm$^3$. It will suffice that the density of the high-density silicon oxide layer 2A exceeds 2.15 g/cm$^3$.

In this embodiment, the outermost layer 2S is the low-density silicon oxide layer 2A, and the surface roughness thereof is equal to or greater than 0.55 nm and equal to or smaller than 0.65 nm.

The metal oxide layer 2B made of low-density tantalum oxide has a density equal to or higher than 7.70 g/cm$^3$ and equal to or lower than 8.00 g/cm$^3$. It will suffice that the density of the metal oxide layer 2B made of high-density titanium oxide exceeds 8.00 g/cm$^3$.

When the metal oxide is titanium oxide, the low-density silicon oxide layer 2A has a density equal to or higher than 2.00 g/cm$^3$ and equal to or lower than 2.15 g/cm$^3$. It will suffice that the density of the high-density silicon oxide layer 2A exceeds 2.15 g/cm$^3$.

In this embodiment, the outermost layer 2S is the low-density silicon oxide layer 2A, and the surface roughness thereof is equal to or greater than 0.6 nm and equal to or smaller than 0.7 nm.

The metal oxide layer 2B made of low-density titanium oxide has a density equal to or higher than 4.50 g/cm$^3$ and equal to or lower than 4.75 g/cm$^3$. It will suffice that the density of the metal oxide layer 2B made of high-density titanium oxide exceeds 4.75 g/cm$^3$.

Next, a method of manufacturing the optical multilayer filter 20 will be described.

In manufacturing the optical multilayer filter 20, the IR-UV cut film 4 is formed on the substrate 1 by using the apparatus shown in FIG. 3.

In forming the 39-layer IR-UV cut film 4 on the substrate 1, the substrate 1 is set in the dome 51, and then the electron beams are irradiated from the electron gun 56 while rotating the dome 51 to deposit silicon oxide stored in the first deposition source 53 and zirconium oxide, tantalum oxide, or titanium oxide stored in the second deposition source 54. At this time, ionized oxygen is accelerated and irradiated from the ion source 55 to alternately form the silicon oxide layer 2A and the metal oxide layer 2B made of zirconium oxide, tantalum oxide, or titanium oxide on the substrate 1.

In the second embodiment, assist power for forming the fourth layer at the fourth from the outermost layer 2S is low assist power with an acceleration voltage equal to or greater than 300 V and equal to or smaller than 450 V (acceleration current equal to or greater than 450 mA and equal to or smaller than 550 mA), regardless of the silicon oxide layer 2A and the metal oxide layer 2B made of zirconium oxide, tantalum oxide, or titanium oxide. The fifth layer to the 39th layer 239 are formed with high assist power with an acceleration voltage greater than 450 V, for example, 1000 V (acceleration current of 1200 mV). In this embodiment, the fifth layer from the outermost layer 2S and subsequent layers, for example, the outermost layer 2S to the 39th layer 239 may be formed with low assist power.

In the second embodiment, the fluorine-containing organic silicon compound film 3 may be provided on the IR-UV cut film 4 formed on the substrate 1 as necessary. In this case, the same method as in the first embodiment is used.

Third Embodiment

Next, a third embodiment will be described with reference to FIG. 6.

In the third embodiment, an example will be described where an electronic apparatus is an optical pickup apparatus, and an optical component which is incorporated into the optical pickup apparatus is a beam splitter.

Figure 6:
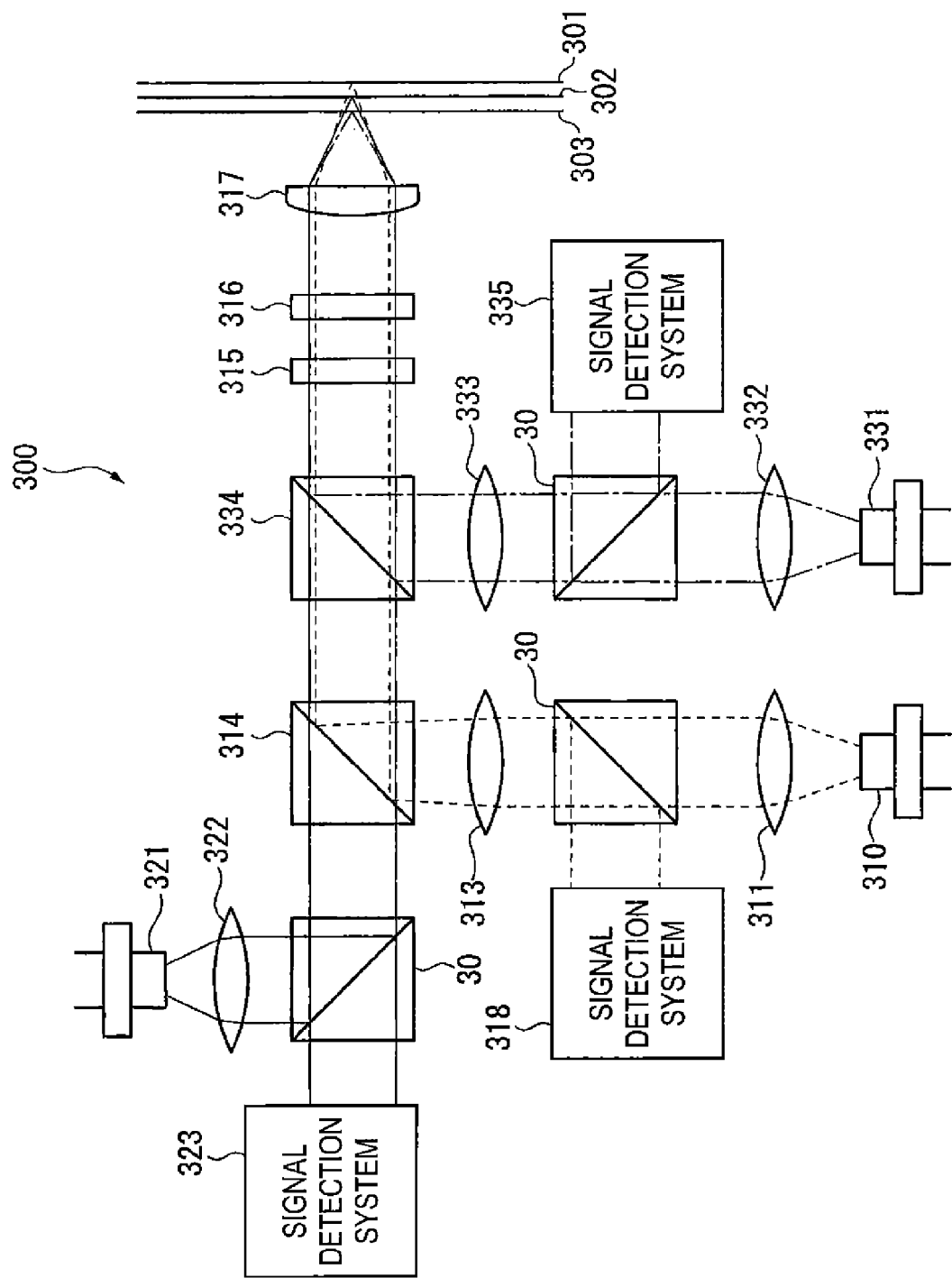
FIG. 6 is a schematic view showing an electronic apparatus according to a third embodiment of the invention.

FIG. 6 is a schematic configuration diagram of a recording and reproducing apparatus.

In FIG. 6, an optical pickup 300 is configured so as to irradiate three kinds of laser beams having different wavelengths onto three kinds of optical disks (CD 301, DVD 302, and BD 303) having different focal positions and to detect predetermined signals.

Specifically, the optical pickup 300 includes, as an optical system in relation to the CD 301, a laser diode 310 which generates a laser beam, a collimator lens 311, a polarization beam splitter 30, a lens 313, a dichroic prism 314, a quarter-wave plate 315, an opening filter 316, an objective lens 317, and a signal detection system 318 which detects a signal read from the CD 301 by a laser beam.

The optical pickup 300 includes, as an optical system in relation to the DVD 302, an LD 321 which generates a laser beam, a lens 322, a polarization beam splitter 30, and a signal detection system 323 which detects a signal read from the DVD 302 by a laser beam.

The optical pickup 300 includes, as an optical system in relation to the BD 303, an LD 331 which generates a laser beam, a lens 332, a polarization beam splitter 30, a lens 333, a dichroic prism 334, and a signal detection system 335 which detects a signal read from the BD 303 by a laser beam.

The schematic configuration of the polarization beam splitter 30 is the same as the dust-proof glass 10 shown in FIG. 2, except for the shape of the substrate 1. That is, the polarization beam splitter 30 is structured such that an anti-reflection film 2 is provided on the substrate 1, and a fluorine-containing organic silicon compound film 3 is provided on the surface of the anti-reflection film 2 as necessary. The method of forming the anti-reflection film 2 on the substrate 1 and forming the fluorine-containing organic silicon compound film 3 on the anti-reflection film 2 is the same as in the first embodiment.

EXAMPLES

Examples of this embodiment will be described. First, examples of an optical component having a zirconium oxide layer and a silicon oxide layer will be described.

Optical Component Having Zirconium Oxide Layer and Silicon Oxide Layer

Examples 1 to 4, Comparative Examples 1 to 10, and Reference Examples 1 and 2 corresponding to the optical component according to the first embodiment of the invention will be described. With regard to a deposition experiment, a deposition instrument (product name: SID-1350) manufactured by SHINCRON Co., Ltd. was used. In the experiment, an anti-reflection film was manufactured on the surface of a sample having a predetermined shape, for example, white plate glass (refractive index n=1.52) having a diameter of 30 mm and a thickness of 0.3 mm under the conditions of Examples and Comparative Examples.

Example 1

In Example 1, the anti-reflection film 2 is formed on the substrate 1, and no fluorine-containing organic silicon compound film 3 is provided.

The layer configuration of the anti-reflection film 2 of Example 1 is shown in Tables 1 to 3. In Tables, the outermost layer 2S is the silicon oxide layer 2A which is a low-density layer having a density of 2.069 g/cm$^3$ and a refractive index n of 1.449. The thickness of the outermost layer 2S is 84.5 nm, and the optical film thickness is 1.449×84.5 nm=122.1105 nm. The relative value 4nd of the optical film thickness to a design wavelength (in Example 1, 510 nm) (hereinafter, simply referred to as the relative value to the design wavelength) is 0.977. That is, in design for an optical thin-film, since ¼ of the design wavelength is used as a basis, the value of the optical thin-film nd to the relevant value becomes 0.963. The second layer 22 is the metal oxide layer 2B which is a low-density layer having a density of 5.17 g/cm$^3$ and made of zirconium oxide having a refractive index n of 1.977. The thickness of the second layer 22 is 98.8 nm, and the relative value 4nd to the design wavelength is 1.534. The third layer 23 is the silicon oxide layer 2A which is a low-density layer having a density of 2.069 g/cm$^3$ and a refractive index n of 1.449. The thickness of the third layer is 18.4 nm, and the relative value 4nd to the design wavelength is 0.210. The fourth layer 24 is the metal oxide layer 2B which is a low-density layer having a density of 5.17 g/cm$^3$ and made of zirconium oxide having a refractive index n of 1.977. The thickness of the fourth layer 24 is 20.2 nm, and the relative value 4nd to the design wavelength is 0.313. The fifth layer 25 is the silicon oxide layer 2A which is a high-density layer having a density of 2.213 g/cm$^3$ and a refractive index n of 1.481. The thickness of the fifth layer 25 is 172.5 nm, and the relative value 4nd to the design wavelength is 1.985. The total thickness of the outermost layer 2S to the fifth layer 25 is 394.3 nm.

In forming the anti-reflection film 2 configured as above on the substrate 1, in Example 1, the outermost layer 2S to the fourth layer 24 are formed through ion-assisted electron beam deposition (IAD) with low assist power. The film formation temperature is 150° C. When a low-density layer is formed as the silicon oxide layer 2A, the vacuum pressure is $1.8 \times 10^{-2}$ Pa, and assist power has an acceleration voltage of 300 V and an acceleration current 450 mA. When the metal oxide layer 2B is formed of zirconium oxide, the vacuum pressure is $1.8 \times 10^{-2}$ Pa, and assist power has an acceleration voltage of 300 V and an acceleration current of 450 mA. Thus, the surface roughness of the outermost layer 2S is in a range of 0.65 nm to 0.75 nm. The fifth layer 25 is formed through ion-assisted electron beam deposition (IAD) with high assist power. In this case, assist power has an acceleration voltage of 1000 Vm and an acceleration current of 1200 mA.

Example 2

Example 2 is different from Example 1 in that the fluorine-containing organic silicon compound film 3 is formed on the anti-reflection film 2.

With regard to the fluorine-containing organic silicon compound film 3, for example, as a deposition source, a material is used which is obtained by diluting a fluorine-containing organic silicon compound (product name: KY-130) manufactured by Shin-Etsu Chemical Co., Ltd. with a fluorine-based solvent (manufactured by Sumitomo 3M Ltd.: Novec HFE-7200) to prepare a solution having a solid content concentration of 3%, impregnating 1 g of the solution into a porous ceramic pellet, and performing drying.

Example 3

Example 3 is different from Example 1 in terms of assist power for forming a low-density layer. That is, in Example 3, assist power is low assist power with an acceleration voltage of 400 V and an acceleration current of 500 mA. For this reason, the low-density layers constituting the silicon oxide layer 2A serving as the outermost layer 2S and the third layer 23 have a density of 2.086 g/cm$^3$. The low-density layers constituting the second layer 22 and the fourth layer 24, that is, the metal oxide layers 2B made of zirconium oxide have a density of 5.23 g/cm$^3$. The density of the fifth layer 25 is the same as in Example 1.

Example 4

Example 4 is different from Example 3 in that the fluorine-containing organic silicon compound film 3 is provided on the anti-reflection film 2.

Comparative Example 1

Comparative Example 1 is different from Example 1 in terms of assist power for forming a low-density layer. That is, in Comparative Example 1, the outermost layer 2S to the fourth layer 24 are formed through ion-assisted electron beam deposition (IAD) with intermediate assist power having an acceleration voltage of 600 V and an acceleration current of 700 mA. For this reason, the low-density layers constituting the silicon oxide thin-film serving as the outermost layer and the third layer have a density of 2.172 g/cm$^3$, and the low-density layers constituting the second layer and the fourth layer, that is, the metal oxide layers 2B made of zirconium oxide have a density of 5.36 g/cm$^3$. In Comparative Example 1, the surface roughness of the outermost layer is 0.77 nm to 0.85 nm, which is greater than in Examples 1 to 4.

Comparative Example 2

Comparative Example 2 is different from Comparative Example 1 in that a fluorine-containing organic silicon compound film is provided on an anti-reflection film.

Comparative Example 3

Comparative Example 3 is different from Example 1 in terms of assist power for forming a low-density layer. That is, in Comparative Example 3, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide thin-film serving as the outermost layer and the third layer have a density of 2.201 g/cm$^3$, and the low-density layers constituting the second layer and the fourth layer, that is, the metal oxide layers 2B made of zirconium oxide have a density of 5.41 g/cm$^3$. In Comparative Example 3, the surface roughness of the outermost layer is 0.77 nm to 0.85 nm, which is greater than in Examples 1 to 4.

Comparative Example 4

Comparative Example 4 is different from Comparative Example 3 in that a fluorine-containing organic silicon compound film is formed on an anti-reflection film.

Comparative Example 5

Comparative Example 5 is different from Example 1 in terms of assist power for forming a low-density layer. That is, in Comparative Example 5, all layers are formed through ion-assisted electron beam deposition (IAD) with high assist power having an acceleration voltage of 1000 V and an acceleration current of 1200 mA. For this reason, the low-density layers constituting the silicon oxide thin-film serving as the outermost layer and the third layer have a density of 2.213 g/cm$^3$, and the low-density layers constituting the second layer and the fourth layer, that is, the metal oxide layers 2B made of zirconium oxide have a density of 5.45 g/cm$^3$. In Comparative Example 5, the surface roughness of the outermost layer is 0.80 nm to 0.90 nm, which is greater than in Examples 1 to 4.

Comparative Example 6

Comparative Example 6 is different from Comparative Example 5 in that a fluorine-containing organic silicon compound film is provided on an anti-reflection film.

Comparative Example 7

Comparative Example 7 has the same layer configuration as in Example 1, but electron deposition (EB) is used as the method of forming the outermost layer. The film formation temperature is 200° C. The vacuum pressure at the time of forming silicon oxide is 8.0×10$^{-3}$ Pa, and the vacuum pressure at the time of forming zirconium oxide is 5.0×10$^{-3}$ Pa. For this reason, the density of the silicon oxide layer is 2.037 g/cm$^3$, and the density of the metal oxide layer made of zirconium oxide is 7.52 g/cm$^3$. In Comparative Example 7, the surface roughness of the outermost layer is 0.95 nm to 1.200 nm, which is greater than in Examples 1 to 4.

Comparative Example 8

Comparative Example 8 is different from Comparative Example 7 in that a fluorine-containing organic silicon compound film is provided on an anti-reflection film.

Comparative Example 9

In Comparative Example 9, an anti-reflection film includes an outermost layer constituted by a silicon oxide layer having a thickness of 86.0 nm, a second layer constituted by a titanium oxide thin-film having a thickness of 102.7 nm, a third layer constituted by a silicon oxide thin-film having a thickness of 30.6 nm, a fourth layer constituted by a titanium oxide thin-film having a thickness of 12.1 nm, and a fifth layer constituted by a silicon oxide thin-film having a thickness of 136.6 nm. The layer configuration of Comparative Example 9 is shown in Table 4. In Comparative Example 9 having this layer configuration, film formation was performed by the same method as described in Japanese Patent No. 4207083. That is, in Comparative Example 9, the outermost layer is formed by electron deposition (EB) without using ion assist, and the layers other than the outermost layer are formed by the same film formation method as in Comparative Example 5. The second layer to the fifth layer were formed through ion-assisted electron beam deposition (IAD) with high assist power having an acceleration voltage of 1000 V and an acceleration current of 1200 mA. The film formation temperature is 200° C. The vacuum pressure at the time of forming silicon oxide is 8.0×10$^{-3}$ Pa, and the vacuum pressure at the time of forming titanium oxide is 1.5×10$^{-2}$ Pa. For this reason, the density of the silicon oxide thin-film is 2.037 g/cm$^3$, and the density of the titanium oxide thin-film is 4.87 g/cm$^3$. In Comparative Example 9, the surface roughness of the outermost layer is 0.80 nm to 0.95 nm, which is greater than in Examples 1 to 4.

Comparative Example 10

Comparative Example 10 is different from Comparative Example 9 in that a fluorine-containing organic silicon compound film is provided on an anti-reflection film.

Reference examples related to the invention will be described.

Reference Example 1

Reference Example 1 is different from Example 1 in that the layer configuration is as shown in Table 4, similarly to Comparative Example 9. Meanwhile, with regard to the film formation method, similarly to Example 1, the outermost layer to the fourth layer were formed through ion-assisted electron beam deposition (IAD) with low assist power, and the fifth layer was formed through ion-assisted electron beam deposition (IAD) with high assist power. In Reference Example 1, the surface roughness of the outermost layer is 0.6 nm to 0.7 nm, which is smaller than in Examples 1 to 4.

Reference Example 2

Reference Example 2 is different from Reference Example 1 in that a fluorine-containing organic silicon compound film is provided on an anti-reflection film.

With the above, it can be seen that the surface roughness of the outermost layer corresponds to assist power at the time of forming the outermost layer. That is, in Examples 1 to 4, the outermost layer is formed with low assist power having an acceleration voltage of 300 V to 400 V (acceleration current of 450 mA to 500 mA), such that the surface roughness of the outermost layer becomes 0.55 nm to 0.65 nm. Meanwhile, in Comparative Examples 1 to 4, the outermost layer is formed with intermediate assist power having an acceleration voltage of 600 V to 800 V (acceleration current of 700 mA to 900 mA), such that the surface roughness of the outermost layer becomes 0.6 nm to 0.7 nm or 0.62 nm to 0.75 nm. In Comparative Examples 5 and 6, the outermost layer is formed with high assist power having an acceleration voltage of 1000 V (acceleration current of 1200 mA), such that the surface roughness of the outermost layer becomes 0.65 nm to 0.75 nm. In Reference Examples 1 and 2, while film formation is performed with the same assist power as in Examples 1 and 2, unlike Examples 1 and 2, since an even-numbered layer is a titanium oxide thin-film, the surface roughness becomes 0.6 nm to 0.7 nm. In Examples 1 and 2, the good surface roughness is obtained because of the properties of the materials, such as atomic weight compared to Reference Examples 1 and 2.

TABLE 1

| Layer | Material | d (nm) | 4nd |
|---|---|---|---|
| Incidence Medium | Air | | |
| Outermost Layer | $SiO_2$ | 84.5 | 0.963 |
| Second Layer | $ZrO_2$ | 98.8 | 1.534 |
| Third Layer | $SiO_2$ | 18.4 | 0.210 |
| Fourth Layer | $ZrO_2$ | 20.2 | 0.313 |
| Fifth Layer | $SiO_2$ | 172.5 | 1.985 |
| Emergence Medium | Glass | | | n is a refractive index
total film thickness: 394.33 nm
design wavelength: 510 nm

TABLE 2

| | Film Formation Method of First to Fourth Layers | Film Formation Temperature | Odd-Numbered Layer ($SiO_2$) Rate (Å/sec) | Odd-Numbered Layer ($SiO_2$) Vacuum Pressure ($O_2$) | Odd-Numbered Layer ($SiO_2$) Assist Power | Odd-Numbered Layer ($SiO_2$) Density (g/cm³) | Odd-Numbered Layer ($SiO_2$) Refractive Index (at 550 nm) |
|---|---|---|---|---|---|---|---|
| Example 1, 2 | IAD | 150° C. | 7 | 1.8E−2 Pa | 300 V 450 mA | 2.069 | 1.449 |
| Example 3, 4 | IAD | 150° C. | 7 | 1.8E−2 Pa | 400 V 500 mA | 2.086 | 1.453 |
| Comparative Example 1, 2 | IAD | 150° C. | 7 | 1.8E−2 Pa | 600 V 700 mA | 2.172 | 1.461 |
| Comparative Example 3, 4 | IAD | 150° C. | 7 | 1.8E−2 Pa | 800 V 900 mA | 2.201 | 1.473 |
| Comparative Example 5, 6 | IAD | 150° C. | 7 | 1.8E−2 Pa | 1000 V 1200 mA | 2.213 | 1.481 |
| Comparative Example 7, 8 | EB | 200° C. | 7 | 8.0E−3 Pa | — | 2.037 | 1.44 |
| Comparative Example 9, 10 | EB | 200° C. | 7 | 8.0E−3 Pa | — | 2.037 | 1.44 |
| Reference Example 1, 2 | IAD | 150° C. | 7 | 1.8E−2 Pa | 300 V 450 mA | 2.069 | 1.449 |

TABLE 3

| | Film Formation Method of First to Fourth Layers | Film Formation Temperature | Even-Numbered Layer Rate (Å/sec) | Even-Numbered Layer Vacuum Pressure ($O_2$) | Even-Numbered Layer Assist Power | Even-Numbered Layer Density (g/cm³) | Even-Numbered Layer Refractive Index (at 550 nm) | Surface Roughness (nm) | Surface Resistance (Ω/□) |
|---|---|---|---|---|---|---|---|---|---|
| Example 1, 2 | IAD | 150° C. | 3 | 1.8E−2 Pa | 300 V 450 mA | 5.17 | 1.977 | 0.6 to 0.7 | 9.12E+09 |
| Example 3, 4 | IAD | 150° C. | 3 | 1.8E−2 Pa | 400 V 500 mA | 5.23 | 1.985 | 0.6 to 0.7 | 1.77E+10 |
| Comparative Example 1, 2 | IAD | 150° C. | 3 | 1.8E−2 Pa | 600 V 700 mA | 5.36 | 2.009 | 0.62 to 0.72 | 8.58E+10 |
| Comparative Example 3, 4 | IAD | 150° C. | 3 | 1.8E−2 Pa | 800 V 900 mA | 5.41 | 2.026 | 0.68 to 0.78 | 2.12E+12 |
| Comparative Example 5, 6 | IAD | 150° C. | 3 | 1.8E−2 Pa | 1000 V 1200 mA | 5.45 | 2.042 | 0.7 to 0.8 | 1.00E+15 |
| Comparative Example 7, 8 | EB | 200° C. | 3 | 5.0E−3 Pa | — | 4.98 | 1.942 | 0.85 to 1.0 | 6.32E+11 |
| Comparative Example 9, 10 | IAD | 200° C. | 3 | 2.1E−2 Pa | 1000 V 1200 mA | 4.87 | 2.489 | 0.8 to 0.95 | 8.16E+12 |
| Reference Example 1, 2 | IAD | 150° C. | 3 | 2.1E−2 Pa | 300 V 450 mA | 4.65 | 2.466 | 0.6 to 0.7 | 5.77E+10 |

TABLE 4

| Layer | Material | d (nm) | 4nd |
|---|---|---|---|
| Incidence Medium | Air | | |
| Outermost Layer | SiO$_2$ | 86.0 | 0.979 |
| Second Layer | TiO$_2$ | 102.7 | 2.014 |
| Third Layer | SiO$_2$ | 30.6 | 0.349 |
| Fourth Layer | TiO$_2$ | 12.1 | 0.237 |
| Fifth Layer | SiO$_2$ | 136.6 | 1.573 |
| Emergence Medium | Glass | | | n is a refractive index
total film thickness: 367.9 nm
design wavelength: 510 nm Experiment Result 1 Measurement of Surface Resistance (Sheet Resistance)

Figure 7A:
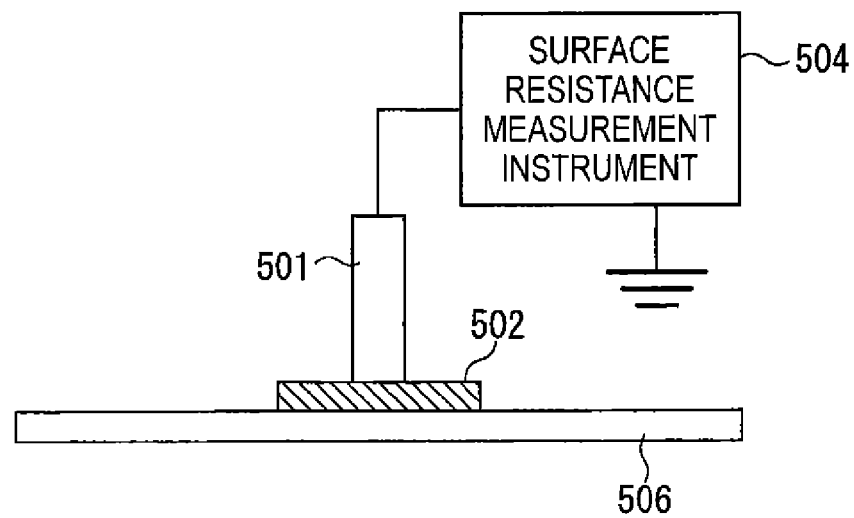
FIG. 7A is a schematic view of a surface resistance measurement instrument.

In measuring the surface resistance, a surface resistance measurement instrument 504 shown in FIG. 7A is used. The surface resistance measurement instrument 504 is Hiresta UP MCP-HT45 manufactured by Mitsubishi Chemical Corporation. The surface resistance measurement instrument 504 is configured such that a probe 501 comes into contact with the surface of a sample 502 of a filter. A stage 506 on which the sample 502 is placed is made of Teflon (Registered Trademark). The measurement condition is 1000 V and 30 sec. In the measurement environment, the moisture is 55%±15%, and the temperature is 25° C.±3° C.

With regard to Examples, Comparative Examples, and Reference Examples, the surface resistance of the sample was measured. The results are shown in Table 3. As shown in Table 3, it can be seen that, in Examples 1 to 4, the surface resistance is low compared to Comparative Examples 5 to 8. The low surface resistance means that adhesion of dust or grit to the surface due to static electricity is reduced.

2 Relationship Between Surface Resistance and Total Thickness

Figure 8:
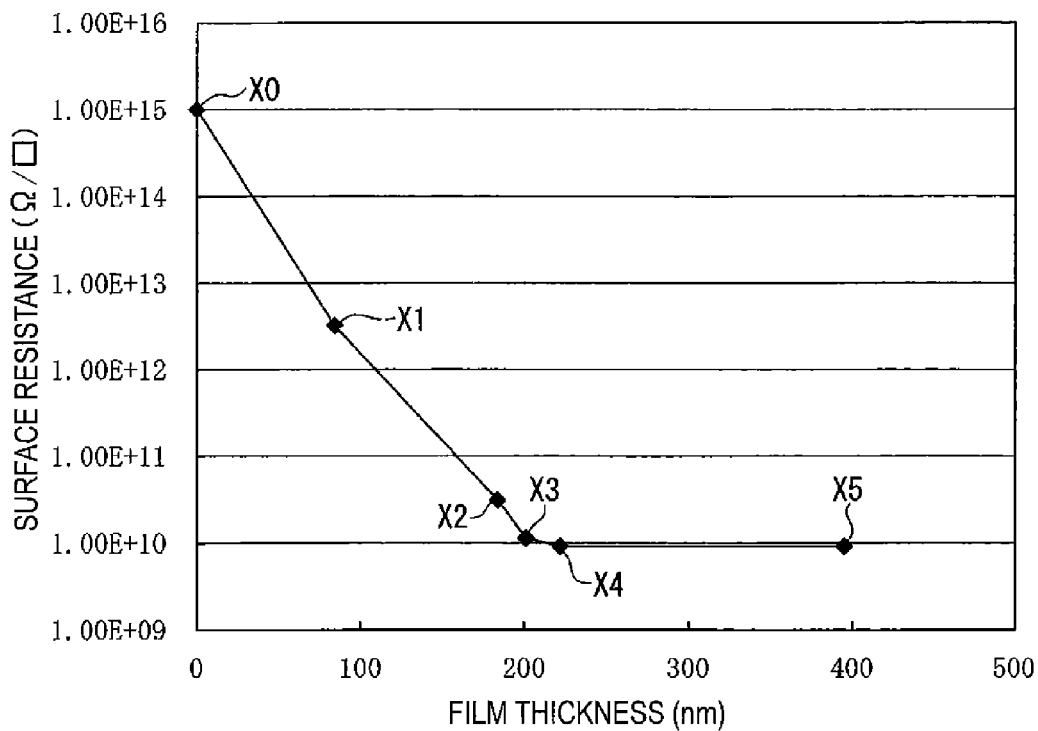
FIG. 8 is a graph showing the relationship between a film thickness and surface resistance in Example 1.

FIG. 8 shows the relationship between a film thickness and surface resistance in Example 1.

In FIG. 8, X0 is surface resistance ($1.0 \times 10^{15} \Omega/\square$) when all layers are formed through electron beam deposition with high assist power. X1 is surface resistance ($3.17 \times 10^{12} \Omega/\square$) when only the outermost layer having a thickness of 84.5 nm is formed through electron beam deposition with low assist power (an acceleration voltage is 300 V and an acceleration current is 450 mV). X2 is surface resistance ($3.13 \times 10^{10} \Omega/\square$) when the outermost layer and the second layer are formed through electron beam deposition with low assist power. X3 is surface resistance ($1.11 \times 10^{10} \Omega/\square$) when the outermost layer to the third layer are formed through electron beam deposition with low assist power. X4 is surface resistance ($9.12 \times 10^{9} \Omega/\square$) when the outermost layer to the fourth layer are formed through electron beam deposition with low assist power. X5 is surface resistance ($9.09 \times 10^{9} \Omega/\square$) when all layers are formed through electron beam deposition with low assist power. As shown in FIG. 8, it can be seen that, when two or more layers including the outermost layer are bonded to each other through electron beam deposition with low assist power, the value of surface resistance is reduced. It can also be seen that, when the outermost layer to the fourth layer are formed through electron beam deposition with low assist power and when all layers (five layers) including the outermost layer are formed through electron beam deposition with low assist power, the value of surface resistance is not changed so much. For this reason, in this example, it will suffice that the outermost layer to the fourth layer (film thickness 221.9 nm) are formed through electron beam deposition with low assist power.

3 Charge-Through

Figure 7B:
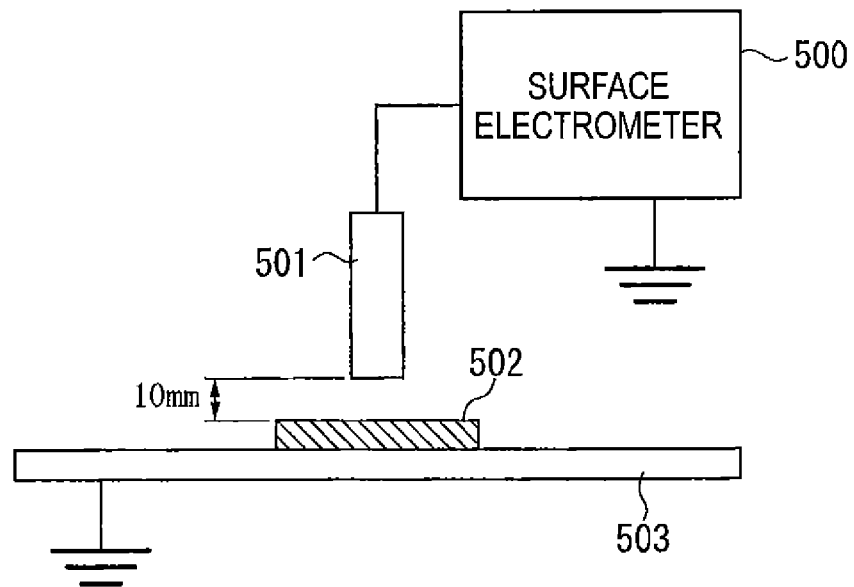
FIG. 7B is a schematic view of a surface electrometer.
Figure 9:
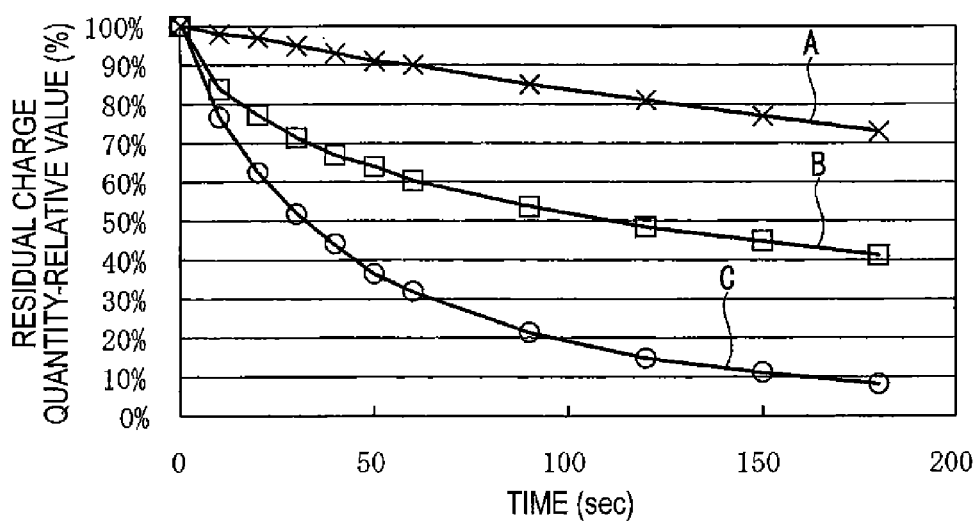
FIG. 9 is a graph showing the relationship between time and a residual charge quantity in Example 1, Comparative Example 5, and Comparative Example 7.

With regard to charge-through, the outermost layer of the sample is frictionally charged, and the residual charge quantity (relative value) in the outermost layer is displayed over time. The charge-through is shown in FIG. 9. In FIG. 9, a graph A shows Comparative Example 5, a graph B shows Comparative Example 7, and a graph C shows Example 1. For the measurement of surface charges, a surface electrometer 500 shown in FIG. 7B is used. The surface electrometer 500 is Model 341 manufactured by TREK JAPAN Co., Ltd. The surface electrometer 500 is configured such that the distance between a probe 501 and the surface of a sample 502 of a filter is 10 mm. A stage 503 on which the sample 502 is placed is made of metal. The measurement is performed in a state of being grounded. In the measurement environment, the moisture is 55%±5%, and the temperature is 25° C.±3° C.

As shown in FIG. 9, in the graph C of Example 1, the residual charge quantity over time is small compared to the graph A of Comparative Example 5 or the graph B of Comparative Example 7. As a result, it can be seen that, in Example 1, dust or grit is less likely to adhere to the surface compared to Comparative Example 5 or Comparative Example 7.

4 Dust-Proof Performance

A dust-proof performance test was performed by 4-1 polyethylene powder method, 4-2 Kanto loam method, and 4-3 cotton linter method.

4-1 Polyethylene Powder Method

In the case of the polyethylene powder method, a sample is dropped onto polyethylene powder (manufactured by SEISHIN Co., Ltd: SK-PE-20L) on a tray from above 1 cm and is then gradually moved up, and the adhered dust quantity and the residual quantity of powder adhered to the sample are measured. The adhered dust quantity is obtained by simply wiping the sample with powder adhered, imaging the surface of the sample, and calculating the dust area through image analysis. The residual quantity is obtained by removing dust from the surface of the sample with powder adhered through air blow (the distance from the sample is 3 cm, pressure is about 50 KPa, and the number of blows is three), imaging the surface of the sample, and calculating the dust area through image analysis.

4-2 Kanto Loam Method

In the case of the Kanto loam method, powder (JIS test powder 1, seven types) which is standardized by JIS assuming dust on road and in the field is used for a test. In this case, a sample is dropped onto powder covered on a tray, dust is dropped, the sample is turned over and flicked twice, and the adhered dust quantity and the residual quantity of powder adhered to the sample are measured. The methods of obtaining the adhered dust quantity and the residual quantity are the same as in the polyethylene powder method.

4-3 Cotton Linter Method

In the case of the cotton linter method, textile dust called cotton linter on a tray is used for a test. In this case, a sample is dropped onto powder covered on the tray, dust is dropped, the sample is turned over and flickered twice, and the adhered dust quantity and the residual quantity of powder adhered to the sample are measured. The methods of obtaining the adhered dust quantity and the residual quantity are the same as in the polyethylene powder method.

The results of dust-proof performance by these methods are shown in Table 5.

Table 5 shows the results of the methods of 4-1 polyethylene powder method, 4-2 Kanto loam method, and 4-3 cotton linter method.

As shown in Table 5, it can be seen that, when the polyethylene powder method is used, the adhered dust quantity and the residual quantity in Examples 1 and 3 are small compared to Comparative Examples 1, 3, 5, 7, and 9 or Reference Example 1. It can also be seen that, in Examples 2 and 4, the adhered dust quantity and the residual quantity are small compared to Comparative Examples 2, 4, 6, 8, and 10 or Reference Example 2. As described above, it is thought that the adhered dust quantity and the residual quantity in Examples 1 and 3 are small compared to Reference Example 1, and the adhered dust quantity and the residual quantity in Examples 2 and 4 are small compared to Reference Example 2 because Zr has small electronegativity compared to Ti.

The electronegativity numerically indicates the ability that the bonded atoms in the molecules attract electrons. Although any method is used to obtain the numerical value, the numerical value is in general obtained by a Pauling's method. With regard to the electronegativity by the Pauling's method, Zr has a value of 1.33 smaller than 1.54 of Ti. The electronegativity can be interpreted as minimum energy necessary for separating foreign particles from the surface. For this reason, the use of oxide containing an element having small electronegativity enables improvement in dust-proof performance.

With regard to Examples and Comparative Examples, it can be seen that the adhered dust quantity and the residual quantity in Examples 2 and 4, Comparative Examples 2, 4, 6, 8, and 10, and Reference Example 2 where the fluorine-containing organic silicon compound film 3 is provided are small compared to Examples 1 and 3, Comparative Examples 1, 3, 5, 7, and 9, and Reference Example 1 where no fluorine-containing organic silicon compound film 3 is provided. In the case of the Kanto loam method and the cotton linter method, similarly to the polyethylene powder method, with regard to Examples, Comparative Examples, and Reference Examples, it can be seen that the adhered dust quantity and the residual quantity in Examples 1 and 2 are small compared to Comparative Examples 1 to 10 or Reference Examples 1 and 2. It can also be seen that the adhered dust quantity and the residual quantity in Examples 2 and 4, Comparative Examples 2, 4, 6, 8, and 10, and Reference Example 2 where fluorine-containing organic silicon compound film 3 is provided are small compared to Examples 1 and 3, Comparative Examples 1, 3, 5, 7, and 9, and Reference Example 1 where no fluorine-containing organic silicon compound film 3 is provided. The above results are obtained because the fluorine-containing organic silicon compound film reduces surface energy, and dust or grit is less likely to adhere to the surface.

TABLE 5

| | Film Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
| | | | | | Adhered dust quantity | Residual Quantity | Adhered dust quantity | Residual Quantity | Adhered dust quantity | Residual Quantity |
| Example 1 | IAD | 300 | 450 | None | 0.11% | 0.01% | 0.12% | 0.01% | 1.87% | 0.23% |
| Example 2 | IAD | 300 | 450 | Provided | 0.01% | 0.00% | 0.01% | 0.00% | 0.54% | 0.01% |
| Example 3 | IAD | 400 | 500 | None | 0.12% | 0.00% | 0.14% | 0.01% | 1.94% | 0.27% |
| Example 4 | IAD | 400 | 500 | Provided | 0.05% | 0.01% | 0.02% | 0.00% | 0.68% | 0.02% |
| Comparative Example 1 | IAD | 600 | 700 | None | 0.34% | 0.05% | 0.38% | 0.11% | 2.12% | 0.36% |
| Comparative Example 2 | IAD | 600 | 700 | Provided | 0.06% | 0.01% | 0.09% | 0.02% | 0.85% | 0.03% |
| Comparative Example 3 | IAD | 800 | 900 | None | 1.15% | 0.22% | 0.81% | 0.15% | 2.95% | 0.65% |
| Comparative Example 4 | IAD | 800 | 900 | Provided | 0.11% | 0.02% | 0.58% | 0.09% | 1.77% | 0.11% |
| Comparative Example 5 | IAD | 1000 | 1200 | None | 2.15% | 0.31% | 0.98% | 0.22% | 4.41% | 0.78% |
| Comparative Example 6 | IAD | 1000 | 1200 | Provided | 0.47% | 0.11% | 0.67% | 0.15% | 2.12% | 0.19% |
| Comparative Example 7 | EB | 0 | 0 | None | 0.33% | 0.05% | 0.52% | 0.07% | 2.43% | 0.40% |
| Comparative Example 8 | EB | 0 | 0 | Provided | 0.11% | 0.02% | 0.34% | 0.03% | 0.98% | 0.05% |
| Comparative Example 9 | EB | 0 | 0 | None | 7.74% | 1.34% | 1.06% | 0.09% | 3.82% | 0.81% |
| Comparative Example 10 | EB | 0 | 0 | Provided | 0.93% | 0.12% | 12.90% | 5.92% | 4.58% | 0.35% |
| Reference Example 1 | IAD | 300 | 450 | None | 3.78% | 0.59% | 0.29% | 0.02% | 2.87% | 0.63% |
| Reference Example 2 | IAD | 300 | 450 | Provided | 0.16% | 0.01% | 0.19% | 0.01% | 1.84% | 0.14% |

Next, Examples 5 to 8, Comparative Examples 11 to 20, and Reference Examples 3 and 4 corresponding to the optical component according to the second embodiment of the invention will be described. With regard to the deposition experiment, similarly to the experiment of Examples 1 to 4, Comparative Examples 1 to 10, and Reference Examples 1 and 2, the deposition instrument manufactured by SHINCRON Co., Ltd. was used to manufacture an anti-reflection film on the surface of white plate glass having a predetermined shaped under the conditions of Examples and Comparative Examples.

Example 5

In Example 5, the IR-UV cut film 4 is formed on the substrate 1, and no fluorine-containing organic silicon compound film 3 is provided.

The layer configuration of the IR-UV cut film 4 of Example 5 is shown in Tables 6 to 10. Table 6 shows the relationship between the material of each layer and the film thickness.

Tables 7 and 8 show the film formation condition of the outermost layer, and the like. Tables 9 and 10 show the film formation conditions of the fifth layer to the 39th layer, and the like.

In Tables 6 to 8, the outermost layer 2S is the silicon oxide layer 2A which is a low-density layer having a density of 2.069 g/cm$^3$ and a refractive index n of 1.449. The thickness of the outermost layer 2S is 72.9 nm, and the relative value 4nd to the design wavelength is 0.435. The second layer 22 is the metal oxide layer 2B which is a low-density layer having a density of 5.17 g/cm$^3$ and made of zirconium oxide having a refractive index n of 1.977. The thickness of the second layer is 81.4 nm, and the relative value 4nd to the design wavelength is 0.660. The third layer is the silicon oxide layer 2A which is a low-density layer having a density of 2.069 g/cm$^3$ and a refractive index n of 1.449. The thickness of the third layer is 148.9 nm, and the relative value 4nd to the design wavelength is 0.887. The fourth layer is the metal oxide layer 2B which is a low-density layer having a density of 5.17 g/cm$^3$ and made of zirconium oxide having a refractive index n of 1.977. The thickness of the fourth layer is 85.9 nm, and the relative value 4nd to the design wavelength is 0.697.

In Tables 6, 9, and 10, the fifth layer is the silicon oxide layer 2A which is a high-density layer having a density of 2.213 g/cm$^3$ and a refractive index n of 1.481. The thickness of the fifth layer is 143.6 nm, and the relative value 4nd to the design wavelength is 0.866. The sixth layer is the metal oxide layer 2B which is a high-density layer having a density of 4.87 g/cm$^3$ and made of titanium oxide having a refractive index n of 2.489. The thickness of the sixth layer is 85.2 nm, and the relative value 4nd to the design wavelength is 0.791. Subsequently, the seventh layer to the 39th layer have the layer configuration described in Tables 1, 9, and 10, and the total film thickness of the outermost layer 2S to the 39th layer is 4735.45 nm.

In forming the IR-UV cut film 4 configured as above on the substrate 1, in Example 5, the outermost layer 2S to the fourth layer are formed through ion-assisted electron beam deposition (IAD) with low assist power. The film formation temperature is 150° C. When a low-density layer is formed as the silicon oxide layer 2A, the vacuum pressure is 1.8×10$^{-2}$ Pa. Assist power has an acceleration voltage of 300 V and an acceleration current of 450 mA. When the metal oxide layer 2B is formed of zirconium oxide, the vacuum pressure is 1.8×10$^{-2}$ Pa, and assist power has an acceleration voltage of 300 V and an acceleration current of 450 mA. The fifth layer to the 39th layer are formed through ion-assisted electron beam deposition (IAD) with high assist power. In this case, in the same manner as when the silicon oxide layer 2A is formed and when the metal oxide layer 2B is formed of titanium oxide, assist power has an acceleration voltage of 1000 Vm and an acceleration current of 1200 mA. The surface roughness of the outermost layer 2S is 0.65 nm to 0.75 nm.

Example 6

Example 6 is different from Example 5 in that the fluorine-containing organic silicon compound film 3 is provided on the IR-UV cut film 4.

The fluorine-containing organic silicon compound film 3 is the same as in Example 1.

Example 7

Example 7 is different from Example 5 in terms of assist power for forming a low-density layer. That is, in Example 7, assist power is low assist power with an acceleration voltage of 400 V and an acceleration current of 500 mA. For this reason, the low-density layers constituting the silicon oxide layer 2A serving as the outermost layer 2S and the third layer have a density of 2.086 g/cm$^3$, and the low-density layers constituting the second layer 22 and the fourth layer, that is, the metal oxide layers 2B made of zirconium oxide have a density of 5.23 g/cm$^3$. The fifth layer 25 to the 39th layer have the same density as in Example 1.

Example 8

Example 8 is different from Example 7 in that the fluorine-containing organic silicon compound film 3 is provided on the IR-UV cut film 4.

Comparative Example 11

Comparative Example 11 is different from Example 5 in terms of assist power for forming a low-density layer. That is, in Comparative Example 9, the outermost layer 2S to the fourth layer 24 are formed through ion-assisted electron beam deposition (LAD) with intermediate assist power having an acceleration voltage of 600 V and an acceleration current of 700 mA. For this reason, the low-density layers constituting the silicon oxide thin-film serving as the outermost layer and the third layer have a density of 2.172 g/cm$^3$, and the low-density layers constituting the second layer and the fourth layer, that is, the metal oxide layers 2B made of zirconium oxide have a density of 5.36 g/cm$^3$.

In Comparative Example 9, the surface roughness of the outermost layer is 0.77 nm to 0.85 nm, which is greater than in Examples 5 to 8.

Comparative Example 12

Comparative Example 12 is different from Comparative Example 10 in that the fluorine-containing organic silicon compound film 3 is provided on the IR-UV cut film 4.

Comparative Example 13

Comparative Example 13 is different from Example 5 in terms of assist power for forming a low-density layer. That is, in Comparative Example 13, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide thin-film serving as the outermost layer and the third layer have a density of 2.201 g/cm$^3$, and the low-density layers constituting the second layer and the fourth layer, that is, the metal oxide layers 2B made of zirconium oxide have a density of 5.41 g/cm$^3$.

In Comparative Example 13, the surface roughness of the outermost layer is 0.77 nm to 0.85 nm, which is greater than in Examples 5 to 8.

Comparative Example 14

Comparative Example 14 is different from Comparative Example 13 in that the fluorine-containing organic silicon compound film is provided on the IR-UV cut film.

Comparative Example 15

Comparative Example 15 is different from Example 1 in terms of assist power for forming a low-density layer. That is, in Comparative Example 15, all layers are formed through ion-assisted electron beam deposition (IAD) with high assist power having an acceleration voltage of 1000 V and an acceleration current of 1200 mA. For this reason, the low-density layers constituting the silicon oxide thin-film serving as the outermost layer and the third layer have a density of 2.213 g/cm³, and the low-density layers constituting the second layer and the fourth layer, that is, the metal oxide layers 2B made of zirconium oxide have a density of 5.45 g/cm³.

In Comparative Example 15, the surface roughness of the outermost layer is 0.80 nm to 0.90 nm, which is greater than in Examples 5 to Comparative Example 16

Comparative Example 16 is different from Comparative Example 15 in that the fluorine-containing organic silicon compound film is provided on the IR-UV cut film.

Comparative Example 17

Comparative Example 17 has the same layer configuration as in Example 5, but, unlike Example 5, the film formation method for the outermost layer to the fourth layer is electron deposition (EB) without using ion assist. The fifth layer to the 39th layer were formed through ion-assisted electron beam deposition (IAD) with high assist power having an acceleration voltage of 1000 V and an acceleration current of 1200 mA. The vacuum pressure at the time of forming silicon oxide for the outermost layer to the fourth layer is $8.0 \times 10^{-3}$ Pa, and the vacuum pressure at the time of forming zirconium oxide is $5.0 \times 10^{-3}$ Pa. For this reason, for the outermost layer to the fourth layer, the metal oxide layer made of silicon oxide has a density of 2.037 g/cm³, and the metal oxide layer made of zirconium oxide has a density of 7.52 g/cm³. In Comparative Example 17, the surface roughness of the outermost layer is 0.95 nm to 1.20 nm, which is greater than in Examples 5 to 8.

Comparative Example 18

Comparative Example 18 is different from Comparative Example 17 in that the fluorine-containing organic silicon compound film is provided on the IR-UV cut film.

Comparative Example 19

In Comparative Example 19, an IR-UV cut film has an outermost layer constituted by a silicon oxide layer having a thickness of 71.8 nm, a second layer constituted by a metal oxide layer made of titanium oxide having a thickness of 84.2 nm, a third layer constituted by a silicon oxide layer having a thickness of 147.2 nm, a fourth layer constituted by a metal oxide layer made of titanium oxide having a thickness of 83.6 nm, a fifth layer constituted by a silicon oxide layer having a thickness of 140.2 nm, and a sixth layer constituted by a metal oxide layer made of titanium oxide having a thickness of 83.1 nm. The number of layers is 39 in total, and the total film thickness is 4726.25 nm. The layer configuration of Comparative Example 19 is shown in Table 11. In Comparative Example 19 having this layer configuration, film formation was performed in the same method as in the related art described in Japanese Patent No. 4207083. That is, in Comparative Example 19, the outermost layer is formed through electron deposition (EB) without using ion assist, and the layers other than the outermost layer are formed in the same manner as in Comparative Example 5. The second layer to the fifth layer were formed through ion-assisted electron beam deposition (IAD) with high assist power having an acceleration voltage of 1000 V and an acceleration current of 1200 mA. The film formation temperature is 150° C. The vacuum pressure at the time of forming silicon oxide for the outermost layer is $8.0 \times 10^{-3}$ Pa, and the silicon oxide thin-film of the outermost layer has a density of 2.037 g/cm³. In Comparative Example 19, the surface roughness of the outermost layer is 0.80 nm to 0.95 nm, which is greater than in Examples 1 to 4.

Comparative Example 20

Comparative Example 20 is different from Comparative Example 19 in that the fluorine-containing organic silicon compound film is provided on the IR-UV cut film.

Reference Example 3

Reference Example 3 is different from Example 1 in that the layer configuration is as shown in Table 11, similarly to Comparative Example 19. Meanwhile, with regard to the film formation method, similarly to Example 1, the outermost layer to the fourth layer were formed through ion-assisted electron beam deposition (IAD) with low assist power, and the fifth layer and subsequent layers were formed through ion-assisted electron beam deposition (IAD) with high assist power. In Reference Example 3, the surface roughness of the outermost layer is 0.55 nm to 0.65 nm, which is greater than in Examples 1 to 4.

Reference Example 4

Reference Example 4 is different from Reference Example 3 in that the fluorine-containing organic silicon compound film is provided on the IR-UV cut film.

TABLE 6

| Layer | Material | d (nm) | 4nd | Film Formation Condition |
|---|---|---|---|---|
| Incidence Medium | Air | | | |
| Outermost Layer | SiO₂ | 72.9 | 0.435 | Low Assist Power |
| Second Layer | ZrO₂ | 81.4 | 0.660 | Low Assist Power |
| Third Layer | SiO₂ | 148.9 | 0.887 | Low Assist Power |
| Fourth Layer | ZrO₂ | 85.9 | 0.697 | Low Assist Power |
| Fifth Layer | SiO₂ | 143.6 | 0.866 | High Assist Power |
| Sixth Layer | TiO₂ | 85.2 | 0.791 | High Assist Power |
| Seventh Layer | SiO₂ | 139.2 | 0.839 | High Assist Power |
| Eighth Layer | TiO₂ | 81.4 | 0.756 | High Assist Power |
| Ninth Layer | SiO₂ | 139.8 | 0.843 | High Assist Power |
| Tenth Layer | TiO₂ | 81.1 | 0.753 | High Assist Power |
| 11th Layer | SiO₂ | 139.4 | 0.841 | High Assist Power |
| 12th Layer | TiO₂ | 81.0 | 0.752 | High Assist Power |
| 13th Layer | SiO₂ | 139.4 | 0.841 | High Assist Power |
| 14th Layer | TiO₂ | 82.0 | 0.761 | High Assist Power |
| 15th Layer | SiO₂ | 140.8 | 0.849 | High Assist Power |
| 16th Layer | TiO₂ | 83.3 | 0.773 | High Assist Power |
| 17th Layer | SiO₂ | 143.2 | 0.863 | High Assist Power |
| 18th Layer | TiO₂ | 86.7 | 0.805 | High Assist Power |
| 19th Layer | SiO₂ | 150.6 | 0.908 | High Assist Power |
| 20th Layer | TiO₂ | 100.4 | 0.932 | High Assist Power |
| 21st Layer | SiO₂ | 179.7 | 1.083 | High Assist Power |
| 22nd Layer | TiO₂ | 110.0 | 1.021 | High Assist Power |
| 23rd Layer | SiO₂ | 169.7 | 1.023 | High Assist Power |
| 24th Layer | TiO₂ | 101.5 | 0.942 | High Assist Power |
| 25th Layer | SiO₂ | 175.7 | 1.059 | High Assist Power |
| 26th Layer | TiO₂ | 115.0 | 1.067 | High Assist Power |
| 27th Layer | SiO₂ | 189.1 | 1.140 | High Assist Power |
| 28th Layer | TiO₂ | 116.5 | 1.081 | High Assist Power |
| 29th Layer | SiO₂ | 191.2 | 1.153 | High Assist Power |
| 30th Layer | TiO₂ | 119.4 | 1.108 | High Assist Power |
| 31st Layer | SiO₂ | 189.9 | 1.145 | High Assist Power |

TABLE 6-continued

| Layer | Material | d (nm) | 4nd | Film Formation Condition |
|---|---|---|---|---|
| 32nd Layer | $TiO_2$ | 117.5 | 1.091 | High Assist Power |
| 33rd Layer | $SiO_2$ | 193.2 | 1.165 | High Assist Power |
| 34th Layer | $TiO_2$ | 116.7 | 1.083 | High Assist Power |
| 35th Layer | $SiO_2$ | 184.2 | 1.110 | High Assist Power |
| 36th Layer | $TiO_2$ | 119.1 | 1.105 | High Assist Power |
| 37th Layer | $SiO_2$ | 46.2 | 0.278 | High Assist Power |
| 38th Layer | $TiO_2$ | 11.8 | 0.109 | High Assist Power |
| 39th Layer | $SiO_2$ | 82.9 | 0.500 | High Assist Power |
| Emergence Medium | Glass | | | | n is a refractive index
total film thickness: 4735.45 nm
design wavelength: 967 nm

TABLE 7

| | Film Formation Method of First to Fourth Layers | Film Formation Temperature | Odd-Numbered Layer ($SiO_2$) Rate (Å/sec) | Odd-Numbered Layer ($SiO_2$) Vacuum Pressure ($O_2$) | Odd-Numbered Layer ($SiO_2$) Assist Power | Odd-Numbered Layer ($SiO_2$) Density (g/cm$^3$) | Odd-Numbered Layer ($SiO_2$) Refractive Index (at 550 nm) |
|---|---|---|---|---|---|---|---|
| Example 5, 6 | IAD | 150° C. | 7 | 1.8E−2 Pa | 300 V 450 mA | 2.069 | 1.449 |
| Example 7, 8 | IAD | 150° C. | 7 | 1.8E−2 Pa | 400 V 500 mA | 2.086 | 1.453 |
| Comparative Example 11, 12 | IAD | 150° C. | 7 | 1.8E−2 Pa | 600 V 700 mA | 2.172 | 1.461 |
| Comparative Example 13, 14 | IAD | 150° C. | 7 | 1.8E−2 Pa | 800 V 900 mA | 2.201 | 1.473 |
| Comparative Example 15, 16 | IAD | 150° C. | 7 | 1.8E−2 Pa | 1000 V 1200 mA | 2.213 | 1.481 |
| Comparative Example 17, 18 | EB | 150° C. | 7 | 8.0E−3 Pa | — | 2.037 | 1.44 |
| Comparative Example 19, 20 | EB | 150° C. | 7 | 8.0E−3 Pa | — | 2.037 | 1.44 |
| Reference Example 3, 4 | IAD | 150° C. | 7 | 1.8E−2 Pa | 300 V 450 mA | 2.069 | 1.449 |

TABLE 8

| | Film Formation Method of First to Fourth Layers | Film Formation Temperature | Even-Numbered Layer Rate (Å/sec) | Even-Numbered Layer Vacuum Pressure ($O_2$) | Even-Numbered Layer Assist Power | Even-Numbered Layer Density (g/cm$^3$) | Even-Numbered Layer Refractive Index (at 550 nm) |
|---|---|---|---|---|---|---|---|
| Example 5, 6 | IAD | 150° C. | 4 | 1.8E−2 Pa | 300 V 450 mA | 5.17 | 1.977 |
| Example 7, 8 | IAD | 150° C. | 4 | 1.8E−2 Pa | 400 V 500 mA | 5.23 | 1.985 |
| Comparative Example 11, 12 | IAD | 150° C. | 4 | 1.8E−2 Pa | 600 V 700 mA | 5.36 | 2.009 |
| Comparative Example 13, 14 | IAD | 150° C. | 4 | 1.8E−2 Pa | 800 V 900 mA | 5.41 | 2.026 |
| Comparative Example 15, 16 | IAD | 150° C. | 4 | 1.8E−2 Pa | 1000 V 1200 mA | 5.45 | 2.042 |
| Comparative Example 17, 18 | EB | 150° C. | 7 | 5.0E−3 Pa | — | 4.98 | 1.942 |
| Comparative Example 19, 20 | IAD | 150° C. | 3 | 2.1E−2 Pa | 1000 V 1200 mA | 4.87 | 2.489 |
| Reference Example 3, 4 | IAD | 150° C. | 3 | 2.1E−2 Pa | 300 V 450 mA | 4.65 | 2.466 |

TABLE 9

| | Film Formation Method of Fifth Layer and Subsequent Layers | Film Formation Temperature | Odd-Numbered Layer ($SiO_2$) Rate (Å/sec) | Odd-Numbered Layer ($SiO_2$) Vacuum Pressure ($O_2$) | Odd-Numbered Layer ($SiO_2$) Assist Power | Odd-Numbered Layer ($SiO_2$) Density (g/cm$^3$) | Odd-Numbered Layer ($SiO_2$) Refractive Index (at 550 nm) |
|---|---|---|---|---|---|---|---|
| Example 5, 6 | IAD | 150° C. | 7 | 1.8E−2 Pa | 1000 V 1200 mA | 2.213 | 1.481 |
| Example 7, 8 | IAD | 150° C. | 7 | 1.8E−2 Pa | 1000 V 1200 mA | 2.213 | 1.481 |
| Comparative Example 11, 12 | IAD | 150° C. | 7 | 1.8E−2 Pa | 1000 V 1200 mA | 2.213 | 1.481 |

TABLE 9-continued

| | Film Formation Method of Fifth Layer and Subsequent Layers | Film Formation Temperature | Odd-Numbered Layer (SiO₂) Rate (Å/sec) | Odd-Numbered Layer (SiO₂) Vacuum Pressure (O₂) | Odd-Numbered Layer (SiO₂) Assist Power | Odd-Numbered Layer (SiO₂) Density (g/cm³) | Odd-Numbered Layer (SiO₂) Refractive Index (at 550 nm) |
|---|---|---|---|---|---|---|---|
| Comparative Example 13, 14 | IAD | 150° C. | 7 | 1.8E−2 Pa | 1000 V 1200 mA | 2.213 | 1.481 |
| Comparative Example 15, 16 | IAD | 150° C. | 7 | 1.8E−2 Pa | 1000 V 1200 mA | 2.213 | 1.481 |
| Comparative Example 17, 18 | IAD | 150° C. | 7 | 1.8E−2 Pa | 1000 V 1200 mA | 2.213 | 1.481 |
| Comparative Example 19, 20 | IAD | 150° C. | 7 | 1.8E−2 Pa | 1000 V 1200 mA | 2.213 | 1.481 |
| Reference Example 3, 4 | IAD | 150° C. | 7 | 1.8E−2 Pa | 1000 V 1200 mA | 2.213 | 1.481 |

TABLE 10

| | Film Formation Method of Fifth Layer and Subsequent Layer | Film Formation Temperature | Even-Numbered Layer Rate (Å/sec) | Even-Numbered Layer Vacuum Pressure (O₂) | Even-Numbered Assist Power | Even-Numbered Layer Density (g/cm³) | Even-Numbered Layer Refractive Index (at 550 nm) | Surface Roughness (nm) | Surface Resistance (Ω/□) |
|---|---|---|---|---|---|---|---|---|---|
| Example 5, 6 | IAD | 150° C. | 3 | 2.1E−2 Pa | 1000 V 1200 mA | 4.87 | 2.489 | 0.65 to 0.75 | 3.54E+09 |
| Example 7, 8 | IAD | 150° C. | 3 | 2.1E−2 Pa | 1000 V 1200 mA | 4.87 | 2.489 | 0.65 to 0.75 | 1.13E+10 |
| Comparative Example 11, 12 | IAD | 150° C. | 3 | 2.1E−2 Pa | 1000 V 1200 mA | 4.87 | 2.489 | 0.77 to 0.85 | 1.89E+11 |
| Comparative Example 13, 14 | IAD | 150° C. | 3 | 2.1E−2 Pa | 1000 V 1200 mA | 4.87 | 2.489 | 0.77 to 0.85 | 2.68E+12 |
| Comparative Example 15, 16 | IAD | 150° C. | 3 | 2.1E−2 Pa | 1000 V 1200 mA | 4.87 | 2.489 | 0.8 to 0.9 | 5.21E+13 |
| Comparative Example 17, 18 | IAD | 150° C. | 3 | 2.1E−2 Pa | 1000 V 1200 mA | 4.87 | 2.489 | 0.95 to 1.2 | 7.91E+11 |
| Comparative Example 19, 20 | IAD | 150° C. | 3 | 2.1E−2 Pa | 1000 V 1200 mA | 4.87 | 2.489 | 0.80 to 0.95 | 7.26E+12 |
| Reference Example 3, 4 | IAD | 150° C. | 3 | 2.1E−2 Pa | 1000 V 1200 mA | 4.87 | 2.489 | 0.55 to 0.65 | 6.87E+10 |

TABLE 11

| Layer | Material | d (nm) | 4nd | Film Formation Condition |
|---|---|---|---|---|
| Incidence Medium | Air | | | |
| Outermost Layer | SiO₂ | 71.8 | 0.433 | Low Assist Power |
| Second Layer | TiO₂ | 84.2 | 0.782 | Low Assist Power |
| Third Layer | SiO₂ | 147.2 | 0.887 | Low Assist Power |
| Fourth Layer | TiO₂ | 83.6 | 0.776 | Low Assist Power |
| Fifth Layer | SiO₂ | 140.2 | 0.845 | High Assist Power |
| Sixth Layer | TiO₂ | 83.1 | 0.772 | High Assist Power |
| Seventh Layer | SiO₂ | 139.2 | 0.839 | High Assist Power |
| Eighth Layer | TiO₂ | 81.4 | 0.756 | High Assist Power |
| Ninth Layer | SiO₂ | 139.8 | 0.843 | High Assist Power |
| Tenth Layer | TiO₂ | 81.1 | 0.753 | High Assist Power |
| 11th Layer | SiO₂ | 139.4 | 0.841 | High Assist Power |
| 12th Layer | TiO₂ | 81.0 | 0.752 | High Assist Power |
| 13th Layer | SiO₂ | 139.4 | 0.841 | High Assist Power |
| 14th Layer | TiO₂ | 82.0 | 0.761 | High Assist Power |
| 15th Layer | SiO₂ | 140.8 | 0.849 | High Assist Power |
| 16th Layer | TiO₂ | 83.3 | 0.773 | High Assist Power |
| 17th Layer | SiO₂ | 143.2 | 0.863 | High Assist Power |
| 18th Layer | TiO₂ | 86.7 | 0.805 | High Assist Power |
| 19th Layer | SiO₂ | 150.6 | 0.908 | High Assist Power |
| 20th Layer | TiO₂ | 100.4 | 0.932 | High Assist Power |
| 21st Layer | SiO₂ | 179.7 | 1.083 | High Assist Power |
| 22nd Layer | TiO₂ | 110.0 | 1.021 | High Assist Power |
| 23rd Layer | SiO₂ | 169.7 | 1.023 | High Assist Power |
| 24th Layer | TiO₂ | 101.5 | 0.942 | High Assist Power |
| 25th Layer | SiO₂ | 175.7 | 1.059 | High Assist Power |
| 26th Layer | TiO₂ | 115.0 | 1.067 | High Assist Power |
| 27th Layer | SiO₂ | 189.1 | 1.140 | High Assist Power |
| 28th Layer | TiO₂ | 116.5 | 1.081 | High Assist Power |
| 29th Layer | SiO₂ | 191.2 | 1.153 | High Assist Power |
| 30th Layer | TiO₂ | 119.4 | 1.108 | High Assist Power |
| 31st Layer | SiO₂ | 189.9 | 1.145 | High Assist Power |
| 32nd Layer | TiO₂ | 117.5 | 1.091 | High Assist Power |
| 33rd Layer | SiO₂ | 193.2 | 1.165 | High Assist Power |
| 34th Layer | TiO₂ | 116.7 | 1.083 | High Assist Power |
| 35th Layer | SiO₂ | 184.2 | 1.110 | High Assist Power |
| 36th Layer | TiO₂ | 119.1 | 1.105 | High Assist Power |
| 37th Layer | SiO₂ | 44.8 | 0.270 | High Assist Power |
| 38th Layer | TiO₂ | 11.8 | 0.110 | High Assist Power |
| 39th Layer | SiO₂ | 82.9 | 0.500 | High Assist Power |
| Emergence Medium | Glass | | | | n is a refractive index
total film thickness: 4726.25 nm
design wavelength: 967 nm Experiment Result
1 Measurement of Surface Resistance (Sheet Resistance)

In measuring the surface resistance, the same apparatus as in Examples 1 to 4, Comparative Examples 1 to 8, and Reference Examples 1 and 2 was used to measure the surface resistance. The result is shown in Table 10.

As shown in Table 10, it can be seen that the surface resistance in Examples 5 to 8 is low compared to Comparative Examples 11 to 20 or Reference Examples 3 and 4. The low surface resistance means that dust or grit is less likely to adhere to the surface.

2 Relationship Between Surface Resistance and Total Film Thickness

Figure 10:
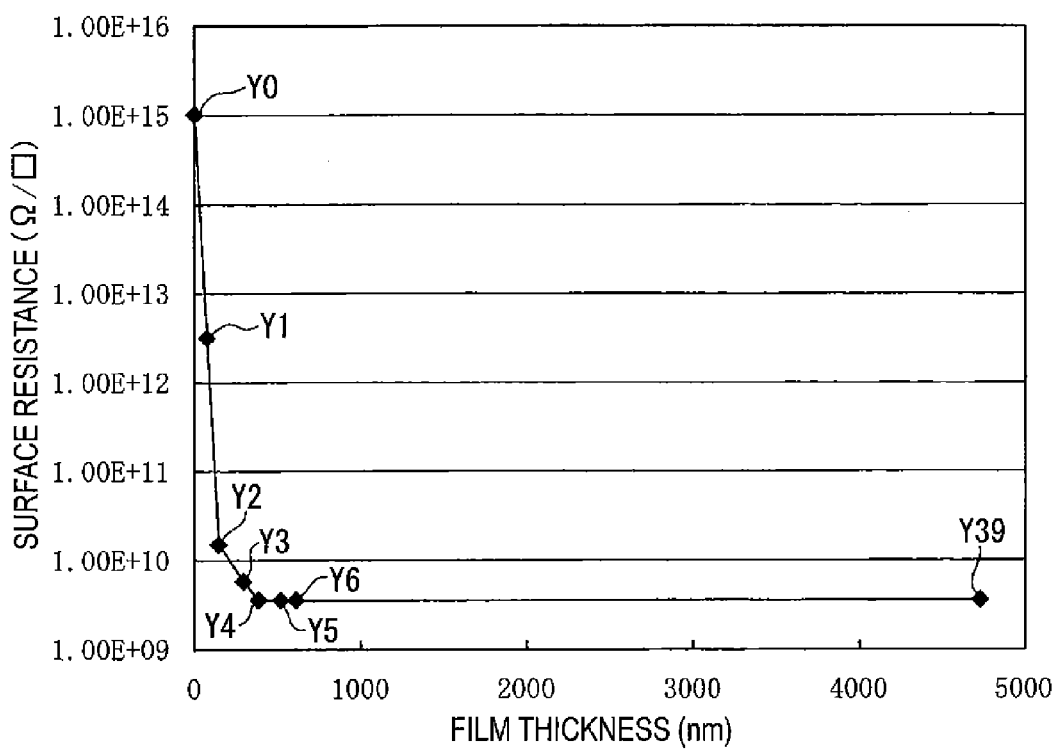
FIG. 10 is a graph showing the relationship between a film thickness and surface resistance in Example 5.

FIG. 10 shows the relationship between a film thickness and surface resistance in Example 5.

In FIG. 10, Y0 is surface resistance ($1.0 \times 10^{15} \Omega/\square$) when all layers are formed through electron beam deposition with high assist power. Y1 is surface resistance ($3.12 \times 10^{12} \Omega/\square$) when only the outermost layer having a thickness of 72.94 nm is formed through electron beam deposition with low assist power (an acceleration voltage is 300 V and an acceleration current is 450 mV). Y2 is surface resistance ($1.46 \times 10^{11} \Omega/\square$) when the outermost layer and the second layer are formed through electron beam deposition with low assist power. Y3 is surface resistance ($5.61 \times 10^9 \Omega/\square$) when the outermost layer to the third layer are formed through electron beam deposition with low assist power. Y4 is surface resistance ($3.54 \times 10^9 \Omega/\square$) when the outermost layer to the fourth layer are formed through electron beam deposition with low assist power. Y5 is surface resistance ($3.51 \times 10^9 \Omega/\square$) when the outermost layer to the fifth layer are formed through electron beam deposition with low assist power. Y6 is surface resistance ($3.49 \times 10^9 \Omega/\square$) when the outermost layer to the sixth layer are formed through electron beam deposition with low assist power. Y39 is surface resistance ($3.48 \times 10^9 \Omega/\square$) when all layers of the outermost layer to the 39th layer are formed through electron beam deposition with low assist power.

As shown in FIG. 10, it can be seen that, if the number of bonded layers including the outermost layer is great, the value of surface resistance is reduced. Meanwhile, it can be seen that, when the outermost layer to the fourth layer are formed through electron beam deposition with low assist power and when all layers (39 layers) including the outermost layer are formed through electron beam deposition with low assist power, the value of surface resistance is not changed so much. For this reason, in this example, it will suffice that the outermost layer to the fourth layer (film thickness 389.1 nm) are formed through electron beam deposition with low assist power.

Table 12 shows the results of dust-proof performance by the polyethylene powder method, the Kanto loam method, and the cotton linter method.

As shown in Table 12, it can be seen that, in the case of the polyethylene powder method, the adhered dust quantity and the residual quantity in Examples 5 and 7 are small compared to Comparative Examples 11, 13, 15, 17, and 19 or Reference Example 1. It can also been seen that the adhered dust quantity and the residual quantity in Examples 6 and 8 are small compared to Comparative Examples 12, 14, 16, 18, and 20 or Reference Example 4. As described above, it is thought that the adhered dust quantity and the residual quantity in Examples 5 and 7 are small compared to Reference Example 3, and the adhered dust quantity and the residual quantity in Examples 6 and 8 are small compared to Reference Example 4 because Zr has small electronegativity compared to Ti.

The electronegativity can be interpreted as minimum energy necessary for separating foreign particles from the surface. If the value is small, foreign particles are easily separated from the surface. For this reason, the use of oxide containing an element having small electronegativity enables improvement in dust-proof performance.

With regard to Examples, Comparative Examples, and Reference Examples, it can be seen that the adhered dust quantity and the residual quantity in Examples 6 and 8, Comparative Examples 12, 14, 16, 18, and 20, and Reference Example 4 where the fluorine-containing organic silicon compound film 3 is provided are small compared to Examples 5 and 7, Comparative Examples 11, 13, 15, 17, and 19, and Reference Example 3 where no fluorine-containing organic silicon compound film 3 is provided. In the case of the Kanto loam method and the cotton linter method, similarly to the polyethylene powder method, with regard to Examples, Comparative Examples, and Reference Examples, it can be seen that the adhered dust quantity and the residual quantity in Examples 5 to 8 are small compared to Comparative Examples 11 to 20 or Reference Examples 3 and 4. The above results are obtained because the surface roughness is improved and dust or grit is less likely to adhere to the surface.

TABLE 12

|  | Film Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
|  |  |  |  |  | Adhered dust quantity | Residual Quantity | Adhered dust quantity | Residual Quantity | Adhered dust quantity | Residual Quantity |
| Example 5 | IAD | 300 | 450 | None | 0.09% | 0.01% | 0.10% | 0.01% | 1.77% | 0.22% |
| Example 6 | IAD | 300 | 450 | Provided | 0.01% | 0.00% | 0.01% | 0.00% | 0.52% | 0.01% |
| Example 7 | IAD | 400 | 500 | None | 0.10% | 0.01% | 0.13% | 0.01% | 1.92% | 0.28% |
| Example 8 | IAD | 400 | 500 | Provided | 0.04% | 0.00% | 0.02% | 0.01% | 0.67% | 0.02% |
| Comparative Example 11 | IAD | 600 | 700 | None | 0.31% | 0.04% | 0.36% | 0.10% | 2.03% | 0.33% |
| Comparative Example 12 | IAD | 600 | 700 | Provided | 0.05% | 0.01% | 0.07% | 0.02% | 0.84% | 0.04% |
| Comparative Example 13 | IAD | 800 | 900 | None | 1.08% | 0.20% | 0.82% | 0.16% | 3.23% | 0.70% |
| Comparative Example 14 | IAD | 800 | 900 | Provided | 0.12% | 0.03% | 0.77% | 0.12% | 2.34% | 0.10% |
| Comparative Example 15 | IAD | 1000 | 1200 | None | 3.98% | 0.61% | 1.24% | 0.27% | 5.67% | 1.23% |
| Comparative Example 16 | IAD | 1000 | 1200 | Provided | 0.58% | 0.14% | 0.69% | 0.16% | 3.08% | 0.25% |

TABLE 12-continued

| Film | | | Fluorine-containing | Polyethylene Powder | | Kanto Loam | | Cotton Linter | |
|---|---|---|---|---|---|---|---|---|---|
| Formation Method of Outermost Layer | Acceleration Voltage (V) | Acceleration Current (mA) | Organic Silicon Compound | Adhered dust quantity | Residual Quantity | Adhered dust quantity | Residual Quantity | Adhered dust quantity | Residual Quantity |
| Comparative Example 17 | EB | 0 | 0 | None | 0.28% | 0.04% | 0.47% | 0.06% | 1.98% | 0.33% |
| Comparative Example 18 | EB | 0 | 0 | Provided | 0.09% | 0.02% | 0.32% | 0.03% | 0.89% | 0.06% |
| Comparative Example 19 | EB | 0 | 0 | None | 8.94% | 1.87% | 1.03% | 0.27% | 5.89% | 1.76% |
| Comparative Example 20 | EB | 0 | 0 | Provided | 0.77% | 0.10% | 15.66% | 7.14% | 4.78% | 0.54% |
| Reference Example 3 | IAD | 300 | 450 | None | 21.18% | 3.98% | 3.47% | 1.23% | 15.67% | 2.98% |
| Reference Example 4 | IAD | 300 | 450 | Provided | 4.92% | 1.73% | 31.56% | 15.46% | 14.73% | 2.63% |

Next, examples of an optical component having a tantalum oxide layer and a silicon oxide layer will be described.

Optical Component Having Tantalum Oxide Layer and Silicon Oxide Layer

Examples 9 to 12, Comparative Examples 21 to 26, and Reference Examples 5 and 6 corresponding to the optical component according to the first embodiment of the invention will be described.

Example 9

In Example 9, the anti-reflection film 2 is formed on the substrate 1, and no fluorine-containing organic silicon compound film 3 is provided.

The layer configuration of the anti-reflection film 2 of Example 9 is shown in Tables 13 to 15. In these tables, the outermost layer 2S is the silicon oxide layer 2A which is a low-density layer having a density of 2.069 g/cm$^3$ and a refractive index n of 1.449. The thickness of the outermost layer 2S is 85.7 nm, and the optical film thickness is 1.449×85.7 nm=124.1793 nm. The relative value 4nd of the optical film thickness to the design wavelength (in Example 1, 510 nm) (hereinafter, simply referred to as the relative value to the design wavelength) is 0.977. That is, in design of the optical thin-film, since ¼ of the design wavelength is used as a basis, the value of an optical thin-film nd to the relevant value becomes 0.977. The second layer 22 is the metal oxide layer 2B which is a low-density layer having a density of 7.91 g/cm$^3$ and made of tantalum oxide having a refractive index n of 2.144. The thickness of the second layer 22 is 115.6 nm, and the relative value 4nd to the design wavelength is 1.958. The third layer 23 is the silicon oxide layer 2A which is a low-density layer having a density of 2.069 g/cm$^3$ and a refractive index n of 1.449. The thickness of the third layer 23 is 30.5 nm, and the relative value 4nd to the design wavelength is 0.348. The fourth layer 24 is the metal oxide layer 2B which is a low-density layer having a density of 7.91 g/cm$^3$ and made of a tantalum oxide having a refractive index n of 2.144. The thickness of the fourth layer 24 is 12.1 nm, and the relative value 4nd to the design wavelength is 0.206. The fifth layer 25 is the silicon oxide layer 2A which is a high-density layer having a density of 2.213 g/cm$^3$ and a refractive index n of 1.481. The thickness of the fifth layer 25 is 151.3 nm, and the relative value 4nd to the design wavelength is 1.742. The total thickness of the outermost layer 2S to the fifth layer 25 is 395.3 nm.

In forming the anti-reflection film 2 configured as above on the substrate 1, in Example 9, the outermost layer 2S to the fourth layer 24 are formed through ion-assisted electron beam deposition (IAD) with low assist power. The film formation temperature is 150° C. When a low-density layer is formed as the silicon oxide layer 2A, the vacuum pressure is 1.8×10$^{-2}$ Pa. Assist power has an acceleration voltage of 300 V and an acceleration current of 450 mA. When the metal oxide layer 22 is formed of tantalum oxide, the vacuum pressure is 1.8×10$^{-2}$ Pa, and assist power has an acceleration voltage of 300 V and an acceleration current of 450 mA. Thus, the surface roughness of the outermost layer 2S becomes 0.55 nm to 0.65 nm. The fifth layer 25 is formed through ion-assisted electron beam deposition (IAD) with high assist power. In this case, assist power has an acceleration voltage of 1000 Vm and an acceleration current of 1200 mA.

Example 10

Example 10 is different from Example 9 in that the fluorine-containing organic silicon compound film 3 is provided on the anti-reflection film 2.

With regard to the fluorine-containing organic silicon compound film 3, for example, as a deposition source, a material is used which is obtained by diluting fluorine-containing organic silicon compound (product name: KY-130) manufactured by Shin-Etsu Chemical Co., Ltd. with a fluorine-based solvent (manufactured by Sumitomo 3M Ltd.: Novec HFE-7200) to prepare a solution having a solid content concentration of 3%, impregnating 1 g of the solution into a porous ceramic pellet, and performing drying.

Example 11

Example 11 is different from Example 9 in terms of assist power for forming a low-density layer. That is, in Example 11, assist power is low assist power having an acceleration voltage of 400 V and an acceleration current of 500 mA. For this reason, the low-density layer constituting the silicon oxide layer 2A serving as the outermost layer 2S and the third layer 23 have a density of 2.086 g/cm$^3$, and the low-density layers constituting the second layer 22 and the fourth layer 24, that is, the metal oxide layers 2B made of tantalum oxide have a density of 7.98 g/cm$^3$. The density of the fifth layer 25 is the same as in Example 9.

Example 12

Example 12 is different from Example 11 in that the fluorine-containing organic silicon compound film 3 is provided on the anti-reflection film 2.

Comparative Example 21

Comparative Example 21 is different from Example 9 in terms of assist power for forming a low-density layer. That is, in Comparative Example 21, the outermost layer 2S to the fourth layer 24 are formed through ion-assisted electron beam deposition (IAD) with intermediate assist power having an acceleration voltage of 600 V and an acceleration current of 700 mA. For this reason, the low-density layers constituting the silicon oxide layer serving as the outermost layer and the third layer have a density of 2.172 g/cm$^3$, and the low-density layers constituting the second layer and the fourth layer, that is, the metal oxide layers 2B made of tantalum oxide have a density of 8.09 g/cm$^3$. In Comparative Example 21, the surface roughness of the outermost layer is 0.57 nm to 0.67 nm, which is greater than in Examples 9 to 12.

Comparative Example 22

Comparative Example 22 is different from Comparative Example 21 in that the fluorine-containing organic silicon compound film is provided on the anti-reflection film.

Comparative Example 23

Comparative Example 23 is different from Example 9 in terms of assist power for forming a low-density layer. That is, in Comparative Example 23, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide layer serving as the outermost layer and the third layer have a density of 2.201 g/cm$^3$, and the low-density layers constituting the second layer and the fourth layer, that is, the metal oxide layers 2B made of tantalum oxide have a density of 8.15 g/cm$^3$. In Comparative Example 23, the surface roughness of the outermost layer is 0.6 nm to 0.7 nm, which is greater than in Examples 9 to 12.

Comparative Example 24

Comparative Example 24 is different from Comparative Example 23 in that the fluorine-containing organic silicon compound film is provided on the anti-reflection film.

Comparative Example 25

Comparative Example 25 is different from Example 9 in terms of assist power for forming a low-density layer. That is, in Comparative Example 25, all layers are formed through ion-assisted electron beam deposition (IAD) with high assist power having an acceleration voltage of 1000 V and an acceleration current of 1200 mA. For this reason, the low-density layers constituting the silicon oxide layer serving as the outermost layer and the third layer have a density of 2.213 g/cm$^3$, and the low-density layers constituting the second layer and the fourth layer, that is, the metal oxide layers 2B made of tantalum oxide have a density of 8.19 g/cm$^3$. In Comparative Example 25, the surface roughness of the outermost layer is 0.62 nm to 0.72 nm, which is greater than in Examples 9 to 13.

Comparative Example 26

Comparative Example 26 is different from Comparative Example 25 in that the fluorine-containing organic silicon compound film is provided on the anti-reflection film.

Reference Example 5

In Reference Example 5, an anti-reflection film has an outermost layer constituted by a silicon oxide thin-film having a thickness of 86.0 nm, a second layer constituted by a titanium oxide thin-film having a thickness of 102.7 nm, a third layer constituted by a silicon oxide thin-film having a thickness of 30.6 nm, a fourth layer constituted by a titanium oxide thin-film having a thickness of 12.1 nm, and a fifth layer constituted by a silicon oxide layer having a thickness of 136.6 nm. Reference Example 5 is different from Example 9 in terms of the vacuum pressure and the refractive index of the even-numbered layer. Table 16 shows the layer configuration of Reference Example 5. In Reference Example 5, the surface roughness of the outermost layer is 0.6 nm to 0.7 nm, which is greater than in Examples 9 to 12. In Reference Example 5, film formation is performed with the same assist power as in Example 9.

Reference Example 6

Reference Example 6 is different from Reference Example 5 in that the fluorine-containing organic silicon compound film is provided on the anti-reflection film.

With the above, it can be seen that the surface roughness of the outermost layer corresponds to assist power when the outermost layer is formed. That is, in Examples 9 to 12, the outermost layer is formed with low assist power having an acceleration voltage of 300 V to 400 V (acceleration current of 450 mA to 500 mA), such that the surface roughness of the outermost layer becomes 0.55 nm to 0.65 nm. Meanwhile, in Comparative Examples 21 to 24, the outermost layer is formed with intermediate assist power having an acceleration voltage of 600 V to 800 V (acceleration current of 700 mA to 900 mA), such that the surface roughness of the outermost layer becomes 0.6 nm to 0.7 nm or 0.62 nm to 0.75 nm. In Comparative Examples 25 and 26, the outermost layer is formed with high assist power having an acceleration voltage of 1000 V (acceleration current of 1200 mA), such that the surface roughness of the outermost layer becomes 0.62 nm to 0.72 nm. In Reference Examples 5 and 6, while film formation is performed with the same assist power as in Examples 9 and 10, unlike Examples 9 and 10, since the even-numbered layer is constituted by a titanium oxide thin-film, the surface roughness becomes 0.6 nm to 0.7 nm.

TABLE 13

| Layer | Material | d (nm) | 4nd |
|---|---|---|---|
| Incidence Medium | Air | | |
| Outermost Layer | SiO$_2$ | 85.7 | 0.977 |
| Second Layer | Ta$_2$O$_5$ | 115.6 | 1.958 |
| Third Layer | SiO$_2$ | 30.5 | 0.348 |
| Fourth Layer | Ta$_2$O$_5$ | 12.1 | 0.206 |
| Fifth Layer | SiO$_2$ | 151.3 | 1.742 |
| Emergence Medium | Glass | | | n is a refractive index
total film thickness: 395.3 nm
design wavelength: 510 nm

TABLE 14

| | Film Formation Method of First to Fourth Layers | Film Formation Temperature | Odd-Numbered Layer (SiO$_2$) Rate (Å/sec) | Odd-Numbered Layer (SiO$_2$) Vacuum Pressure (O$_2$) | Odd-Numbered Layer (SiO$_2$) Assist Power | Odd-Numbered Layer (SiO$_2$) Density (g/cm$^3$) | Odd-Numbered Layer (SiO$_2$) Refractive Index (at 550 nm) |
|---|---|---|---|---|---|---|---|
| Example 9, 10 | IAD | 150° C. | 7 | 1.8E−2 Pa | 300 V 450 mA | 2.069 | 1.449 |
| Example 11, 12 | IAD | 150° C. | 7 | 1.8E−2 Pa | 400 V 500 mA | 2.086 | 1.453 |
| Comparative Example 21, 22 | IAD | 150° C. | 7 | 1.8E−2 Pa | 600 V 700 mA | 2.172 | 1.461 |
| Comparative Example 23, 24 | IAD | 150° C. | 7 | 1.8E−2 Pa | 800 V 900 mA | 2.201 | 1.473 |
| Comparative Example 25, 26 | IAD | 150° C. | 7 | 1.8E−2 Pa | 1000 V 1200 mA | 2.213 | 1.481 |
| Reference Example 5, 6 | IAD | 150° C. | 7 | 1.8E−2 Pa | 300 V 450 mA | 2.069 | 1.449 |

TABLE 15

| | Film Formation Method of First to Fourth Layers | Film Formation Temperature | Even-Numbered Layer Rate (Å/sec) | Even-Numbered Layer Vacuum Pressure (O$_2$) | Even-Numbered Layer Assist Power | Even-Numbered Layer Density (g/cm$^3$) | Even-Numbered Layer Refractive Index (at 550 nm) | Surface Roughness (nm) | Surface Resistance (Ω/□) |
|---|---|---|---|---|---|---|---|---|---|
| Example 9, 10 | IAD | 150° C. | 3 | 1.8E−2 Pa | 300 V 450 mA | 7.91 | 2.144 | 0.55 to 0.65 | 8.50E+10 |
| Example 11, 12 | IAD | 150° C. | 3 | 1.8E−2 Pa | 400 V 500 mA | 7.98 | 2.167 | 0.55 to 0.65 | 3.10E+11 |
| Comparative Example 21, 22 | IAD | 150° C. | 3 | 1.8E−2 Pa | 600 V 700 mA | 8.09 | 2.201 | 0.57 to 0.67 | 9.85E+12 |
| Comparative Example 23, 24 | IAD | 150° C. | 3 | 1.8E−2 Pa | 800 V 900 mA | 8.15 | 2.217 | 0.6 to 0.7 | 1.00E+15 |
| Comparative Example 25, 26 | IAD | 150° C. | 3 | 1.8E−2 Pa | 1000 V 1200 mA | 8.19 | 2.221 | 0.62 to 0.72 | 1.00E+15 |
| Reference Example 5, 6 | IAD | 150° C. | 3 | 2.1E−2 Pa | 300 V 450 mA | 4.65 | 2.466 | 0.6 to 0.7 | 5.77E+10 |

TABLE 16

| Layer | Material | d (nm) | 4nd |
|---|---|---|---|
| Incidence Medium | Air | | |
| Outermost Layer | SiO$_2$ | 86.0 | 0.979 |
| Second Layer | TiO$_2$ | 102.7 | 2.014 |
| Third Layer | SiO$_2$ | 30.6 | 0.349 |
| Fourth Layer | TiO$_2$ | 12.1 | 0.237 |
| Fifth Layer | SiO$_2$ | 136.6 | 1.573 |
| Emergence Medium | Glass | | | n is a refractive index
total film thickness: 367.9 nm
design wavelength: 510 nm Experiment Result
1 Measurement of Surface Resistance (Sheet Resistance)

In measuring the surface resistance, the surface resistance measurement instrument 504 shown in FIG. 7A is used. The surface resistance measurement instrument 504 and the stage 506 are configured as above, and the measurement condition and the measurement environment are the same as in the above-described experiment.

With regard to Examples, Comparative Examples, and Reference Examples, the surface resistance of the sample was measured. The results are shown in Table 15. As shown in Table 15, it can be seen that the surface resistance in Examples 9 to 12 is low compared to Comparative Examples 25 to 28. The low surface resistance means that dust or grit is less likely to adhere to the surface.

2 Relationship Between Surface Resistance and Total Film Thickness

Figure 11:
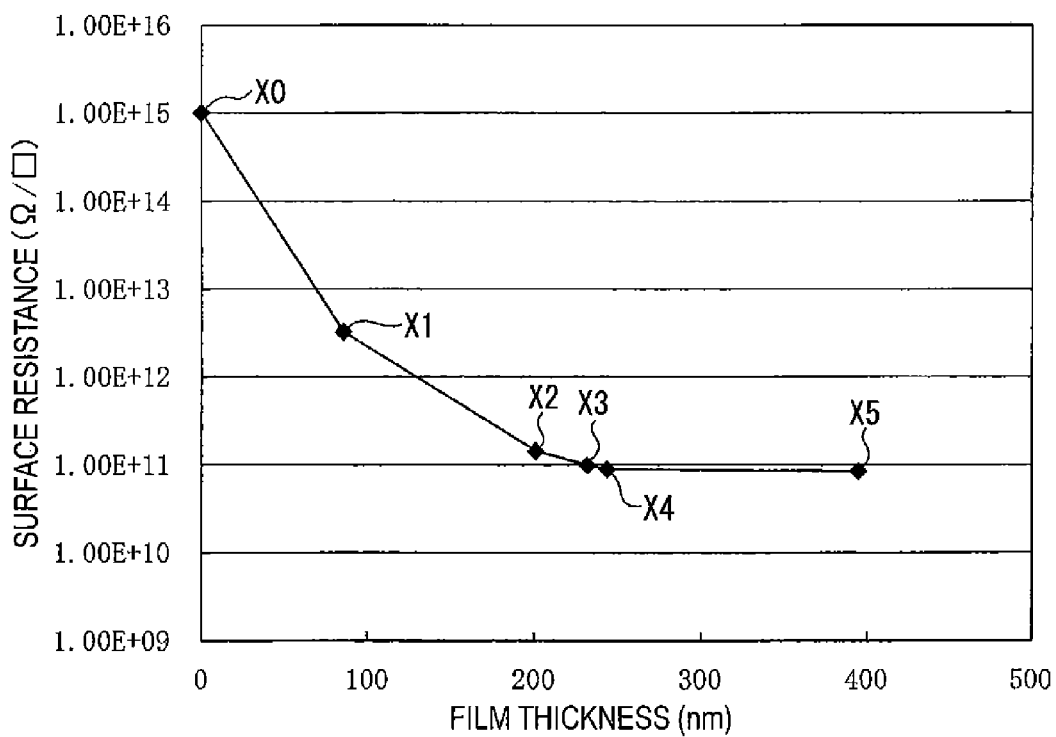
FIG. 11 is a graph showing the relationship between a film thickness and surface resistance in Example 9.

FIG. 11 shows the relationship between a film thickness and surface resistance in Example 9.

In FIG. 11, X0 is surface resistance ($1.5 \times 10^{15} \Omega/\square$) when all layers are formed through electron beam deposition with high assist power. X1 is surface resistance ($3.17 \times 10^{12} \Omega/\square$) when only the outermost layer having a thickness of 85.74 nm is formed through electron beam deposition with low assist power (an acceleration voltage is 300 V and an acceleration current is 450 mV). X2 is surface resistance ($1.47 \times 10^{11} \Omega/\square$) when the outermost layer and the second layer are formed through electron beam deposition with low assist power. X3 is surface resistance ($1.01 \times 10^{11} \Omega/\square$) when the outermost layer to the third layer are formed through electron beam deposition with low assist power. X4 is surface resistance ($8.88 \times 10^{10} \Omega/\square$) when the outermost layer to the fourth layer are formed through electron beam deposition with low assist power. X5 is surface resistance ($8.50 \times 10^{10} \Omega/\square$) when all layers are formed through electron beam deposition with low assist power.

As shown in FIG. 11, it can be seen that, if a large number of bonded layers including the outermost layer are formed through electron beam deposition with low assist power, the value of surface resistance is reduced. Meanwhile, it can be seen that, when the outermost layer to the fourth layer are formed through electron beam deposition with low assist power and when all layers (five layers) including the outermost layer are formed through electron beam deposition with low assist power, the value of surface resistance is not changed so much. For this reason, in this example, it will suffice that the outermost layer to the fourth layer (film thickness 244.0 nm) are formed through electron beam deposition with low assist power.

3 Charge-Through

Figure 12:
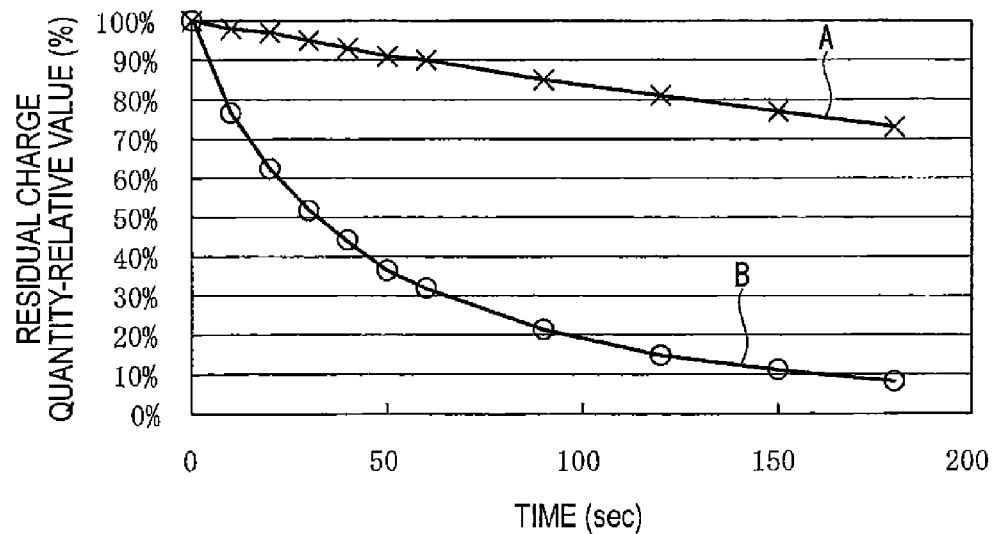
FIG. 12 is a graph showing the relationship between time and a residual charge quantity in Example 9 and Comparative Example 25.

With regard to charge-through, the outermost layer of the sample is frictionally charged, and the residual charge quantity (relative value) in the outermost layer is displayed over time. The charge-through is shown in FIG. 12. In FIG. 12, a graph A shows Comparative Example 25, and a graph B shows Example 9. For the measurement of surface charges, the surface electrometer 500 shown in FIG. 7B is used. The surface electrometer 500 is the same as that used in the above-described experiment, and the distance between the probe 501 and the surface of the sample 502 of a filter is 10 mm. The stage 503 on which the sample 502 is placed is made of metal, and measurement is performed in a state of being grounded. The measurement environment is the same as in the above-described experiment.

As shown in FIG. 12, in the graph B of Example 9, the residual charge quantity over time is small compared to the graph A of Comparative Example 25. As a result, it can be seen that, in Example 9, adhesion of dust or grit to the surface due to static electricity is reduced compared to Comparative Example 25.

4 Dust-Proof Performance

A dust-proof performance test was performed by 4-1 polyethylene powder method, 4-2 Kanto loam method, and 4-3 cotton linter method. The detailed specification of these methods is as described above.

Table 17 shows the results of 4-1 polyethylene powder method, 4-2 Kanto loam method, and 4-3 cotton linter method.

As shown in Table 17, in the case of the polyethylene powder method, it can be seen that the adhered dust quantity and the residual quantity in Examples 9 and 10 are small compared to Comparative Examples 21 to 24 or Reference Examples 5 and 6. As described above, it is thought that the adhered dust quantity and the residual quantity in Examples 9 and 11 are small compared to Reference Example 5, and the adhered dust quantity and the residual quantity in Examples 10 and 12 are small compared to Reference Example 6 because Ta has small electronegativity compared to Ti. With regard to Examples and Comparative Examples, it can be seen that the adhered dust quantity and the residual quantity in Examples 10 and 12, Comparative Examples 22, 24, and 26, and Reference Example 6 where the fluorine-containing organic silicon compound film 3 is provided are small compared to Examples 9 and 11, Comparative Examples 21, 23, and 25, and Reference Example 5 where no fluorine-containing organic silicon compound film 3 is provided. In the case of the Kanto loam method and the cotton linter method, similarly to the polyethylene powder method, with regard to Examples, Comparative Examples, and Reference Examples, it can be seen that the adhered dust quantity and the residual quantity in Examples 9 and 10 are small compared to Comparative Examples 21 to 24 or Reference Examples 5 and 6.

The electronegativity numerically indicates the ability that the bonded atoms in the molecules attract electrons. Although any method is used to obtain the numerical value, the numerical value is in general obtained by a Pauling's method. With regard to the electronegativity by the Pauling's method, Ti has 1.54 smaller than 1.50 of Ta. The electronegativity can be interpreted as minimum energy necessary for separating foreign particles from the surface. For this reason, the use of oxide containing an element having small electronegativity enables improvement in dust-proof performance.

It can be seen that the adhered dust quantity and the residual quantity in Examples 10 and 12, Comparative Examples 22, 24, and 26, and Reference Example 6 where the fluorine-containing organic silicon compound film 3 is provided are great compared to Examples 9 and 11, Comparative Examples 21, 23, and 25, and Reference Example 5 where no fluorine-containing organic silicon compound film 3 is provided. The above results are obtained because the fluorine-containing organic silicon compound film reduces surface energy, and dust or grit is less likely to adhere to the surface.

TABLE 17

| | Film Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
| | | | | | Adhered dust quantity | Residual Quantity | Adhered dust quantity | Residual Quantity | Adhered dust quantity | Residual Quantity |
| Example 9 | IAD | 300 | 450 | None | 2.72% | 0.49% | 0.17% | 0.01% | 3.13% | 0.65% |
| Example 10 | IAD | 300 | 450 | Provided | 0.07% | 0.01% | 0.23% | 0.01% | 2.25% | 0.19% |
| Example 11 | IAD | 400 | 500 | None | 3.13% | 0.55% | 0.21% | 0.01% | 3.26% | 0.65% |
| Example 12 | IAD | 400 | 500 | Provided | 0.10% | 0.01% | 0.27% | 0.01% | 2.47% | 0.22% |
| Comparative Example 21 | IAD | 600 | 700 | None | 8.98% | 1.24% | 0.92% | 0.09% | 4.19% | 0.78% |
| Comparative Example 22 | IAD | 600 | 700 | Provided | 0.91% | 0.16% | 1.12% | 0.11% | 3.97% | 0.38% |
| Comparative Example 23 | IAD | 800 | 900 | None | 11.02% | 2.78% | 2.10% | 0.52% | 8.63% | 1.52% |
| Comparative Example 24 | IAD | 800 | 900 | Provided | 3.52% | 0.99% | 1.95% | 0.48% | 9.71% | 0.55% |
| Comparative Example 25 | IAD | 1000 | 1200 | None | 19.20% | 3.84% | 3.15% | 0.81% | 12.54% | 1.95% |
| Comparative Example 26 | IAD | 1000 | 1200 | Provided | 3.81% | 1.02% | 5.23% | 1.25% | 11.78% | 0.63% |
| Reference Example 5 | IAD | 300 | 450 | None | 3.78% | 0.59% | 0.29% | 0.02% | 2.87% | 0.63% |
| Reference Example 6 | IAD | 300 | 450 | Provided | 0.16% | 0.01% | 0.19% | 0.01% | 1.84% | 0.14% |

Next, Examples 13 to 16, Comparative Examples 27 to 32, and Reference Examples 7 and 8 corresponding to the optical component according to the second embodiment of the invention will be described. With regard to the deposition experiment, similarly to the experiment of Examples 9 to 12, Comparative Examples 21 to 26, and Reference Examples 5 and 6, the deposition instrument manufactured by SHINCRON Co., Ltd. was used to manufacture an anti-reflection film on the surface of white plate glass having a predetermined shape under the conditions of Examples and Comparative Examples.

Example 13

In Example 13, the IR-UV cut film 4 is formed on the substrate 1, and no fluorine-containing organic silicon compound film 3 is provided.

The layer configuration of the IR-UV cut film 4 of Example 13 is shown in Tables 18 to 22. Table 18 shows the relationship between the material of each layer and the film thickness. Tables 19 and 20 show the film formation condition of the outermost layer, and the like. Tables 21 and 22 show the film formation condition for the fifth layer to the 39th layer, and the like.

In Tables 18 to 20, the outermost layer 2S is the silicon oxide layer 2A which is a low-density layer having a density of 2.069 g/cm$^3$ and a refractive index n of 1.449. The thickness of the outermost layer 2S is 70.3 nm, and the relative value 4nd to the design wavelength is 0.419. The second layer 22 is the metal oxide layer 2B which is a low-density layer having a density of 7.91 g/cm$^3$ and made of tantalum oxide having a refractive index n of 2.144. The thickness of the second layer 22 is 86.3 nm, and the relative value 4nd to the design wavelength is 0.745. The third layer is the silicon oxide layer 2A which is a low-density layer having a density of 2.069 g/cm$^3$ and a refractive index n of 1.449. The thickness of the third layer is 146.6 nm, and the relative value 4nd to the design wavelength is 0.874. The fourth layer is metal oxide layer 2B which is a low-density layer having a density of 7.91 g/cm$^3$ and made of tantalum oxide having a refractive index n of 2.144. The thickness of the fourth layer is 88.6 nm, and the relative value 4nd to the design wavelength is 0.765.

In Tables 18, 21, and 22, the fifth layer is the silicon oxide layer 2A which is a high-density layer having a density of 2.213 g/cm$^3$ and a refractive index n of 1.481. The thickness of the fifth layer is 140.2 nm, and the relative value 4nd to the design wavelength is 0.845. The sixth layer is the metal oxide layer 2B which is a high-density layer having a density of 4.87 g/cm$^3$ and made of titanium oxide having a refractive index n of 2.489. The thickness of the sixth layer is 83.1 nm, and the relative value 4nd to the design wavelength is 0.772. Subsequently, the seventh layer to the 39th layer have the layer configuration described in Tables 18, 21, and 22. The total film thickness of the outermost layer 2S to the 39th layer is 4731.39 nm.

In forming the IR-UV cut film 4 configured as above on the substrate 1, in Example 13, the outermost layer 2S to the fourth layer are formed through ion-assisted electron beam deposition (IAD) with low assist power. The film formation temperature is 150° C. When a low-density layer is formed as the silicon oxide layer 2A, the vacuum pressure is 1.8×10$^{-2}$ Pa. Assist power has an acceleration voltage of 300 V and an acceleration current of 450 mA. When the metal oxide layer 2B is formed of tantalum oxide, the vacuum pressure is 1.8×10$^{-2}$ Pa. Assist power has an acceleration voltage of 300 V and an acceleration current of 450 mA. The fifth layer to the 39th layer are formed through ion-assisted electron beam deposition (IAD) with high assist power. In this case, in the same manner as when the silicon oxide layer 2A is formed and when the metal oxide layer 2B is formed of titanium oxide, assist power has an acceleration voltage of 1000 Vm and an acceleration current of 1200 mA. The surface roughness of the outermost layer 2S is 0.55 nm to 0.65 nm.

Example 14

Example 14 is different from Example 13 in that the fluorine-containing organic silicon compound film 3 is provided on the IR-UV cut film 4.

The fluorine-containing organic silicon compound film 3 is the same as in Example 9.

Example 15

Example 15 is different from Example 13 in terms of assist power for forming a low-density layer. That is, in Example 15, assist power is low assist power having an acceleration voltage of 400 V and an acceleration current of 500 mA. For this reason, the low-density layers constituting the silicon oxide layer 2A serving as the outermost layer 2S and the third layer have a density of 2.086 g/cm$^3$, and the low-density layers constituting the second layer 22 and the fourth layer, that is, the metal oxide layers 2B made of tantalum oxide have a density of 7.98 g/cm$^3$.

Example 16

Example 16 is different from Example 15 in that the fluorine-containing organic silicon compound film 3 is provided on the IR-UV cut film 4.

Comparative Example 27

Comparative Example 27 is different from Example 13 in terms of assist power for forming a low-density layer. That is, in Comparative Example 27, the outermost layer 2S to the fourth layer 24 are formed through ion-assisted electron beam deposition (IAD) with intermediate assist power having an acceleration voltage of 600 V and an acceleration current of 700 mA. For this reason, the low-density layers constituting the silicon oxide thin-film serving as the outermost layer and the third layer have a density of 2.172 g/cm$^3$, and the low-density layers constituting the second layer and the fourth layer, that is, the metal oxide layers 2B made of tantalum oxide have a density of 8.09 g/cm$^3$.

In Comparative Example 27, the surface roughness of the outermost layer is 0.57 nm to 0.67 nm, which is greater than in Examples 13 to 16.

Comparative Example 28

Comparative Example 28 is different from Comparative Example 27 in that the fluorine-containing organic silicon compound film 3 is provided on the IR-UV cut film 4.

Comparative Example 29

Comparative Example 29 is different from Example 13 in terms of assist power for forming a low-density layer. That is, in Comparative Example 29, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide layer serving as the outermost layer and the third layer have a density of 2.201 g/cm³, and the low-density layers constituting the second layer and the fourth layer, that is, the metal oxide layers 2B made of tantalum oxide have a density of 8.15 g/cm³.

In Comparative Example 29, the surface roughness of the outermost layer is 0.6 nm to 0.7 nm, which is greater than in Examples 13 to 16.

Comparative Example 30

Comparative Example 30 is different from Comparative Example 29 in that the fluorine-containing organic silicon compound film 3 is provided on the IR-UV cut film 4.

Comparative Example 31

Comparative Example 31 is different from Example 13 in terms of assist power for forming a low-density layer. That is, in Comparative Example 31, all layers are formed through ion-assisted electron beam deposition (IAD) with high assist power having an acceleration voltage of 1000 V and an acceleration current of 1200 mA. For this reason, the low-density layers constituting the silicon oxide layer serving as the outermost layer and the third layer have a density of 2.213 g/cm³, and the low-density layers constituting the second layer and the fourth layer, that is, the metal oxide layers 2B made of tantalum oxide have a density of 8.19 g/cm³.

In Comparative Example 31, the surface roughness of the outermost layer is 0.62 nm to 0.72 nm, which is greater than in Examples 13 to 16.

Comparative Example 32

Comparative Example 32 is different from Comparative Example 31 in that the fluorine-containing organic silicon compound film 3 is provided on the IR-UV cut film 4.

Reference Example 7

In Reference Example 7, an IR-UV cut film has an outermost layer constituted by a silicon oxide thin-film having a thickness of 71.8 nm, a second layer constituted by the metal oxide layer 2B made of titanium oxide having a thickness of 84.2 nm, a third layer constituted by a silicon oxide layer having a thickness of 147.2 nm, a fourth layer constituted by the metal oxide layer 2B made of titanium oxide having a thickness of 83.6 nm, a fifth layer constituted by the silicon oxide layer having a thickness of 140.2 nm, and a sixth layer constituted by the metal oxide layer 2B made of titanium oxide having a thickness of 83.1 nm. The total film thickness of the 39 layers is 4726.25 nm. The layer configuration of Reference Example 7 is shown in Table 23. In Reference Example 7, the surface roughness of the outermost layer is 0.55 nm to 0.65 nm, which is greater than in Examples 13 to 16. In Reference Example 7, film formation is performed by the same method as in Example 13. The design wavelength is 967 nm.

Reference Example 8

Reference Example 8 is different from Reference Example 7 in that the fluorine-containing organic silicon compound film is provided on the IR-UV cut film.

TABLE 18

| Layer | Material | d (nm) | 4nd | Film Formation Condition |
|---|---|---|---|---|
| Incidence Medium | Air | | | |
| Outermost Layer | SiO$_2$ | 70.3 | 0.419 | Low Assist Power |
| Second Layer | Ta$_2$O$_5$ | 86.3 | 0.745 | Low Assist Power |
| Third Layer | SiO$_2$ | 146.6 | 0.874 | Low Assist Power |
| Fourth Layer | Ta$_2$O$_5$ | 88.6 | 0.765 | Low Assist Power |
| Fifth Layer | SiO$_2$ | 140.2 | 0.845 | High Assist Power |
| Sixth Layer | TiO$_2$ | 83.1 | 0.772 | High Assist Power |
| Seventh Layer | SiO$_2$ | 139.2 | 0.839 | High Assist Power |
| Eighth Layer | TiO$_2$ | 81.4 | 0.756 | High Assist Power |
| Ninth Layer | SiO$_2$ | 139.8 | 0.843 | High Assist Power |
| Tenth Layer | TiO$_2$ | 81.1 | 0.753 | High Assist Power |
| 11th Layer | SiO$_2$ | 139.4 | 0.841 | High Assist Power |
| 12th Layer | TiO$_2$ | 81.0 | 0.752 | High Assist Power |
| 13th Layer | SiO$_2$ | 139.4 | 0.841 | High Assist Power |
| 14th Layer | TiO$_2$ | 82.0 | 0.761 | High Assist Power |
| 15th Layer | SiO$_2$ | 140.8 | 0.849 | High Assist Power |
| 16th Layer | TiO$_2$ | 83.3 | 0.773 | High Assist Power |
| 17th Layer | SiO$_2$ | 143.2 | 0.863 | High Assist Power |
| 18th Layer | TiO$_2$ | 86.7 | 0.805 | High Assist Power |
| 19th Layer | SiO$_2$ | 150.6 | 0.908 | High Assist Power |
| 20th Layer | TiO$_2$ | 100.4 | 0.932 | High Assist Power |
| 21st Layer | SiO$_2$ | 179.7 | 1.083 | High Assist Power |
| 22nd Layer | TiO$_2$ | 110.0 | 1.021 | High Assist Power |
| 23rd Layer | SiO$_2$ | 169.7 | 1.023 | High Assist Power |
| 24th Layer | TiO$_2$ | 101.5 | 0.942 | High Assist Power |
| 25th Layer | SiO$_2$ | 175.7 | 1.059 | High Assist Power |
| 26th Layer | TiO$_2$ | 115.0 | 1.067 | High Assist Power |
| 27th Layer | SiO$_2$ | 189.1 | 1.140 | High Assist Power |
| 28th Layer | TiO$_2$ | 116.5 | 1.081 | High Assist Power |
| 29th Layer | SiO$_2$ | 191.2 | 1.153 | High Assist Power |
| 30th Layer | TiO$_2$ | 119.4 | 1.108 | High Assist Power |
| 31st Layer | SiO$_2$ | 189.9 | 1.145 | High Assist Power |
| 32nd Layer | TiO$_2$ | 117.5 | 1.091 | High Assist Power |
| 33rd Layer | SiO$_2$ | 193.2 | 1.165 | High Assist Power |
| 34th Layer | TiO$_2$ | 116.7 | 1.083 | High Assist Power |
| 35th Layer | SiO$_2$ | 184.2 | 1.110 | High Assist Power |
| 36th Layer | TiO$_2$ | 119.1 | 1.105 | High Assist Power |
| 37th Layer | SiO$_2$ | 44.8 | 0.270 | High Assist Power |
| 38th Layer | TiO$_2$ | 11.8 | 0.110 | High Assist Power |
| 39th Layer | SiO$_2$ | 82.9 | 0.500 | High Assist Power |
| Emergence Medium | Glass | | | | n is a refractive index
total film thickness: 4731.39 nm
design wavelength: 967 nm

TABLE 19

| | Film Formation Method of First to Fourth Layers | Film Formation Temperature | Odd-Numbered Layer (SiO$_2$) Rate (Å/sec) | Odd-Numbered Layer (SiO$_2$) Vacuum Pressure (O$_2$) | Odd-Numbered Layer (SiO$_2$) Assist Power | Odd-Numbered Layer (SiO$_2$) Density (g/cm³) | Odd-Numbered Layer (SiO$_2$) Refractive Index (at 550 nm) |
|---|---|---|---|---|---|---|---|
| Example 13, 14 | IAD | 150° C. | 7 | 1.8E−2 Pa | 300 V 450 mA | 2.069 | 1.449 |
| Example 15, 16 | IAD | 150° C. | 7 | 1.8E−2 Pa | 400 V 500 mA | 2.086 | 1.453 |
| Comparative Example 27, 28 | IAD | 150° C. | 7 | 1.8E−2 Pa | 600 V 700 mA | 2.172 | 1.461 |

TABLE 19-continued

| | Film Formation Method of First to Fourth Layers | Film Formation Temperature | Odd-Numbered Layer (SiO$_2$) Rate (Å/sec) | Odd-Numbered Layer (SiO$_2$) Vacuum Pressure (O$_2$) | Odd-Numbered Layer (SiO$_2$) Assist Power | Odd-Numbered Layer (SiO$_2$) Density (g/cm$^3$) | Odd-Numbered Layer (SiO$_2$) Refractive Index (at 550 nm) |
|---|---|---|---|---|---|---|---|
| Comparative Example 29, 30 | IAD | 150° C. | 7 | 1.8E−2 Pa | 800 V 900 mA | 2.201 | 1.473 |
| Comparative Example 31, 32 | IAD | 150° C. | 7 | 1.8E−2 Pa | 1000 V 1200 mA | 2.213 | 1.481 |
| Reference Example 7, 8 | IAD | 150° C. | 7 | 1.8E−2 Pa | 300 V 450 mA | 2.069 | 1.449 |

TABLE 20

| | Film Formation Method of First to Fourth Layers | Film Formation Temperature | Even-Numbered Layer Rate (Å/sec) | Even-Numbered Layer Vacuum Pressure (O$_2$) | Even-Numbered Layer Assist Power | Even-Numbered Layer Density (g/cm$^3$) | Even-Numbered Layer Refractive Index (at 550 nm) |
|---|---|---|---|---|---|---|---|
| Example 13, 14 | IAD | 150° C. | 3 | 1.8E−2 Pa | 300 V 450 mA | 7.91 | 2.144 |
| Example 15, 16 | IAD | 150° C. | 3 | 1.8E−2 Pa | 400 V 500 mA | 7.98 | 2.167 |
| Comparative Example 27, 28 | IAD | 150° C. | 3 | 1.8E−2 Pa | 600 V 700 mA | 8.09 | 2.201 |
| Comparative Example 29, 30 | IAD | 150° C. | 3 | 1.8E−2 Pa | 800 V 900 mA | 8.15 | 2.217 |
| Comparative Example 31, 32 | IAD | 150° C. | 3 | 1.8E−2 Pa | 1000 V 1200 mA | 8.19 | 2.221 |
| Reference Example 7, 8 | IAD | 150° C. | 3 | 1.8E−2 Pa | 300 V 450 mA | 4.65 | 2.466 |

TABLE 21

| | Film Formation Method of Fifth Layer and Subsequent Layers | Film Formation Temperature | Odd-Numbered Layer (SiO$_2$) Rate (Å/sec) | Odd-Numbered Layer (SiO$_2$) Vacuum Pressure (O$_2$) | Odd-Numbered Layer (SiO$_2$) Assist Power | Odd-Numbered Layer (SiO$_2$) Density (g/cm$^3$) | Odd-Numbered Layer (SiO$_2$) Refractive Index (at 550 nm) |
|---|---|---|---|---|---|---|---|
| Example 13, 14 | IAD | 150° C. | 7 | 1.8E−2 Pa | 1000 V 1200 mA | 2.213 | 1.481 |
| Example 15, 16 | IAD | 150° C. | 7 | 1.8E−2 Pa | 1000 V 1200 mA | 2.213 | 1.481 |
| Comparative Example 27, 28 | IAD | 150° C. | 7 | 1.8E−2 Pa | 1000 V 1200 mA | 2.213 | 1.481 |
| Comparative Example 29, 30 | IAD | 150° C. | 7 | 1.8E−2 Pa | 1000 V 1200 mA | 2.213 | 1.481 |
| Comparative Example 31, 32 | IAD | 150° C. | 7 | 1.8E−2 Pa | 1000 V 1200 mA | 2.213 | 1.481 |
| Reference Example 7, 8 | IAD | 150° C. | 7 | 1.8E−2 Pa | 1000 V 1200 mA | 2.213 | 1.481 |

TABLE 22

| | Film Formation Method of Fifth Layer and Subsequent Layers | Film Formation Temperature | Even-Numbered Layer Rate (Å/sec) | Even-Numbered Layer Vacuum Pressure (O$_2$) | Even-Numbered Layer Assist Power | Even-Numbered Layer Density (g/cm$^3$) | Even-Numbered Layer Refractive Index (at 550 nm) | Surface Roughness (nm) | Surface Resistance (Ω/□) |
|---|---|---|---|---|---|---|---|---|---|
| Example 13, 14 | IAD | 150° C. | 3 | 2.1E−2 Pa | 1000 V 1200 mA | 4.87 | 2.489 | 0.55 to 0.65 | 7.71E+10 |
| Example 15, 16 | IAD | 150° C. | 3 | 2.1E−2 Pa | 1000 V 1200 mA | 4.87 | 2.489 | 0.55 to 0.65 | 2.93E+11 |
| Comparative Example 27, 28 | IAD | 150° C. | 3 | 2.1E−2 Pa | 1000 V 1200 mA | 4.87 | 2.489 | 0.57 to 0.67 | 2.46E+13 |

TABLE 22-continued

| | Film Formation Method of Fifth Layer and Subsequent Layers | Film Formation Temperature | Even-Numbered Layer Rate (Å/sec) | Even-Numbered Layer Vacuum Pressure (O₂) | Even-Numbered Layer Assist Power | Even-Numbered Layer Density (g/cm³) | Even-Numbered Layer Refractive Index (at 550 nm) | Surface Roughness (nm) | Surface Resistance (Ω/□) |
|---|---|---|---|---|---|---|---|---|---|
| Comparative Example 29, 30 | IAD | 150° C. | 3 | 2.1E−2 Pa | 1000 V 1200 mA | 4.87 | 2.489 | 0.6 to 0.7 | 7.80E+14 |
| Comparative Example 31, 32 | IAD | 150° C. | 3 | 2.1E−2 Pa | 1000 V 1200 mA | 4.87 | 2.489 | 0.62 to 0.72 | 1.00E+15 |
| Reference Example 7, 8 | IAD | 150° C. | 3 | 2.1E−2 Pa | 1000 V 1200 mA | 4.87 | 2.489 | 0.6 to 0.7 | 6.87E+10 |

TABLE 23

| Layer | Material | d (nm) | 4nd | Film Formation Condition |
|---|---|---|---|---|
| Incidence Medium | Air | | | |
| Outermost Layer | SiO₂ | 71.8 | 0.433 | Low Assist Power |
| Second Layer | TiO₂ | 84.2 | 0.782 | Low Assist Power |
| Third Layer | SiO₂ | 147.2 | 0.887 | Low Assist Power |
| Fourth Layer | TiO₂ | 83.6 | 0.776 | Low Assist Power |
| Fifth Layer | SiO₂ | 140.2 | 0.845 | High Assist Power |
| Sixth Layer | TiO₂ | 83.1 | 0.772 | High Assist Power |
| Seventh Layer | SiO₂ | 139.2 | 0.839 | High Assist Power |
| Eighth Layer | TiO₂ | 81.4 | 0.756 | High Assist Power |
| Ninth Layer | SiO₂ | 139.8 | 0.843 | High Assist Power |
| Tenth Layer | TiO₂ | 81.1 | 0.753 | High Assist Power |
| 11th Layer | SiO₂ | 139.4 | 0.841 | High Assist Power |
| 12th Layer | TiO₂ | 81.0 | 0.752 | High Assist Power |
| 13th Layer | SiO₂ | 139.4 | 0.841 | High Assist Power |
| 14th Layer | TiO₂ | 82.0 | 0.761 | High Assist Power |
| 15th Layer | SiO₂ | 140.8 | 0.849 | High Assist Power |
| 16th Layer | TiO₂ | 83.3 | 0.773 | High Assist Power |
| 17th Layer | SiO₂ | 143.2 | 0.863 | High Assist Power |
| 18th Layer | TiO₂ | 86.7 | 0.805 | High Assist Power |
| 19th Layer | SiO₂ | 150.6 | 0.908 | High Assist Power |
| 20th Layer | TiO₂ | 100.4 | 0.932 | High Assist Power |
| 21st Layer | SiO₂ | 179.7 | 1.083 | High Assist Power |
| 22nd Layer | TiO₂ | 110.0 | 1.021 | High Assist Power |
| 23rd Layer | SiO₂ | 169.7 | 1.023 | High Assist Power |
| 24th Layer | TiO₂ | 101.5 | 0.942 | High Assist Power |
| 25th Layer | SiO₂ | 175.7 | 1.059 | High Assist Power |
| 26th Layer | TiO₂ | 115.0 | 1.067 | High Assist Power |
| 27th Layer | SiO₂ | 189.1 | 1.140 | High Assist Power |
| 28th Layer | TiO₂ | 116.5 | 1.081 | High Assist Power |
| 29th Layer | SiO₂ | 191.2 | 1.153 | High Assist Power |
| 30th Layer | TiO₂ | 119.4 | 1.108 | High Assist Power |
| 31st Layer | SiO₂ | 189.9 | 1.145 | High Assist Power |
| 32nd Layer | TiO₂ | 117.5 | 1.091 | High Assist Power |
| 33rd Layer | SiO₂ | 193.2 | 1.165 | High Assist Power |
| 34th Layer | TiO₂ | 116.7 | 1.083 | High Assist Power |
| 35th Layer | SiO₂ | 184.2 | 1.110 | High Assist Power |
| 36th Layer | TiO₂ | 119.1 | 1.105 | High Assist Power |
| 37th Layer | SiO₂ | 44.8 | 0.270 | High Assist Power |
| 38th Layer | TiO₂ | 11.8 | 0.110 | High Assist Power |
| 39th Layer | SiO₂ | 82.9 | 0.500 | High Assist Power |
| Emergence Medium | Glass | | | | n is a refractive index
total film thickness: 4726.25 nm
design wavelength: 967 nm Experiment Result 1 Measurement of Surface Resistance (Sheet Resistance)

In measuring the surface resistance, the same apparatus as in Examples 9 to 12, Comparative Examples 21 to 26, and Comparative Examples 5 and 6 was used to measure the surface resistance. The result is shown in Table 22.

As shown in Table 22, it can be seen that the surface resistance in Examples 13 to 16 is low compared to Comparative Examples 27 to 32 or Reference Examples 7 and 8. The low surface resistance means that adhesion of dust or grit to the surface due to static electricity is reduced.

2 Relationship Between Surface Resistance and Total Film Thickness

Figure 13:
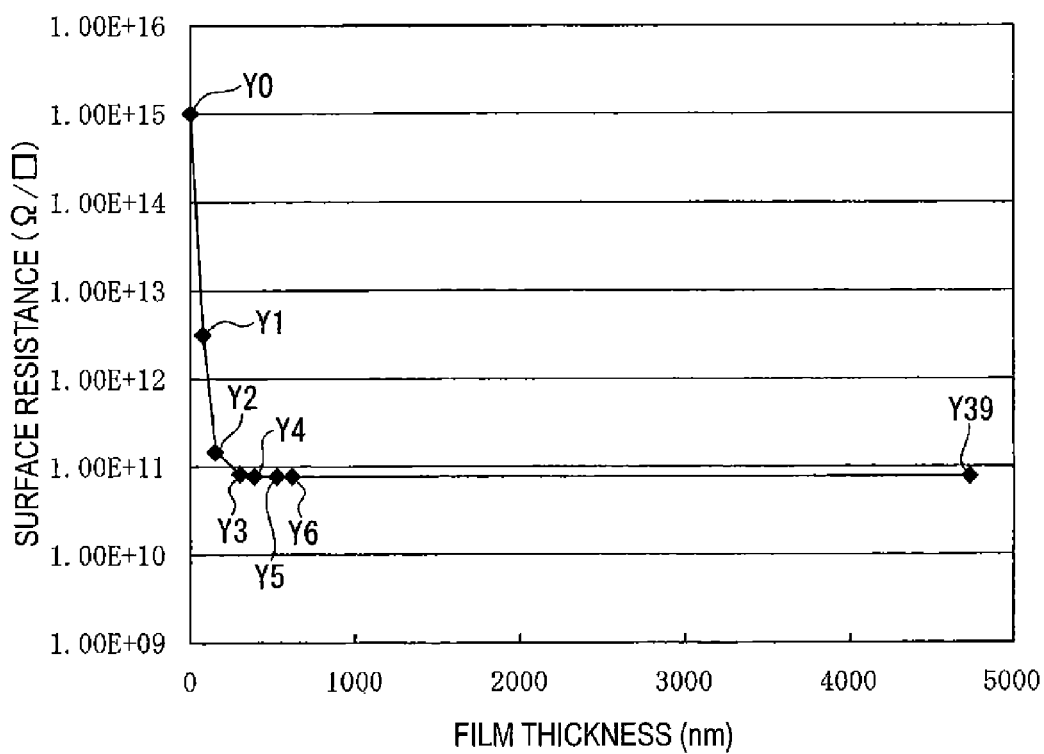
FIG. 13 is a graph showing the relationship between a film thickness and surface resistance in Example 13.

FIG. 13 shows the relationship between a film thickness and surface resistance in Example 13.

In FIG. 13, Y0 is surface resistance ($1.0 \times 10^{15}$ Ω/□) when all layers are formed through electron beam deposition with high assist power. Y1 is surface resistance ($3.17 \times 10^{12}$ Ω/□) when only the outermost layer having a thickness of 70.29 nm is formed through electron beam deposition with low assist power (an acceleration voltage is 300 V and an acceleration current is 450 mV). Y2 is surface resistance ($1.46 \times 10^{11}$ Ω/□) when the outermost layer and the second layer are formed through electron beam deposition with low assist power. Y3 is surface resistance ($7.95 \times 10^{10}$ Ω/□) when the outermost layer to the third layer are formed through electron beam deposition with low assist power. Y4 is surface resistance ($7.71 \times 10^{10}$ Ω/□) when the outermost layer to the fourth layer are formed through electron beam deposition with low assist power. Y5 is surface resistance ($7.67 \times 10^{10}$ Ω/□) when the outermost layer to the fifth layer are formed through electron beam deposition with low assist power. Y6 is surface resistance ($7.61 \times 10^{10}$ Ω/□) when the outermost layer to the sixth layer are formed through electron beam deposition with low assist power. Y39 is surface resistance ($7.59 \times 10^{10}$ Ω/□) when all layers of the outermost layer to the 39th layer are formed through electron beam deposition with low assist power.

As shown in FIG. 13, it can be seen that, if the number of bonded layers including the outermost layer is large, the value of surface resistance is reduced. Meanwhile, it can be seen that, when the outermost layer to the fourth layer are formed through electron beam deposition with low assist power and when all layers (39 layers) including the outermost layer are formed through electron beam deposition with low assist power, the value of surface resistance is not changed so much. For this reason, in this example, it will suffice that the outermost layer to the fourth layer (film thickness 391.86 nm) are formed through electron beam deposition with low assist power.

Table 24 shows the results of dust-proof performance by the polyethylene powder method, the Kanto loam method, and the cotton linter method.

As shown in Table 24, in the case of the polyethylene powder method, it can be seen that the adhered dust quantity and the residual quantity in Examples 13 and 15 are small compared to Comparative Examples 27, 29, and 31 or Reference Example 7, and the adhered dust quantity and the residual quantity in Examples 14 and 16 are small compared to Comparative Examples 28 and 30 or Reference Example 8.

As described above, the adhered dust quantity and the residual quantity in Examples 13 and 15 are small compared to Reference Example 7, and the adhered dust quantity and the residual quantity in Examples 14 and 16 are small compared to Reference Example 8 because Ta has small electronegativity compared to Ti.

The electronegativity can be interpreted as minimum energy necessary for separating foreign particles from the surface. If the value is small, foreign particles are easily separated from the surface. For this reason, the use of oxide containing an element having small electronegativity enables improvement in dust-proof performance.

With regard to Examples, Comparative Examples, and Reference Examples, it can be seen that the adhered dust quantity and the residual quantity in Examples 14 and 16, Comparative Examples 28, 30, and 32, and Reference Example 8 where the fluorine-containing organic silicon compound film 3 is provided are small compared to Examples 13 and 15, Comparative Examples 27, 29, and 31, and Reference Example 7 where no fluorine-containing organic silicon compound film 3 is provided. In the case of the Kanto loam method and the cotton linter method, similarly to the polyethylene powder method, with regard to Examples, Comparative Examples, and Reference Examples, it can be seen that the adhered dust quantity and the residual quantity in Examples 13 to 16 are small compared to Comparative Examples 27 to 32 or Reference Examples 7 and 8. The above results are obtained because the surface roughness is improved, and dust or grit is less likely to adhere to the surface.

(refractive index n=1.52) having a diameter of 30 mm and a thickness of 0.3 mm under the conditions of Examples and Comparative Examples.

Example 17

In Example 17, the anti-reflection film 2 is formed on the substrate 1, and no fluorine-containing organic silicon compound film 3 is provided.

The layer configuration of the anti-reflection film 2 of Example 17 is shown in Tables 25 to 27. In these tables, the outermost layer 2S is the silicon oxide layer 2A which is a low-density layer having a density of 2.069 g/cm³ and a refractive index n of 1.449. The thickness of the outermost layer 2S is 86.0 nm, and the optical film thickness is 1.449× 86.0 nm=124.614 nm. The relative value 4nd of the optical film thickness to the design wavelength (in Example 1, 510 nm) (hereinafter, simply referred to as the relative value to the design wavelength) is 0.979. That is, in design of the optical thin-film, since ¼ of the design wavelength is used as a basis, the value of the optical thin-film nd (1.449×86.0) to the relevant value (127.5) becomes 0.979. The second layer 22 is the metal oxide layer 2B which is a low-density layer having a density of 4.65 g/cm³ and made of titanium oxide having a refractive index n of 2.466. The thickness of the second layer 22 is 102.7 nm, and the relative value 4nd to the design wavelength is 2.014. The third layer 23 is the silicon oxide layer 2A which is a low-density layer having a density of 2.069 g/cm³ and a refractive index n of 1.449. The thickness

TABLE 24

| Film | Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
| | | | | | Adhered dust quantity | Residual Quantity | Adhered dust quantity | Residual Quantity | Adhered dust quantity | Residual Quantity |
| Example 13 | IAD | 300 | 450 | None | 2.23% | 0.38% | 0.15% | 0.01% | 2.98% | 0.58% |
| Example 14 | IAD | 300 | 450 | Provided | 0.05% | 0.01% | 0.17% | 0.01% | 1.97% | 0.17% |
| Example 15 | IAD | 400 | 500 | None | 2.98% | 0.51% | 0.21% | 0.01% | 3.11% | 0.63% |
| Example 16 | IAD | 400 | 500 | Provided | 0.08% | 0.01% | 0.22% | 0.01% | 2.29% | 0.20% |
| Comparative Example 27 | IAD | 600 | 700 | None | 7.67% | 1.05% | 0.91% | 0.10% | 4.23% | 0.89% |
| Comparative Example 28 | IAD | 600 | 700 | Provided | 0.87% | 0.17% | 1.03% | 0.10% | 3.76% | 0.36% |
| Comparative Example 29 | IAD | 800 | 900 | None | 10.95% | 2.68% | 1.95% | 0.41% | 7.97% | 1.32% |
| Comparative Example 30 | IAD | 800 | 900 | Provided | 3.21% | 0.96% | 2.61% | 0.87% | 8.15% | 0.67% |
| Comparative Example 31 | IAD | 1000 | 1200 | None | 20.12% | 4.11% | 3.02% | 0.79% | 13.86% | 2.34% |
| Comparative Example 32 | IAD | 1000 | 1200 | Provided | 4.33% | 1.49% | 5.89% | 1.30% | 11.92% | 1.08% |
| Reference Example 7 | IAD | 300 | 450 | None | 3.01% | 0.45% | 0.27% | 0.02% | 2.58% | 0.52% |
| Reference Example 8 | IAD | 300 | 450 | Provided | 0.12% | 0.01% | 0.15% | 0.01% | 1.55% | 0.12% |

Next, examples of an optical component having a titanium oxide layer and a silicon oxide layer will be described.
Optical Component having Titanium Oxide Layer and Silicon Oxide Layer Examples 17 to 20 and Comparative Examples 33 to 40 corresponding to the optical component according to the first embodiment of the invention will be described.

With regard to a deposition experiment, a deposition instrument (product name: SID-1350) manufactured by SHINCRON Co., Ltd. was used. In the experiment, an anti-reflection film was manufactured on the surface of a sample having a predetermined shape, for example, white plate glass of the third layer 23 is 30.6 nm, and the relative value 4nd, to the design wavelength is 0.349. The fourth layer 24 is the metal oxide layer 2B which is a low-density layer having a density of 4.65 g/cm³ and made of titanium oxide having a refractive index n of 2.466. The thickness of the fourth layer 24 is 12.1 nm, and the relative value 4nd to the design wavelength is 0.237. The fifth layer 25 is the silicon oxide layer 2A which is a high-density layer having a density of 2.213 g/cm³ and a refractive index n of 1.481. The thickness of the fifth layer 25 is 136.6 nm, and the relative value 4nd to the design wavelength is 1.573. The total thickness of the outermost layer 2S to the fifth layer 25 is 367.9 nm.

In forming the anti-reflection film 2 configured as above on the substrate 1, in Example 17, the outermost layer 2S to the fourth layer 24 are formed through ion-assisted electron beam deposition (IAD) with low assist power. The film formation temperature is 150° C. When a low-density layer is formed as the silicon oxide layer 2A, the vacuum pressure is $1.8 \times 10^{-2}$ Pa. Assist power has an acceleration voltage of 300 V and an acceleration current of 450 mA. When a titanium oxide is formed as the metal oxide layer 2B, the vacuum pressure is $2.1 \times 10^{-2}$ Pa. Assist power has an acceleration voltage of 300 V and an acceleration current of 450 mA. Thus, the surface roughness of the outermost layer 2S becomes 0.6 nm to 0.7 nm. The fifth layer 25 is formed through ion-assisted electron beam deposition (IAD) with high assist power. In this case, assist power has an acceleration voltage of 1000 Vm and an acceleration current of 1200 mA.

Example 18

Example 18 is different from Example 17 in that the fluorine-containing organic silicon compound film 3 is provided on the anti-reflection film 2.

With regard to the fluorine-containing organic silicon compound film 3, for example, as a deposition source, a material is used which is obtained by diluting a fluorine-containing organic silicon compound (product name: KY-130) manufactured by Shin-Etsu Chemical Co., Ltd. with a fluorine-based solvent (manufactured by Sumitomo 3M Ltd.: Novec HFE-7200) to prepare a solution having a solid content concentration of 3%, impregnating 1 g of the solution into a porous ceramic pellet, and performing drying.

Example 19

Example 19 is different from Example 17 in terms of assist power for forming a low-density layer. That is, in Example 19, assist power is low assist power having an acceleration voltage of 400 V and an acceleration current of 500 mA. For this reason, the low-density layers constituting the silicon oxide layer 2A serving as the outermost layer 2S and the third layer 23 have a density of 2.086 g/cm$^3$, and the low-density layers constituting the second layer 22 and the fourth layer 24, that is, the metal oxide layers 2B made of titanium oxide have a density of 4.69 g/cm$^3$. The density of the fifth layer 25 is the same as in Example 17.

Example 20

Example 20 is different from Example 19 in that the fluorine-containing organic silicon compound film 3 is provided on the anti-reflection film 2.

Comparative Example 33

Comparative Example 33 is different from Example 17 in terms of assist power for forming a low-density layer. That is, in Comparative Example 33, the outermost layer 2S to the fourth layer 24 are formed through ion-assisted electron beam deposition (IAD) with intermediate assist power having an acceleration voltage of 600 V and an acceleration current of 700 mA. For this reason, the low-density layers constituting the silicon oxide layer serving as the outermost layer and the third layer have a density of 2.172 g/cm$^3$, and the low-density layers constituting the second layer and the fourth layer, that is, the metal oxide layers 2B made of titanium oxide have a density of 4.79 g/cm$^3$. In Comparative Example 33, the surface roughness of the outermost layer is 0.62 nm to 0.72 nm, which is greater than in Examples 17 to 20.

Comparative Example 34

Comparative Example 34 is different from Comparative Example 33 in that the fluorine-containing organic silicon compound film is provided on the anti-reflection film.

Comparative Example 35

Comparative Example 35 is different from Example 17 in terms of assist power for forming a low-density layer. That is, in Comparative Example 35, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide layer serving as the outermost layer and the third layer have a density of 2.201 g/cm$^3$, and the low-density layers constituting the second layer and the fourth layer, that is, the metal oxide layers 2B made of titanium oxide have a density of 4.89 g/cm$^3$. In Comparative Example 35, the surface roughness of the outermost layer is 0.65 nm to 0.75 nm, which is greater than in Examples 17 to 20.

Comparative Example 36

Comparative Example 36 is different from Comparative Example 35 in that the fluorine-containing organic silicon compound film is provided on the anti-reflection film.

Comparative Example 37

Comparative Example 37 is different from Example 17 in terms of assist power for forming a low-density layer. That is, in Comparative Example 37, all layers are formed through ion-assisted electron beam deposition (IAD) with high assist power having an acceleration voltage of 1000 V and an acceleration current of 1200 mA. For this reason, the low-density layers constituting the silicon oxide layer serving as the outermost layer and the third layer have a density of 2.213 g/cm$^3$, and the low-density layers constituting the second layer and the fourth layer, that is, the metal oxide layers 2B made of titanium oxide have a density of 4.87 g/cm$^3$. In Comparative Example 37, the surface roughness of the outermost layer is 0.67 nm to 0.77 nm, which is greater than in Examples 17 to 20.

Comparative Example 38

Comparative Example 38 is different from Comparative Example 37 in that the fluorine-containing organic silicon compound film is provided on the anti-reflection film.

Comparative Example 39

Comparative Example 39 has the same layer configuration as in Example 17, but, unlike Example 17, the film formation method is the same as in the related art described in Japanese Patent No. 4207083. That is, in Comparative Example 39, the outermost layer is formed through electron deposition (EB) without using ion assist, and the film formation method for the layers other than the outermost layer is the same as in Comparative Example 37. The second layer to the fifth layer were formed through ion-assisted electron beam deposition (IAD) with high assist power having an acceleration voltage of 1000 V and an acceleration current of 1200 mA. The vacuum pressured at the time of forming silicon oxide for the outermost layer is $8.0 \times 10^{-3}$ Pa. For this reason, the silicon oxide layer of the outermost layer has a density of 2.037 g/cm³. In Comparative Example 39, the surface roughness of the outermost layer is 0.8 nm to 0.95 nm, which is greater than in Examples 17 to 20.

Comparative Example 40

Comparative Example 40 is different from Comparative Example 39 in that the fluorine-containing organic silicon compound film is provided on the anti-reflection film.

With the above, it can be seen that the surface roughness of the outermost layer corresponds to assist power when the outermost layer is formed. That is, in Examples 17 to 20, the outermost layer is formed with low assist power having an acceleration voltage of 300 V to 400 V (an acceleration current of 450 mA to 500 mA), such that the surface roughness of the outermost layer becomes 0.60 nm to 0.70 nm. Meanwhile, in Comparative Examples 33 to 36, the outermost layer is formed with intermediate assist power having an acceleration voltage of 600 V to 800 V (an acceleration current of 700 mA to 900 mA), such that the surface roughness of the outermost layer becomes 0.62 nm to 0.75 nm. In Comparative Examples 37 and 38, the outermost layer is formed with high assist power having an acceleration voltage of 1000 V (an acceleration current of 1200 mA), such that the surface roughness of the outermost layer becomes 0.67 nm to 0.77 nm.

TABLE 25

| Layer | Material | d (nm) | 4nd |
|---|---|---|---|
| Incidence Medium | Air | | |
| Outermost Layer | SiO₂ | 86.0 | 0.979 |
| Second Layer | TiO₂ | 102.7 | 2.014 |
| Third Layer | SiO₂ | 30.6 | 0.349 |
| Fourth Layer | TiO₂ | 12.1 | 0.237 |
| Fifth Layer | SiO₂ | 136.6 | 1.573 |
| Emergence Medium | Glass | | | n is a refractive index
total film thickness: 367.9 nm
design wavelength: 510 nm

TABLE 26

| | Film Formation Method of First to Fourth Layers | Film Formation Temperature | SiO₂ Rate (Å/sec) | SiO₂ Vaccum Pressure (O₂) | SiO₂ Assist Power | SiO₂ Density (g/cm³) | SiO₂ Refractive Index (at 550 nm) |
|---|---|---|---|---|---|---|---|
| Example 17, 18 | IAD | 150° C. | 7 | 1.8E−2 Pa | 300 V 450 mA | 2.069 | 1.449 |
| Example 19, 20 | IAD | 150° C. | 7 | 1.8E−2 Pa | 400 V 500 mA | 2.086 | 1.453 |
| Comparative Example 33, 34 | IAD | 150° C. | 7 | 1.8E−2 Pa | 600 V 700 mA | 2.172 | 1.461 |
| Comparative Example 35, 36 | IAD | 150° C. | 7 | 1.8E−2 Pa | 800 V 900 mA | 2.201 | 1.473 |
| Comparative Example 37, 38 | IAD | 150° C. | 7 | 1.8E−2 Pa | 1000 V 1200 mA | 2.213 | 1.481 |
| Comparative Example 39, 40 | EB | 150° C. | 7 | 8.0E−3 Pa | — | 2.037 | 1.44 |

TABLE 27

| | Film Formation Method of First to Fourth Layers | Film Formation Temperature | TiO₂ Rate (Å/sec) | TiO₂ Vaccum Pressure (O₂) | TiO₂ Assist Power | TiO₂ Density (g/cm³) | TiO₂ Refractive Index (at 550 nm) | Surface Roughness (nm) | Surface Resistance (Ω/□) |
|---|---|---|---|---|---|---|---|---|---|
| Example 17, 18 | IAD | 150° C. | 3 | 2.1E−2 Pa | 300 V 450 mA | 4.65 | 2.466 | 0.6 to 0.7 | 5.77E+10 |
| Example 19, 20 | IAD | 150° C. | 3 | 2.1E−2 Pa | 400 V 500 mA | 4.69 | 2.473 | 0.6 to 0.7 | 2.23E+11 |
| Comparative Example 33, 34 | IAD | 150° C. | 3 | 2.1E−2 Pa | 600 V 700 mA | 4.79 | 2.487 | 0.62 to 0.72 | 4.85E+12 |
| Comparative Example 35, 36 | IAD | 150° C. | 3 | 2.1E−2 Pa | 800 V 900 mA | 4.89 | 2.497 | 0.65 to 0.75 | 1.00E+15 |
| Comparative Example 37, 38 | IAD | 150° C. | 3 | 2.1E−2 Pa | 1000 V 1200 mA | 4.87 | 2.489 | 0.67 to 0.77 | 1.00E+15 |
| Comparative Example 39, 40 | IAD | 150° C. | 3 | 2.1E−2 Pa | 1000 V 1200 mA | 4.87 | 2.489 | 0.8 to 0.95 | 8.16E+12 |

Experiment Result
1 Measurement of surface resistance (sheet resistance)

In measuring the surface resistance, the surface resistance measurement instrument 504 shown in FIG. 7A is used. The surface resistance measurement instrument 504 and the stage 506 are configured as above, and the measurement condition and the measurement environment are the same as in the above-described experiment.

With regard to Examples and Comparative Examples, the surface resistance of the sample was measured. The results are shown in Table 27. A representative example from among the experiment results is shown in FIG. 14 as a graph.

Figure 14:
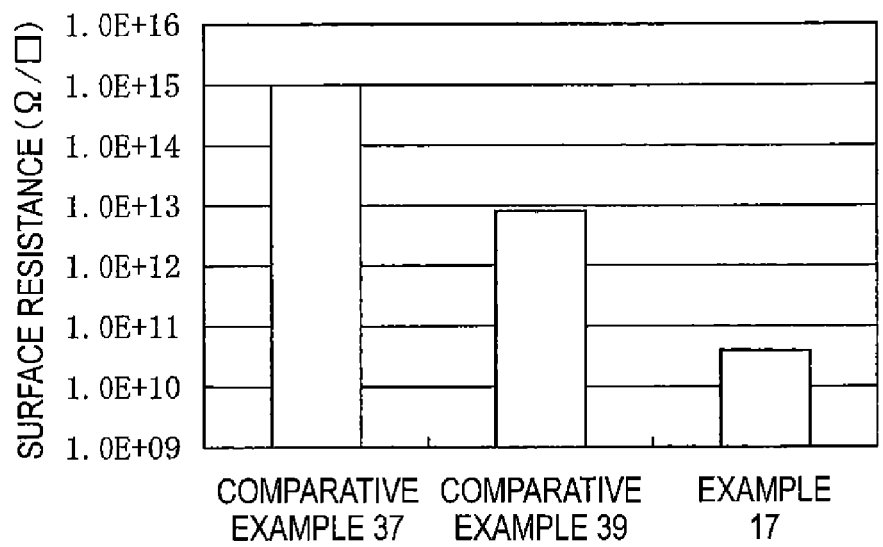
FIG. 14 is a graph showing surface resistance in Example 17, Comparative Example 37, and Comparative Example 39.

FIG. 14 shows Example 17 where deposition is performed with low assist power, Comparative Example 37 where deposition is performed with high assist power, and Comparative Example 39 corresponding to the related art in Example 17 and Comparative Examples 37 and 39, no fluorine-containing organic silicon compound film is provided on the surface.

As shown in FIG. 14, it can be seen that the surface resistance in Example 17 is low compared to Comparative Examples 37 and 39. Even with reference to Table 27 for other Examples and Comparative Examples, it can be seen that the surface resistance in Examples 17 to 20 is low compared to Comparative Examples 37 to 40. The low surface resistance means that adhesion of dust or grit due to static electricity is reduced.

2 Relationship Between Surface Resistance and Total Film Thickness

Figure 15:
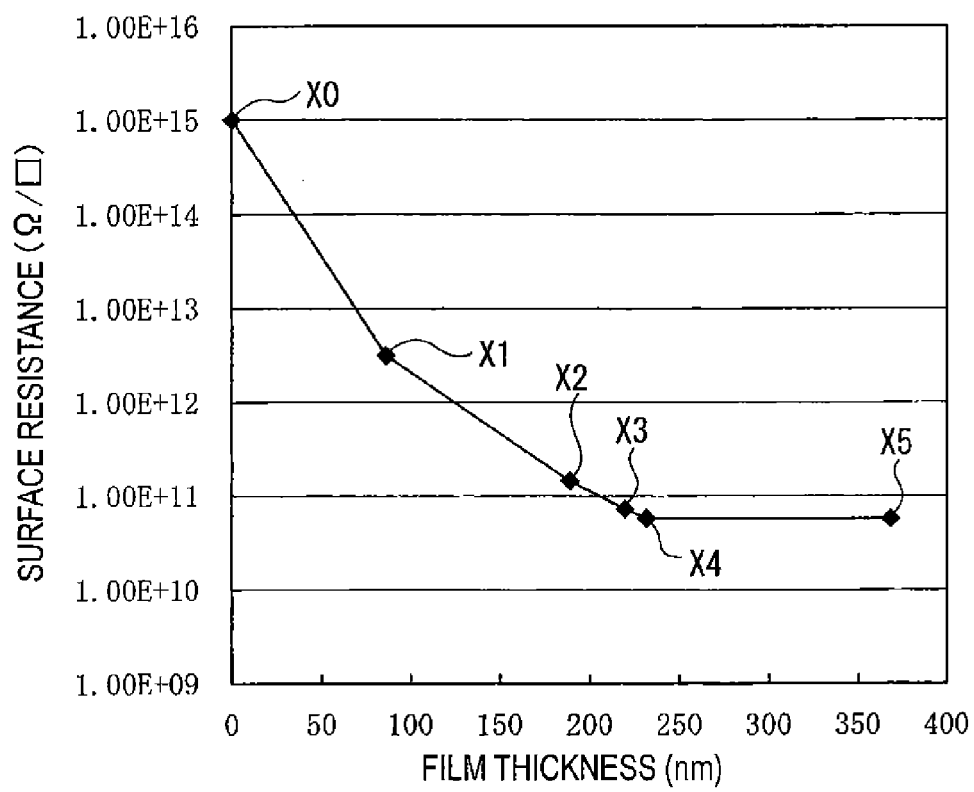
FIG. 15 is a graph showing the relationship between a film thickness and surface resistance in Example 17.

FIG. 15 shows the relationship between a film thickness and surface resistance in Example 1.

In FIG. 15, X0 is surface resistance ($1.0 \times 10^{15} \Omega/\square$) when all layers are formed through electron beam deposition with high assist power. X1 is surface resistance ($3.17 \times 10^{12} \Omega/\square$) when only the outermost layer having a thickness of 86.0 nm is formed through electron beam deposition with low assist power (an acceleration voltage is 300 V and an acceleration current is 450 mV). X2 is surface resistance ($1.44 \times 10^{11} \Omega/\square$) when the outermost layer and the second layer are formed through electron beam deposition with low assist power. X3 is surface resistance ($7.28 \times 10^{10} \Omega/\square$) when the outermost layer to the third layer are formed through electron beam deposition with low assist power. X4 is surface resistance ($5.77 \times 10^{10} \Omega/\square$) when the outermost layer to the fourth layer are formed through electron beam deposition with low assist power. X5 is surface resistance ($5.74 \times 10^{10} \Omega/\square$) when all layers are formed through electron beam deposition with low assist power. As shown in FIG. 15, it can be seen that, if a large number of bonded layers including the outermost layer are formed through electron beam deposition with low assist power, the value of surface resistance is reduced. Meanwhile, it can be seen that, when the outermost layer to the fourth layer are formed through electron beam deposition with low assist power and when all layers (five layers) including the outermost layer are formed through electron beam deposition with low assist power, the value of surface resistance is not changed so much. For this reason, in this example, it will suffice that the outermost layer to the fourth layer (film thickness 240 nm) are formed through electron beam deposition with low assist power.

3 Charge-Through

Figure 16:
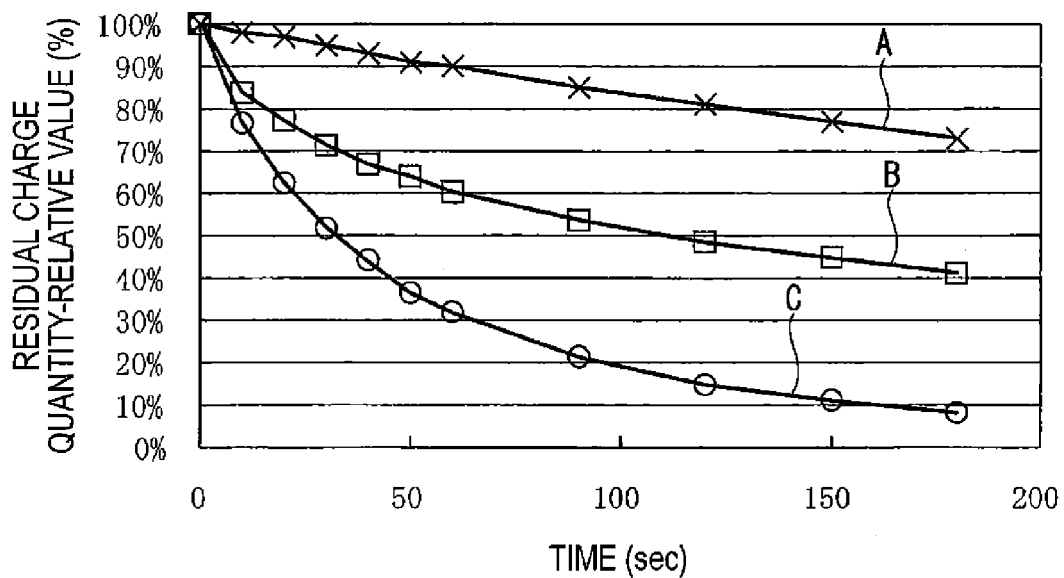
FIG. 16 is a graph showing the relationship between time and a residual charge quantity in Example 17, Comparative Example 37, and Comparative Example 39.

With regard to charge-through, the outermost layer of the sample is frictionally charged, and the residual charge quantity (relative value) in the outermost layer is displayed over time. The charge-through is shown in FIG. 16. In FIG. 16, a graph A shows Comparative Example 37, a graph B shows Comparative Example 39, and a graph C shows Example 17. For the measurement of surface charges, the surface electrometer 500 shown in FIG. 7B is used. The surface electrometer 500 is the same as that used in the above-described experiment, and the distance between the probe 501 and the surface of the sample 502 of a filter is 10 mm. The stage 503 on which the sample 502 is placed is made of metal, and measurement is performed in a state of being grounded. The measurement environment is the same as in the above-described experiment.

As shown in FIG. 16, in the graph C of Example 17, the residual charge quantity over time is small compared to the graph A of Comparative Example 37 or the graph B of Comparative Example 39. As a result, it can be seen that, in Example 17, adhesion of dust or grit due to static electricity is reduced compared to Comparative Example 37 or Comparative Example 39.

4 Dust-Proof Performance

A dust-proof performance test was performed by 4-1 polyethylene powder method, 4-2 Kanto loam method, and 4-3 cotton linter method. The detailed specification of these methods is as described above.

The results of dust-proof performance by these methods are shown in Table 28.

Table 28 shows the results of 4-1 polyethylene powder method, 4-2 Kanto loam method, and 4-3 cotton linter method.

As shown in Table 28, in the case of the polyethylene powder method, it can be seen that the adhered dust quantity and the residual quantity in Examples 17 and 18 are small compared to Comparative Examples 33 to 36. With regard to Examples and Comparative Examples, it can also be seen that the adhered dust quantity and the residual quantity in Examples 18 and 20 and Comparative Examples 34, 36, 38, and 40 where the fluorine-containing organic silicon compound film 3 is provided are small compared to Examples 17 and 19 and Comparative Examples 33, 35, 37, and 39 where no fluorine-containing organic silicon compound film 3 is provided. In the case of the Kanto loam method and the cotton linter method, similarly to the polyethylene powder method, with regard to Examples and Comparative Examples, it can be seen that the adhered dust quantity and the residual quantity in Examples 17 and 18 are small compared to Comparative Examples 33 to 36. It can also be seen that the adhered dust quantity and the residual quantity in Examples 18 and 20 and Comparative Examples 34, 36, 38, and 40 where the fluorine-containing organic silicon compound film 3 is provided are small compared to Examples 17 and 19 and Comparative Examples 33, 35, 37, and 39 where no fluorine-containing organic silicon compound film 3 is provided. The above results are obtained because the surface roughness is improved, and dust or grit is less likely to adhere to the surface.

TABLE 28

| | Film Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
| | | | | | Adhered dust quantity | Residual Quantity | Adhered dust quantity | Residual Quantity | Adhered dust quantity | Residual Quantity |
| Example 17 | IAD | 300 | 450 | None | 3.78% | 0.59% | 0.29% | 0.02% | 2.87% | 0.63% |
| Example 18 | IAD | 300 | 450 | Provided | 0.16% | 0.01% | 0.19% | 0.01% | 1.84% | 0.14% |

TABLE 28-continued

| | Film Formation Method of Outermost Layer | Acceleration Voltage (V) | Acceleration Current (mA) | Fluorine-containing Organic Silicon Compound | Polyethylene Powder | | Kanto Loam | | Cotton Linter | |
|---|---|---|---|---|---|---|---|---|---|---|
| | | | | | Adhered dust quantity | Residual Quantity | Adhered dust quantity | Residual Quantity | Adhered dust quantity | Residual Quantity |
| Example 19 | IAD | 400 | 500 | None | 3.94% | 0.65% | 0.35% | 0.03% | 3.12% | 0.65% |
| Example 20 | IAD | 400 | 500 | Provided | 0.17% | 0.02% | 0.31% | 0.02% | 1.97% | 0.16% |
| Comparative Example 33 | IAD | 600 | 700 | None | 8.95% | 1.78% | 1.04% | 0.09% | 4.58% | 0.97% |
| Comparative Example 34 | IAD | 600 | 700 | Provided | 1.02% | 0.19% | 8.97% | 2.45% | 4.47% | 0.41% |
| Comparative Example 35 | IAD | 800 | 900 | None | 15.20% | 3.02% | 2.20% | 0.49% | 9.93% | 1.89% |
| Comparative Example 36 | IAD | 800 | 900 | Provided | 3.23% | 0.98% | 13.45% | 6.28% | 10.50% | 0.65% |
| Comparative Example 37 | IAD | 1000 | 1200 | None | 17.01% | 3.50% | 2.73% | 0.54% | 10.83% | 2.13% |
| Comparative Example 38 | IAD | 1000 | 1200 | Provided | 3.78% | 1.08% | 14.40% | 7.01% | 11.20% | 0.71% |
| Comparative Example 39 | EB | 0 | 0 | None | 7.74% | 1.34% | 1.06% | 0.09% | 3.82% | 0.81% |
| Comparative Example 40 | EB | 0 | 0 | Provided | 0.93% | 0.12% | 12.90% | 5.92% | 4.58% | 0.35% |

Next, Examples 21 to 24 and Comparative Examples 41 to 48 corresponding to the optical component according to the second embodiment of the invention will be described. With regard to the deposition experiment, similarly to the experiment of Examples 17 to 20 and Comparative Examples 33 to 40, the deposition instrument manufactured by SHINCRON Co., Ltd. was used to manufacture an anti-reflection film on the surface of white plate glass having a predetermined shape under the conditions of Examples and Comparative Examples.

Example 21

In Example 21, the IR-UV cut film 4 is formed on the substrate 1, and no fluorine-containing organic silicon compound film 3 is provided.

The layer configuration of the IR-UV cut film 4 of Example 21 is shown in Tables 29 to 33. Table 29 shows the relationship between the material of each layer and the film thickness. Tables 30 and 31 show the film formation condition of the outermost layer, and the like. Tables 32 and 33 show the film formation condition of the fifth layer to the 39th layer, and the like. In Example 21, the design wavelength is 967 nm.

In Tables 29 to 31, the outermost layer 2S is the silicon oxide layer 2A which is a low-density layer having a density of 2.069 g/cm$^3$ and a refractive index n of 1.449. The thickness of the outermost layer 2S is 71.8 nm, and the relative value 4nd to the design wavelength is 0.433. The second layer 22 is the metal oxide layer 2B which is a low-density layer having a density of 4.65 g/cm$^3$ and made of titanium oxide having a refractive index n of 2.466. The thickness of the second layer 22 is 84.2 nm, and the relative value 4nd to the design wavelength is 0.782. The third layer is the silicon oxide layer 2A which is a low-density layer having a density of 2.069 g/cm$^3$ and a refractive index n of 1.449. The thickness of the third layer is 147.2 nm, and the relative value 4nd to the design wavelength is 0.887. The fourth layer is the metal oxide layer 2B which is a low-density layer having a density of 4.65 g/cm$^3$ and made of titanium oxide having a refractive index n of 2.466. The thickness of the fourth layer is 83.6 nm, and the relative value 4nd to the design wavelength is 0.776.

In Tables 29, 32, and 33, the fifth layer is the silicon oxide layer 2A which is a high-density layer having a density of 2.213 g/cm$^3$ and a refractive index n of 1.481. The thickness of the fifth layer is 140.2 nm, and the relative value 4nd to the design wavelength is 0.845. The sixth layer is the metal oxide layer 2B which is a high-density layer having a density of 4.87 g/cm$^3$ and made of titanium oxide having a refractive index n of 2.489. The thickness of the sixth layer is 83.1 nm, and the relative value 4nd to the design wavelength is 0.772. Subsequently, the seventh layer to the 39th layer have the same configuration as described in Tables 1, 9, and 10. The total thickness of the outermost layer 2S to the 39th layer is 4726.25 nm.

In forming the IR-UV cut film 4 configured as above on the substrate 1, in Example 21, the outermost layer 2S to the fourth layer are formed through ion-assisted electron beam deposition (IAD) with low assist power. The film formation temperature is 150° C. When a low-density layer is formed as the silicon oxide layer 2A, the vacuum pressure is 1.8×10$^{-2}$ Pa. Assist power has an acceleration voltage of 300 V and an acceleration current of 450 mA. When the metal oxide layer 2B is formed of titanium oxide, the vacuum pressure is 2.1×10$^{-2}$ Pa. Assist power has an acceleration voltage of 300 V and an acceleration current of 450 mA. The fifth layer to the 39th layer are formed through ion-assisted electron beam deposition (IAD) with high assist power. In this case, in the same manner as when the silicon oxide layer 2A is formed and when the metal oxide layer 2B is formed of titanium oxide, assist power has an acceleration voltage of 1000 Vm and an acceleration current of 1200 mA. The surface roughness of the outermost layer 2S is 0.6 nm to 0.7 nm.

Example 22

Example 22 is different from Example 21 in that the fluorine-containing organic silicon compound film 3 is provided on the IR-UV cut film 4.

The fluorine-containing organic silicon compound film 3 is the same as in Example 18.

Example 23

Example 23 is different from Example 21 in terms of assist power for forming a low-density layer. That is, in Example 23, assist power is low assist power having an acceleration voltage of 400 V and an acceleration current of 500 mA. For this reason, the low-density layers constituting the silicon oxide layer 2A serving as the outermost layer 2S and the third layer have a density of 2.086 g/cm$^3$, and the low-density layers constituting the second layer 22 and the fourth layer, that is, the metal oxide layers 2B made of titanium oxide have a density of 4.69 g/cm$^3$. The fifth layer 25 to the 39th layer have the same density as in Example 1.

Example 24

Example 24 is different from Example 23 in that the fluorine-containing organic silicon compound film 3 is provided on the IR-UV cut film 4.

The fluorine-containing organic silicon compound film 3 is the same as in Example 18.

Comparative Example 41

Comparative Example 41 is different from Example 21 in terms of assist power for forming a low-density layer. That is, in Comparative Example 41, the outermost layer 2S to the fourth layer 24 are formed through ion-assisted electron beam deposition (IAD) with intermediate assist power having an acceleration voltage of 600 V and an acceleration current of 700 mA. For this reason, the low-density layers constituting the silicon oxide thin-film serving as the outermost layer and the third layer have a density of 2.172 g/cm$^3$, and the low-density layers constituting the second layer and the fourth layer, that is, the metal oxide layers 2E made of titanium oxide have a density of 4.79 g/cm$^3$.

In Comparative Example 41, the surface roughness of the outermost layer is 0.62 nm to 0.72 nm, which is great compared to Examples 21 to 24.

Comparative Example 42

Comparative Example 42 is different from Comparative Example 41 in that the fluorine-containing organic silicon compound film 3 is provided on the IR-UV cut film 4.

Comparative Example 43

Comparative Example 43 is different from Example 21 in terms of assist power for forming a low-density layer. That is, in Comparative Example 43, the outermost layer 2S to the fourth layer 24 are formed through ion-assisted electron beam deposition (IAD) with intermediate assist power having an acceleration voltage of 800 V and an acceleration current of 900 mA. For this reason, the low-density layers constituting the silicon oxide layer serving as the outermost layer and the third layer have a density of 2.201 g/cm$^3$, and the low-density layers constituting the second layer and the fourth layer, that is, the metal oxide layers 2B made of titanium oxide have a density of 4.89 g/cm$^3$.

In Comparative Example 43, the surface roughness of the outermost layer is 0.65 nm to 0.75 nm, which is great compared to Examples 21 to 24.

Comparative Example 44

Comparative Example 44 is different from Comparative Example 43 in that the fluorine-containing organic silicon compound film is provided on the IR-UV cut film.

Comparative Example 45

Comparative Example 45 is different from Example 21 in terms of assist power for forming a low-density layer. That is, in Comparative Example 45, all layers are formed through ion-assisted electron beam deposition (IAD) with high assist power having an acceleration voltage of 1000 V and an acceleration current of 1200 mA. For this reason, the low-density layers constituting the silicon oxide thin-film serving as the outermost layer and the third layer have a density of 2.213 g/cm$^3$, and the low-density layers constituting the second layer and the fourth layer, that is, the metal oxide layers 2B made of titanium oxide have a density of 4.87 g/cm$^3$.

In Comparative Example 45, the surface roughness of the outermost layer is 0.67 nm to 0.77 nm, which is great compared to Examples 21 to 24.

Comparative Example 46

Comparative Example 46 is different from Comparative Example 45 in that the fluorine-containing organic silicon compound film is provided on the IR-UV cut film.

Comparative Example 47

Comparative Example 47 has the same configuration as in Example 21, but, unlike Example 21, the film formation method is the same as in the related art described in Japanese Patent No. 4207083. That is, in Comparative Example 47, the outermost layer is formed through electron deposition (EB) without using ion assist, and the film formation method of the layers other than the outermost layer is the same as in Comparative Example 37. The second layer to the 39th layer were formed through ion-assisted electron beam deposition (IAD) with high assist power having an acceleration voltage of 1000 V and an acceleration current of 1200 Tull. The vacuum pressure at the time of forming silicon oxide for the outermost layer is 8.0×10$^{-3}$ Pa. For this reason, the density of the silicon oxide layer is 2.037 g/cm$^3$. In Comparative Example 47, the surface roughness of the outermost layer is 0.8 nm to 0.95 nm, which is great compared to Examples 21 to 24.

Comparative Example 48

Comparative Example 48 is different from Comparative Example 47 in that the fluorine-containing organic silicon compound film is provided on the IR-UV cut film.

TABLE 29

| Layer | Material | d (nm) | 4nd | Film Formation Condition |
|---|---|---|---|---|
| Incidence Medium | Air | | | |
| Outermost Layer | SiO$_2$ | 71.8 | 0.433 | Low Assist Power |
| Second Layer | TiO$_2$ | 84.2 | 0.782 | Low Assist Power |
| Third Layer | SiO$_2$ | 147.2 | 0.887 | Low Assist Power |
| Fourth Layer | TiO$_2$ | 83.6 | 0.776 | Low Assist Power |
| Fifth Layer | SiO$_2$ | 140.2 | 0.845 | High Assist Power |
| Sixth Layer | TiO$_2$ | 83.1 | 0.772 | High Assist Power |
| Seventh Layer | SiO$_2$ | 139.2 | 0.839 | High Assist Power |
| Eighth Layer | TiO$_2$ | 81.4 | 0.756 | High Assist Power |
| Ninth Layer | SiO$_2$ | 139.8 | 0.843 | High Assist Power |
| Tenth Layer | TiO$_2$ | 81.1 | 0.753 | High Assist Power |
| 11th Layer | SiO$_2$ | 139.4 | 0.841 | High Assist Power |
| 12th Layer | TiO$_2$ | 81.0 | 0.752 | High Assist Power |
| 13th Layer | SiO$_2$ | 139.4 | 0.841 | High Assist Power |
| 14th Layer | TiO$_2$ | 82.0 | 0.761 | High Assist Power |
| 15th Layer | SiO$_2$ | 140.8 | 0.849 | High Assist Power |
| 16th Layer | TiO$_2$ | 83.3 | 0.773 | High Assist Power |
| 17th Layer | SiO$_2$ | 143.2 | 0.863 | High Assist Power |
| 18th Layer | TiO$_2$ | 86.7 | 0.805 | High Assist Power |
| 19th Layer | SiO$_2$ | 150.6 | 0.908 | High Assist Power |
| 20th Layer | TiO$_2$ | 100.4 | 0.932 | High Assist Power |

TABLE 29-continued

| Layer | Material | d (nm) | 4nd | Film Formation Condition |
|---|---|---|---|---|
| 21st Layer | $SiO_2$ | 179.7 | 1.083 | High Assist Power |
| 22nd Layer | $TiO_2$ | 110.0 | 1.021 | High Assist Power |
| 23rd Layer | $SiO_2$ | 169.7 | 1.023 | High Assist Power |
| 24th Layer | $TiO_2$ | 101.5 | 0.942 | High Assist Power |
| 25th Layer | $SiO_2$ | 175.7 | 1.059 | High Assist Power |
| 26th Layer | $TiO_2$ | 115.0 | 1.067 | High Assist Power |
| 27th Layer | $SiO_2$ | 189.1 | 1.140 | High Assist Power |
| 28th Layer | $TiO_2$ | 116.5 | 1.081 | High Assist Power |
| 29th Layer | $SiO_2$ | 191.2 | 1.153 | High Assist Power |
| 30th Layer | $TiO_2$ | 119.4 | 1.108 | High Assist Power |
| 31st Layer | $SiO_2$ | 189.9 | 1.145 | High Assist Power |
| 32nd Layer | $TiO_2$ | 117.5 | 1.091 | High Assist Power |
| 33rd Layer | $SiO_2$ | 193.2 | 1.165 | High Assist Power |
| 34th Layer | $TiO_2$ | 116.7 | 1.083 | High Assist Power |
| 35th Layer | $SiO_2$ | 184.2 | 1.110 | High Assist Power |
| 36th Layer | $TiO_2$ | 119.1 | 1.105 | High Assist Power |
| 37th Layer | $SiO_2$ | 44.8 | 0.270 | High Assist Power |
| 38th Layer | $TiO_2$ | 11.8 | 0.110 | High Assist Power |
| 39th Layer | $SiO_2$ | 82.9 | 0.500 | High Assist Power |
| Emergence Medium | Glass | | | | n is a refractive index
total film thickness: 4726.25 nm
design wavelength: 967 nm

TABLE 30

| | Film Formation Method of First to Fourth Layers | Film Formation Temperature | $SiO_2$ Rate (Å/sec) | $SiO_2$ Vacuum Pressure ($O_2$) | $SiO_2$ Assist Power | $SiO_2$ Density (g/cm³) | $SiO_2$ Refractive Index (at 550 nm) |
|---|---|---|---|---|---|---|---|
| Example 21, 22 | IAD | 150° C. | 7 | 1.8E−2 Pa | 300 V 450 mA | 2.069 | 1.449 |
| Example 23, 24 | IAD | 150° C. | 7 | 1.8E−2 Pa | 400 V 500 mA | 2.086 | 1.453 |
| Comparative Example 41, 42 | IAD | 150° C. | 7 | 1.8E−2 Pa | 600 V 700 mA | 2.172 | 1.461 |
| Comparative Example 43, 44 | IAD | 150° C. | 7 | 1.8E−2 Pa | 800 V 900 mA | 2.201 | 1.473 |
| Comparative Example 45, 46 | IAD | 150° C. | 7 | 1.8E−2 Pa | 1000 V 1200 mA | 2.213 | 1.481 |
| Comparative Example 47, 48 | EB | 150° C. | 7 | 8.0E−3 Pa | — | 2.037 | 1.44 |

TABLE 31

| | Film Formation Method of First to Fourth Layers | Film Formation Temperature | $TiO_2$ Rate (Å/sec) | $TiO_2$ Vacuum Pressure ($O_2$) | $TiO_2$ Assist Power | $TiO_2$ Density (g/cm³) | $TiO_2$ Refractive Index (at 550 nm) |
|---|---|---|---|---|---|---|---|
| Example 21, 22 | IAD | 150° C. | 3 | 2.1E−2 Pa | 300 V 450 mA | 4.65 | 2.466 |
| Example 23, 24 | IAD | 150° C. | 3 | 2.1E−2 Pa | 400 V 500 mA | 4.69 | 2.473 |
| Comparative Example 41, 42 | IAD | 150° C. | 3 | 2.1E−2 Pa | 600 V 700 mA | 4.79 | 2.487 |
| Comparative Example 43, 44 | IAD | 150° C. | 3 | 2.1E−2 Pa | 800 V 900 mA | 4.89 | 2.497 |
| Comparative Example 45, 46 | IAD | 150° C. | 3 | 2.1E−2 Pa | 1000 V 1200 mA | 4.87 | 2.489 |
| Comparative Example 47, 48 | IAD | 150° C. | 3 | 2.1E−2 Pa | 1000 V 1200 mA | 4.87 | 2.489 |

TABLE 32

| | Film Formation Method of Fifth Layer and Subsequent Layers | Film Formation Temperature | $SiO_2$ Rate (Å/sec) | $SiO_2$ Vacuum Pressure ($O_2$) | $SiO_2$ Assist Power | $SiO_2$ Density (g/cm³) | $SiO_2$ Refractive Index (at 550 nm) |
|---|---|---|---|---|---|---|---|
| Example 21, 22 | IAD | 150° C. | 7 | 1.8E−2 Pa | 1000 V 1200 mA | 2.213 | 1.481 |

TABLE 32-continued

| | Film Formation Method of Fifth Layer and Subsequent Layers | Film Formation Temperature | SiO$_2$ Rate (Å/sec) | SiO$_2$ Vacuum Pressure (O$_2$) | SiO$_2$ Assist Power | SiO$_2$ Density (g/cm$^3$) | SiO$_2$ Refractive Index (at 550 nm) |
|---|---|---|---|---|---|---|---|
| Example 23, 24 | IAD | 150° C. | 7 | 1.8E−2 Pa | 1000 V 1200 mA | 2.213 | 1.481 |
| Comparative Example 41, 42 | IAD | 150° C. | 7 | 1.8E−2 Pa | 1000 V 1200 mA | 2.213 | 1.481 |
| Comparative Example 43, 44 | IAD | 150° C. | 7 | 1.8E−2 Pa | 1000 V 1200 mA | 2.213 | 1.481 |
| Comparative Example 45, 46 | IAD | 150° C. | 7 | 1.8E−2 Pa | 1000 V 1200 mA | 2.213 | 1.481 |
| Comparative Example 47, 48 | IAD | 150° C. | 7 | 1.8E−2 Pa | 1000 V 1200 mA | 2.213 | 1.481 |

TABLE 33

| | Film Formation Method of Fifth Layer and Subsequent Layers | Film Formation Temperature | TiO$_2$ Rate (Å/sec) | TiO$_2$ Vacuum Pressure (O$_2$) | TiO$_2$ Assist Power | TiO$_2$ Density (g/cm$^3$) | TiO$_2$ Refractive Index (at 550 nm) | Surface Roughness (nm) | Surface Resistance (Ω/□) |
|---|---|---|---|---|---|---|---|---|---|
| Example 21, 22 | IAD | 150° C. | 3 | 2.1E−2 Pa | 1000 V 1200 mA | 4.87 | 2.489 | 0.6 to 0.7 | 6.87E+10 |
| Example 23, 24 | IAD | 150° C. | 3 | 2.1E−2 Pa | 1000 V 1200 mA | 4.87 | 2.489 | 0.6 to 0.7 | 2.87E+11 |
| Comparative Example 41, 42 | IAD | 150° C. | 3 | 2.1E−2 Pa | 1000 V 1200 mA | 4.87 | 2.489 | 0.62 to 0.72 | 2.35E+13 |
| Comparative Example 43, 44 | IAD | 150° C. | 3 | 2.1E−2 Pa | 1000 V 1200 mA | 4.87 | 2.489 | 0.65 to 0.75 | 1.00E+15 |
| Comparative Example 45, 46 | IAD | 150° C. | 3 | 2.1E−2 Pa | 1000 V 1200 mA | 4.87 | 2.489 | 0.67 to 0.77 | 1.00E+15 |
| Comparative Example 47, 48 | IAD | 150° C. | 3 | 2.1E−2 Pa | 1000 V 1200 mA | 4.87 | 2.489 | 0.8 to 0.95 | 7.26E+12 |

Experiment Result
1 Measurement of Surface Resistance (Sheet Resistance)

In measuring the surface resistance, the same apparatus as in Examples 17 to 20 and Comparative Examples 33 to 40 was used to measure the surface resistance. The result is shown in Table 33.

As shown in Table 33, it can be seen that the surface resistance in Examples 21 to 24 is low compared to Comparative Examples 41 to 48. The low surface resistance means that adhesion of dust or grit due to static electricity is reduced.

2 Relationship Between Surface Resistance and Total Film Thickness

Figure 17:
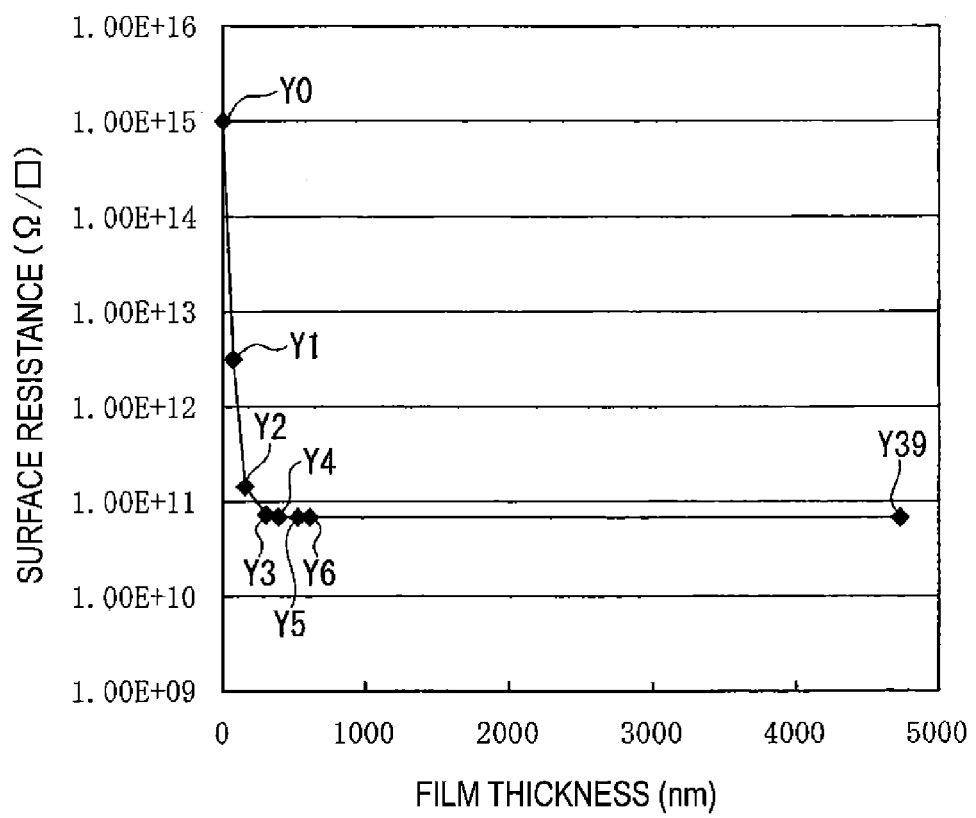
FIG. 17 is a graph showing the relationship between a film thickness and surface resistance in Example 21.

FIG. 17 shows the relationship between a film thickness and surface resistance in Example 21.

In FIG. 17, Y0 is surface resistance ($1.0 \times 10^{15}$ Ω/□) when all layers are formed through electron beam deposition with high assist power. Y1 is surface resistance ($3.17 \times 10^{12}$ Ω/□) when only the outermost layer having a thickness of 71.8 nm is formed through electron beam deposition with low assist power (an acceleration voltage is 300 V and an acceleration current is 450 mV). Y2 is surface resistance ($1.44 \times 10^{11}$ Ω/□) when the outermost layer and the second layer are formed through electron beam deposition with low assist power. Y3 is surface resistance ($7.28 \times 10^{10}$ Ω/□) when the outermost layer to the third layer are formed through electron beam deposition with low assist power. Y4 is surface resistance ($6.87 \times 10^{10}$ Ω/□) when the outermost layer to the fourth layer are formed through electron beam deposition with low assist power. Y5 is surface resistance ($6.85 \times 10^{10}$ Ω/□) when the outermost layer to the fifth layer are formed through electron beam deposition with low assist power. Y6 is surface resistance ($6.81 \times 10^{10}$ Ω/□) when the outermost layer to the sixth layer are formed through electron beam deposition with low assist power. Y39 is surface resistance ($6.75 \times 10^{10}$ Ω/□) when all layers of the outermost layer to the 39th layer are formed through electron beam deposition with low assist power.

As shown in FIG. 17, it can be seen that, if the number of bonded layers including the outermost layer is great, the value of surface resistance is reduced. Meanwhile, it can be seen that, when the outermost layer to the fourth layer are formed through electron beam deposition with low assist power and when all layers (39 layers) including the outermost layer are formed through electron beam deposition with low assist power, the value of surface resistance is not changed so much. For this reason, in this example, it will suffice that the outermost layer to the fourth layer (film thickness 386.8 nm) are formed through electron beam deposition with low assist power.

Table 34 shows the results of dust-proof performance by the polyethylene powder method, the Kanto loam method, and the cotton linter method.

As shown in Table 34, in the case of the polyethylene powder method, it can be seen that the adhered dust quantity and the residual quantity in Examples 21 and 23 are small compared to Comparative Examples 41, 43, 45, and 47, and the adhered dust quantity and the residual quantity in Examples 22 and 24 are small compared to Comparative Examples 42, 44, 46, and 48. With regard to Examples and Comparative Examples, it can be seen that the adhered dust quantity and the residual quantity in Examples 22 and 24 and Comparative Examples 42, 44, 46, and 48 where the fluorine-containing organic silicon compound film 3 is provided are small compared to Examples 21 and 23 and Comparative Examples 41, 43, 45, and 47 where no fluorine-containing organic silicon compound film 3 is provided. In the case of the Kanto loam method and the cotton linter method, similarly to the polyethylene powder method, with regard to Examples and Comparative Examples, it can be seen that the adhered dust quantity and the residual quantity in Examples 21 to 24 are small compared to Comparative Examples 41 to 48. The above results are obtained because the surface roughness is improved and dust or grit is less likely to adhere to the surface.

TABLE 34

| Film | | | Fluorine-containing Organic Silicon Compound | Polyethylene Powder | | Kanto Loam | | Cotton Linter | |
|---|---|---|---|---|---|---|---|---|---|
| Formation Method of Outermost Layer | Acceleration Voltage (V) | Acceleration Current (mA) | | Adhered dust quantity | Residual Quantity | Adhered dust quantity | Residual Quantity | Adhered dust quantity | Residual Quantity |
| Example 21 IAD | 300 | 450 | None | 3.01% | 0.45% | 0.27% | 0.02% | 2.58% | 0.52% |
| Example 22 IAD | 300 | 450 | Provided | 0.12% | 0.01% | 0.15% | 0.01% | 1.55% | 0.12% |
| Example 23 IAD | 400 | 500 | None | 3.88% | 0.63% | 0.38% | 0.03% | 3.43% | 0.68% |
| Example 24 IAD | 400 | 500 | Provided | 0.16% | 0.02% | 0.33% | 0.02% | 1.94% | 0.17% |
| Comparative Example 41 IAD | 600 | 700 | None | 8.12% | 1.54% | 1.23% | 0.08% | 4.67% | 0.95% |
| Comparative Example 42 IAD | 600 | 700 | Provided | 0.98% | 0.17% | 6.78% | 2.10% | 4.93% | 0.44% |
| Comparative Example 43 IAD | 800 | 900 | None | 17.50% | 3.22% | 2.76% | 0.87% | 10.98% | 2.03% |
| Comparative Example 44 IAD | 800 | 900 | Provided | 4.02% | 1.22% | 20.97% | 9.67% | 11.23% | 2.17% |
| Comparative Example 45 IAD | 1000 | 1200 | None | 21.18% | 3.98% | 3.47% | 1.23% | 15.67% | 2.98% |
| Comparative Example 46 IAD | 1000 | 1200 | Provided | 4.92% | 1.73% | 31.56% | 15.46% | 14.73% | 2.63% |
| Comparative Example 47 EB | 0 | 0 | None | 8.94% | 1.87% | 1.03% | 0.27% | 5.89% | 1.76% |
| Comparative Example 48 EB | 0 | 0 | Provided | 0.77% | 0.10% | 15.66% | 7.14% | 4.78% | 0.54% |

The invention is not limited to the above-described embodiments, and the following modifications within a range where the advantage of the invention can be achieved may be included in the invention.

For example, according to the invention, the optical component is not limited to the above-described configuration. For example, in the first embodiment, an optical component to which the invention is applied may be, for example, a polarization conversion element 114. In the second embodiment, an optical component to which the invention is applied may be, for example, an optical low-pass filter 211. In summary, the invention can be applied to any optical component insofar as the anti-reflection film 2 or an optical multilayer film including a UV-IR cut film is formed on the substrate 1.

The entire disclosure of Japanese Patent Application Nos: 2010-211690, filed Sep. 22, 2010 are expressly incorporated by reference herein.

What is claimed is:

1. An optical component comprising:
  a multilayer inorganic thin-film on a substrate,
  wherein the inorganic thin-film is formed by laminating a plurality of layers made of silicon oxide and a plurality of layers made of metal oxide,
  the metal oxide is metal oxide containing any one of zirconium, tantalum, and titanium,
  the layers made of metal oxide include a low-density metal oxide layer and a high-density metal oxide layer having a density higher than the low-density metal oxide layer, at least one low-density metal oxide layer being between a high-density metal oxide layer and the substrate,
  the high-density metal oxide layer being an outermost metal oxide layer and having the highest density of the metal oxide layers in the inorganic thin-film,
  the layers made of silicon oxide include a low-density silicon oxide layer and a high-density silicon oxide layer having a density higher than the low-density silicon oxide layer,
  the outermost layer of the inorganic thin-film is the low-density silicon oxide layer, and
  the surface roughness of the outermost layer of the inorganic thin-film is equal to or greater than 0.55 nm and equal to or smaller than 0.7 nm.

2. The optical component according to claim 1,
  wherein the layer of metal oxide near the outermost layer includes a layer of zirconium oxide, and
  the surface roughness of the outermost layer of the inorganic thin-film is equal to or greater than 0.6 nm and equal to or smaller than 0.7 nm.

3. The optical component according to claim 2,
  wherein the layers of zirconium oxide include a low-density zirconium oxide layer and a high-density zirconium oxide layer having a density higher than the low-density zirconium oxide layer, and at least a layer adjacent to the outermost layer of the inorganic thin-film is the high-density zirconium oxide layer.

4. The optical component according to claim 3,
  wherein the low-density silicon oxide layer has a density equal to or higher than 2.00 g/cm$^3$ and equal to or lower than 2.20 g/cm$^3$, and the low-density zirconium oxide layer has a density equal to or higher than 4.8 g/cm$^3$ and equal to or lower than 5.4 g/cm$^3$.

5. The optical component according to claim 1,
  wherein the layer of metal oxide near the outermost layer includes a layer of tantalum oxide, and
  the surface roughness of the outermost layer of the inorganic thin-film is equal to or greater than 0.55 nm and equal to or smaller than 0.65 nm.

6. The optical component according to claim 5,
wherein the layers of tantalum oxide include a low-density tantalum oxide layer and a high-density tantalum oxide layer having a density higher than the low-density tantalum oxide layer, and at least a layer adjacent to the outermost layer of the inorganic thin-film is the high-density tantalum oxide layer.

7. The optical component according to claim 6,
wherein the low-density silicon oxide layer has a density equal to or higher than 2.00 g/cm$^3$ and equal to or lower than 2.15 g/cm$^3$, and the low-density tantalum oxide layer has a density equal to or higher than 7.7 g/cm$^3$ and equal to or lower than 8.0 g/cm$^3$.

8. The optical component according to claim 1,
wherein the layer of metal oxide near the outermost layer includes a layer of titanium oxide, and
the surface roughness of the outermost layer of the inorganic thin-film is equal to or greater than 0.6 nm and equal to or smaller than 0.7 nm.

9. The optical component according to claim 8,
wherein the layers of titanium oxide include a low-density titanium oxide layer and a high-density titanium oxide layer having a density higher than the low-density titanium oxide layer, and at least a layer adjacent to the outermost layer of the inorganic thin-film is the high-density titanium oxide layer.

10. The optical component according to claim 9,
wherein the low-density silicon oxide layer has a density equal to or higher than 2.00 g/cm$^3$ and equal to or lower than 2.15 g/cm$^3$, and the low-density titanium oxide layer has a density equal to or higher than 4.50 g/cm$^3$ and equal to or lower than 4.75 g/cm$^3$.

11. The optical component according to claim 1,
wherein the total thickness of the low-density silicon oxide layer and the low-density metal oxide layer is equal to or smaller than 500 nm.

12. The optical component according to claim 1,
wherein a fluorine-containing organic silicon compound film is formed on the surface of the outermost layer of the inorganic thin-film.

13. The optical component according to claim 2,
wherein the surface resistance of the inorganic thin-film is equal to or smaller than $3.1\times10^{10}\Omega/$ and equal to or greater than $9.1\times10^9\Omega/$.

14. The optical component according to claim 5,
wherein the surface resistance of the inorganic thin-film is equal to or smaller than $1.4\times10^{11}\Omega/$ and equal to or greater than $7.7\times10^9\Omega/$.

15. The optical component according to claim 8,
wherein the surface resistance of the inorganic thin-film is equal to or smaller than $1.4\times10^{11}\Omega/$ and equal to or greater than $5.7\times10^{10}\Omega/$.

16. A method of manufacturing the optical component according to claim 1, the method comprising:
forming at least the outermost layer of the inorganic thin-film through ion-assisted electron beam deposition with assist power having an acceleration voltage equal to or greater than 300 V and equal to or smaller than 450 V.

17. The method according to claim 16,
wherein the plurality of layers are five or more layers, and at least four adjacent layers including the outermost layer from among the layers are formed through the ion-assisted electron beam deposition with assist power.

18. An electronic apparatus comprising:
the optical component according to claim 1; and
a case which accommodates the optical component,
wherein the optical component is an IR-UV cut filter, and an imaging element is arranged to be opposite the IR-UV cut filter.

19. An electronic apparatus comprising:
the optical component according to claim 1; and
a case which accommodates the optical component,
wherein the optical component has an anti-reflection film and is arranged in an optical path between a laser light source and an objective lens opposite an optical disk.

20. An electronic apparatus comprising:
the optical component according to claim 1; and
a case which accommodates the optical component,
wherein the optical component has an anti-reflection film and is arranged in an optical path between a light source and a dichroic prism.

21. The optical component according to claim 1, wherein the outermost layer of the inorganic thin-film is a layer of the inorganic thin-film that is farthest from the substrate.

* * * * *